Jan. 23, 1945. E. E. WEST Re. 22,596

BAG MAKING, STRINGING AND TAGGING MACHINE

Original Filed Jan. 10, 1939 42 Sheets-Sheet 1

Inventor

EDWARD E. WEST

By Fisher, Moser & Moore

Attorneys

Jan. 23, 1945. E. E. WEST Re. 22,596

BAG MAKING, STRINGING AND TAGGING MACHINE

Original Filed Jan. 10, 1939 42 Sheets-Sheet 2

Inventor

EDWARD E. WEST

By Fisher, Moore & Moore

Attorneys

Jan. 23, 1945. E. E. WEST Re. 22,596

BAG MAKING, STRINGING AND TAGGING MACHINE

Original Filed Jan. 10, 1939 42 Sheets-Sheet 3

BAG MAKING, STRINGING AND TAGGING MACHINE

Original Filed Jan. 10, 1939 42 Sheets-Sheet 4

EDWARD E. WEST

By Fisher, Moser & Morris

Attorneys

Jan. 23, 1945. E. E. WEST Re. 22,596

BAG MAKING, STRINGING AND TAGGING MACHINE

Original Filed Jan. 10, 1939 42 Sheets-Sheet 5

Inventor

EDWARD E. WEST

By Fisher, Moore & Moore

Attorneys

BAG MAKING, STRINGING AND TAGGING MACHINE
Original Filed Jan. 10, 1939 42 Sheets-Sheet 6
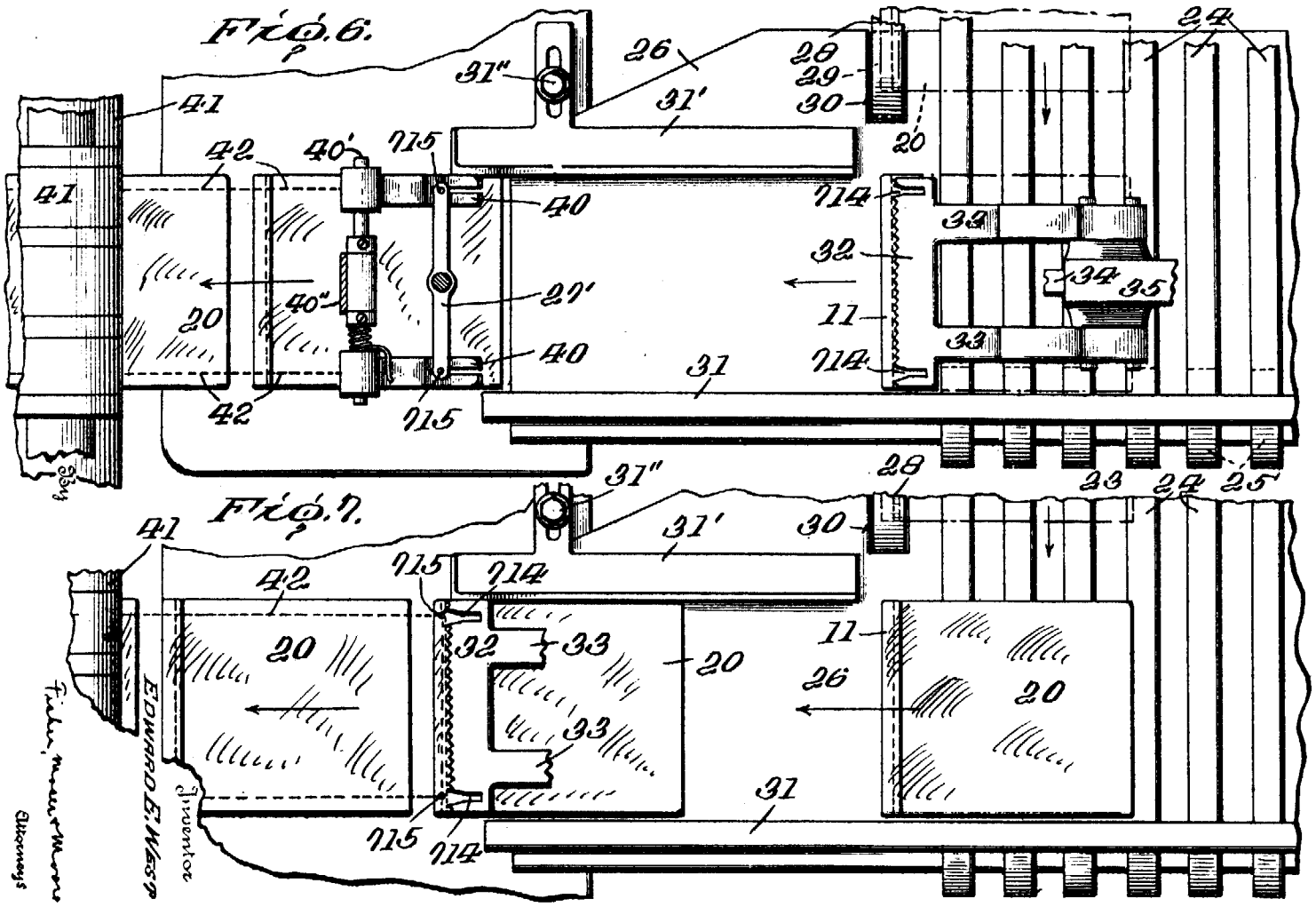

Jan. 23, 1945. E. E. WEST Re. 22,596

BAG MAKING, STRINGING AND TAGGING MACHINE

Original Filed Jan. 10, 1939 42 Sheets-Sheet 7

Inventor

EDWARD E. WEST

By Fisher, Moore & Moore

Attorneys

BAG MAKING, STRINGING AND TAGGING MACHINE

Original Filed Jan. 10, 1939 42 Sheets-Sheet 8

Jan. 23, 1945. E. E. WEST Re. 22,596

BAG MAKING, STRINGING AND TAGGING MACHINE

Original Filed Jan. 10, 1939 42 Sheets-Sheet 9

Inventor

EDWARD E. WEST

By Fisher, Moser & Moore

Attorneys

BAG MAKING, STRINGING AND TAGGING MACHINE

Original Filed Jan. 10, 1939 42 Sheets-Sheet 10

Inventor

EDWARD E. WEST

Fisher, Moser & Moore

Attorneys

BAG MAKING, STRINGING AND TAGGING MACHINE
Original Filed Jan. 10, 1939 42 Sheets-Sheet 11
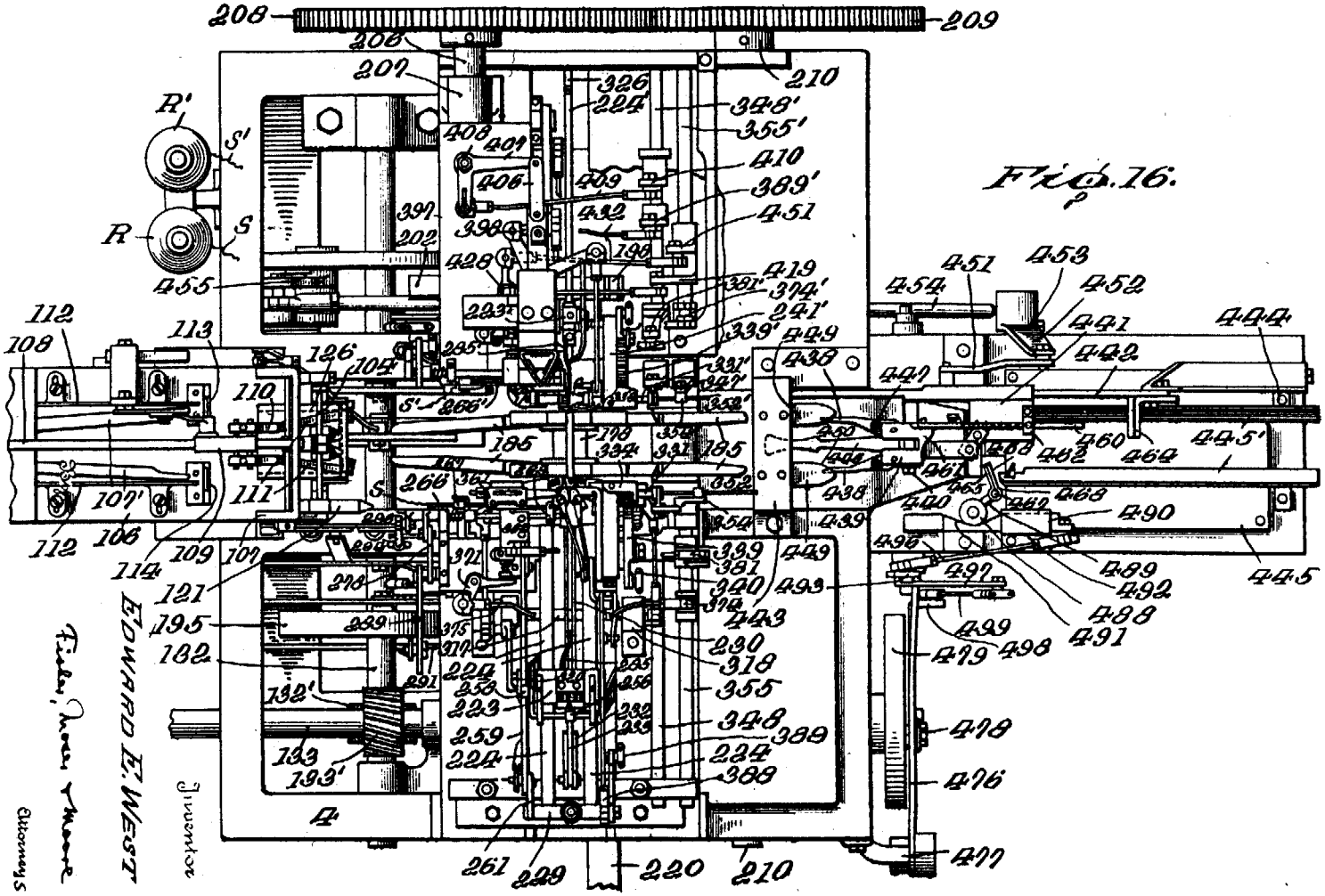

BAG MAKING, STRINGING AND TAGGING MACHINE
Original Filed Jan. 10, 1939 42 Sheets-Sheet 12
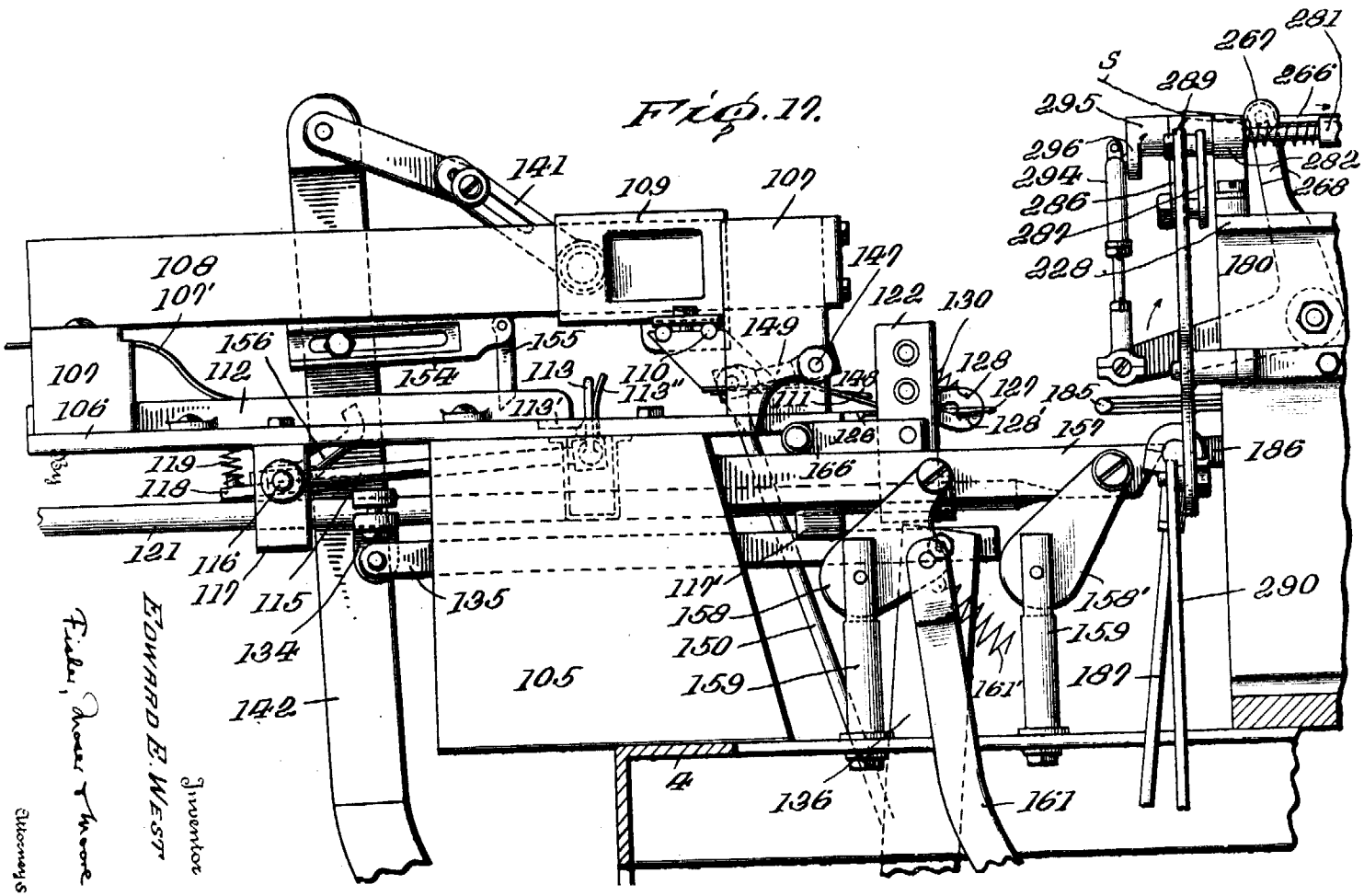

Jan. 23, 1945. E. E. WEST Re. 22,596
BAG MAKING, STRINGING AND TAGGING MACHINE
Original Filed Jan. 10, 1939 42 Sheets-Sheet 13
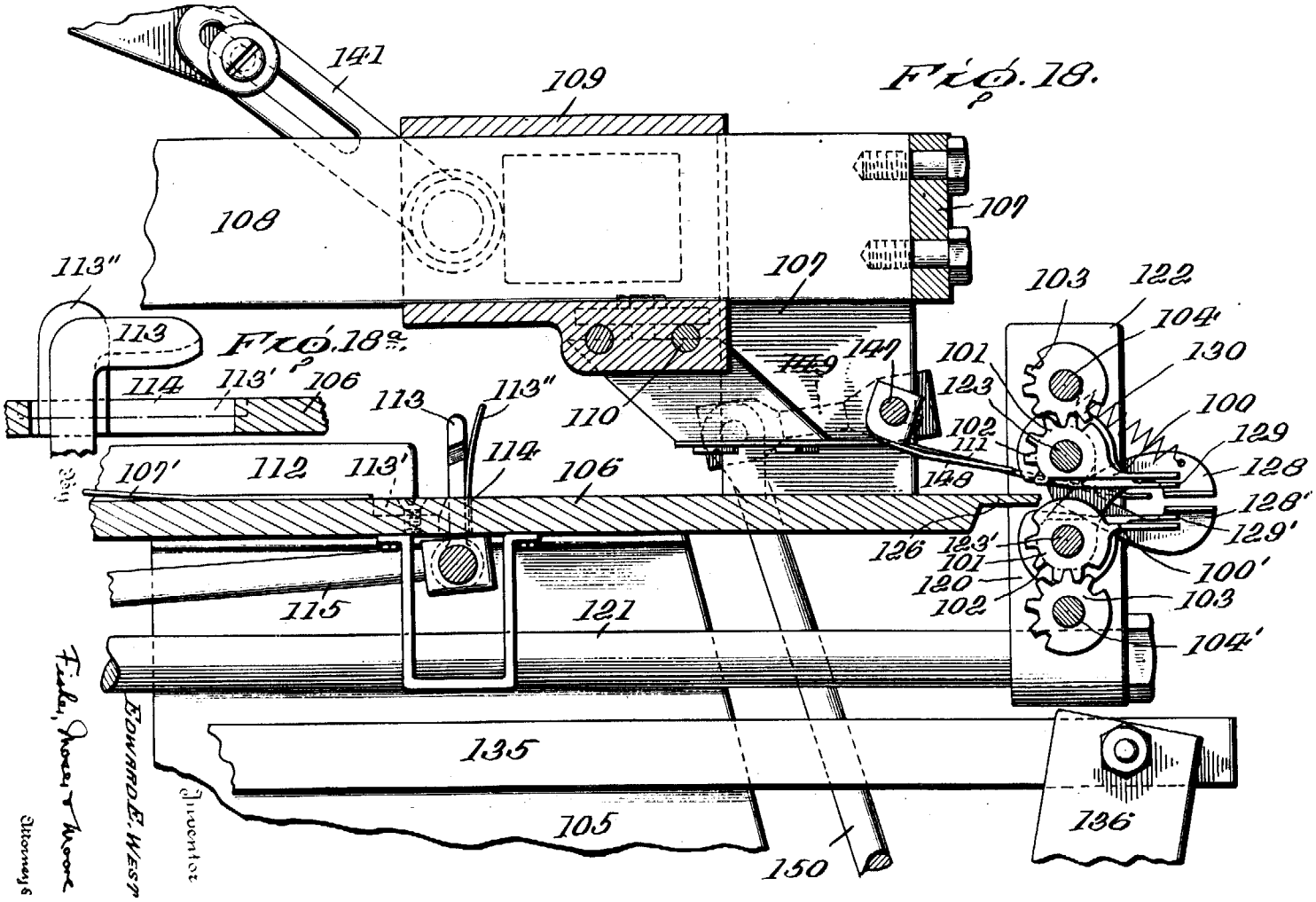

BAG MAKING, STRINGING AND TAGGING MACHINE
Original Filed Jan. 10, 1939 42 Sheets-Sheet 14
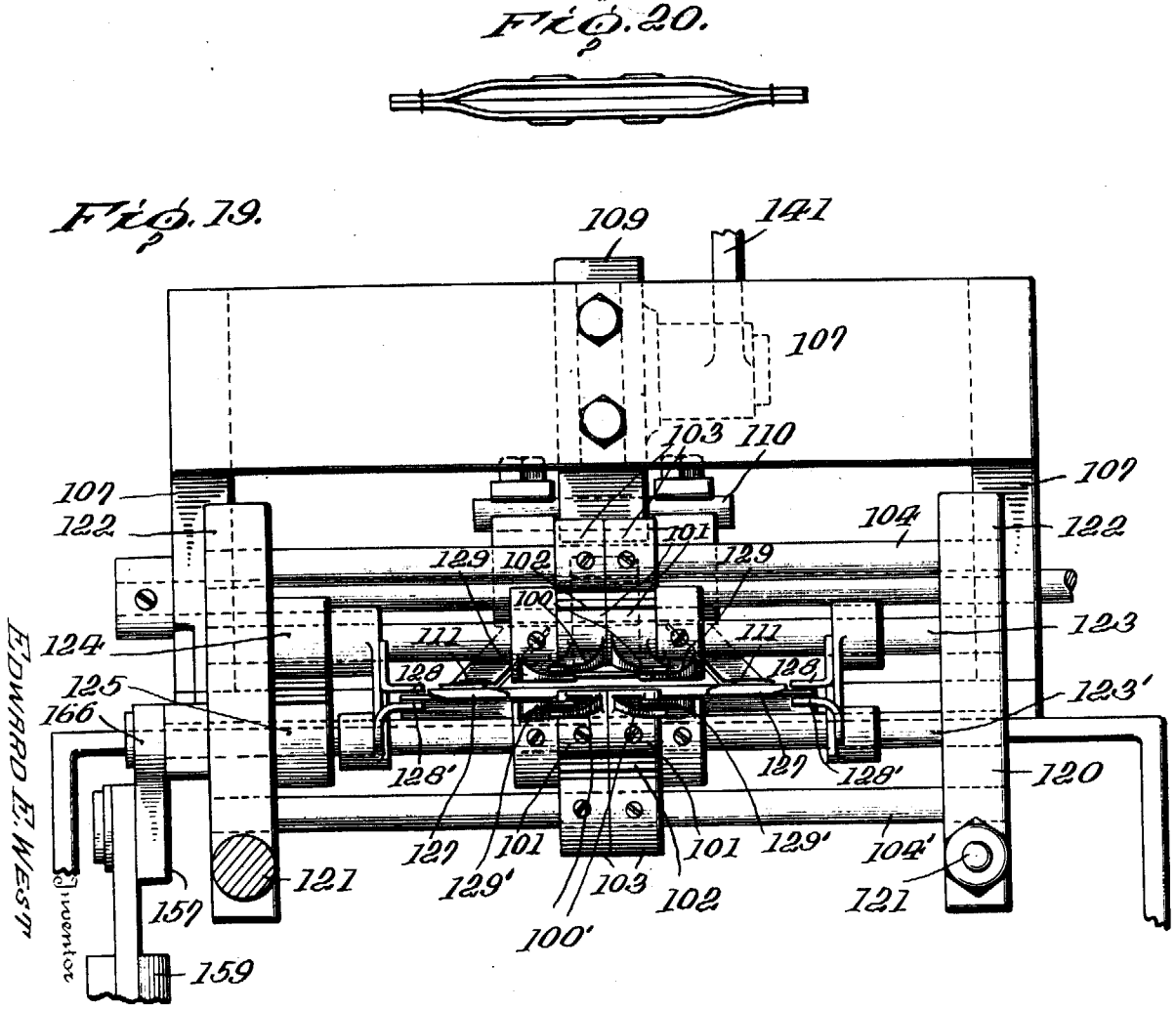

BAG MAKING, STRINGING AND TAGGING MACHINE
Original Filed Jan. 10, 1939 42 Sheets-Sheet 15
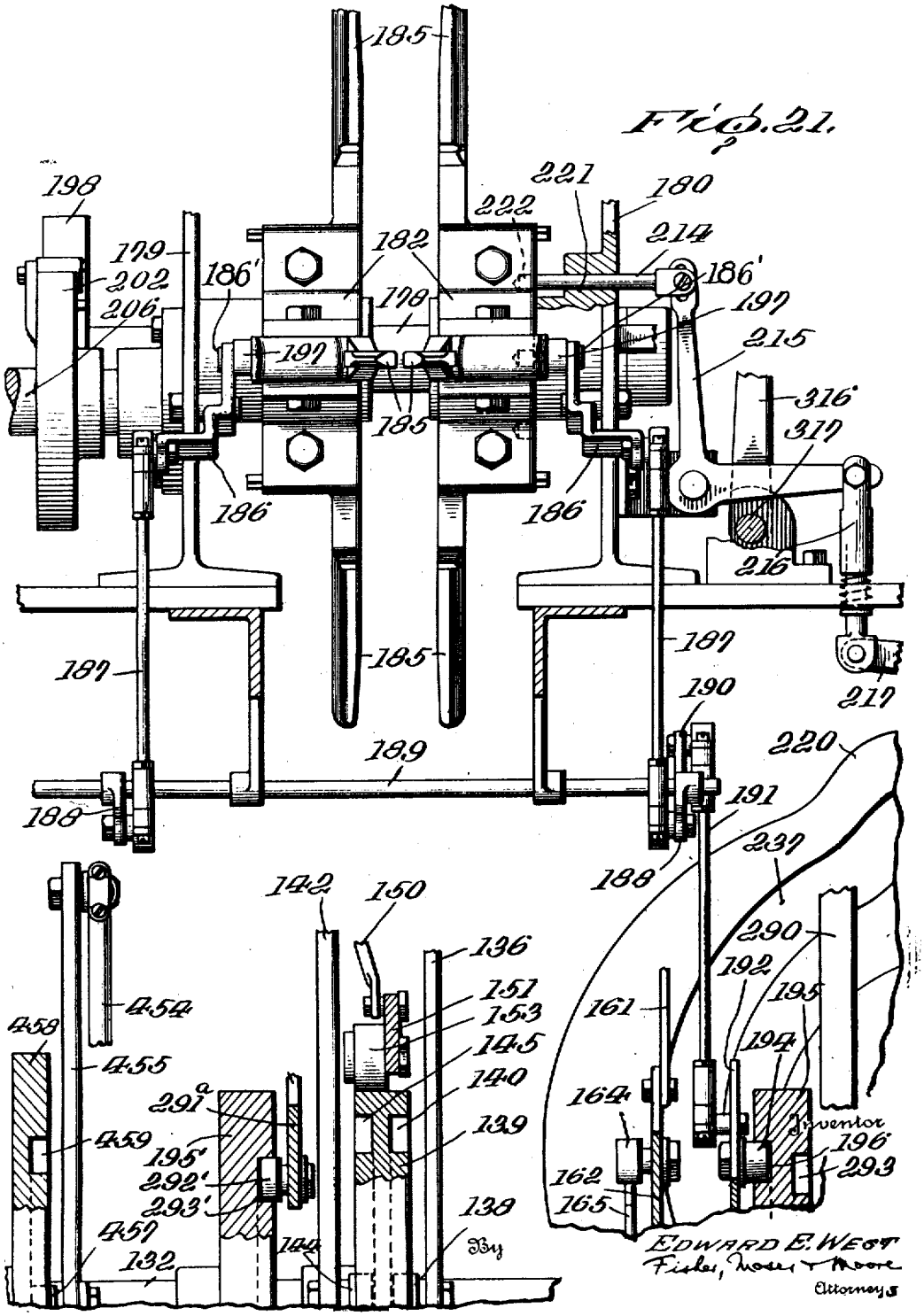

BAG MAKING, STRINGING AND TAGGING MACHINE

Original Filed Jan. 10, 1939 42 Sheets-Sheet 16

BAG MAKING, STRINGING AND TAGGING MACHINE

Original Filed Jan. 10, 1939 42 Sheets-Sheet 17

Inventor
EDWARD E. WEST

Fisher, Moser & Moore
Attorneys

Jan. 23, 1945. E. E. WEST Re. 22,596

BAG MAKING, STRINGING AND TAGGING MACHINE

Original Filed Jan. 10, 1939 42 Sheets-Sheet 18

Inventor
EDWARD E. WEST

By Fisher, Moser & Moore
Attorneys

BAG MAKING, STRINGING AND TAGGING MACHINE
Original Filed Jan. 10, 1939 42 Sheets-Sheet 19
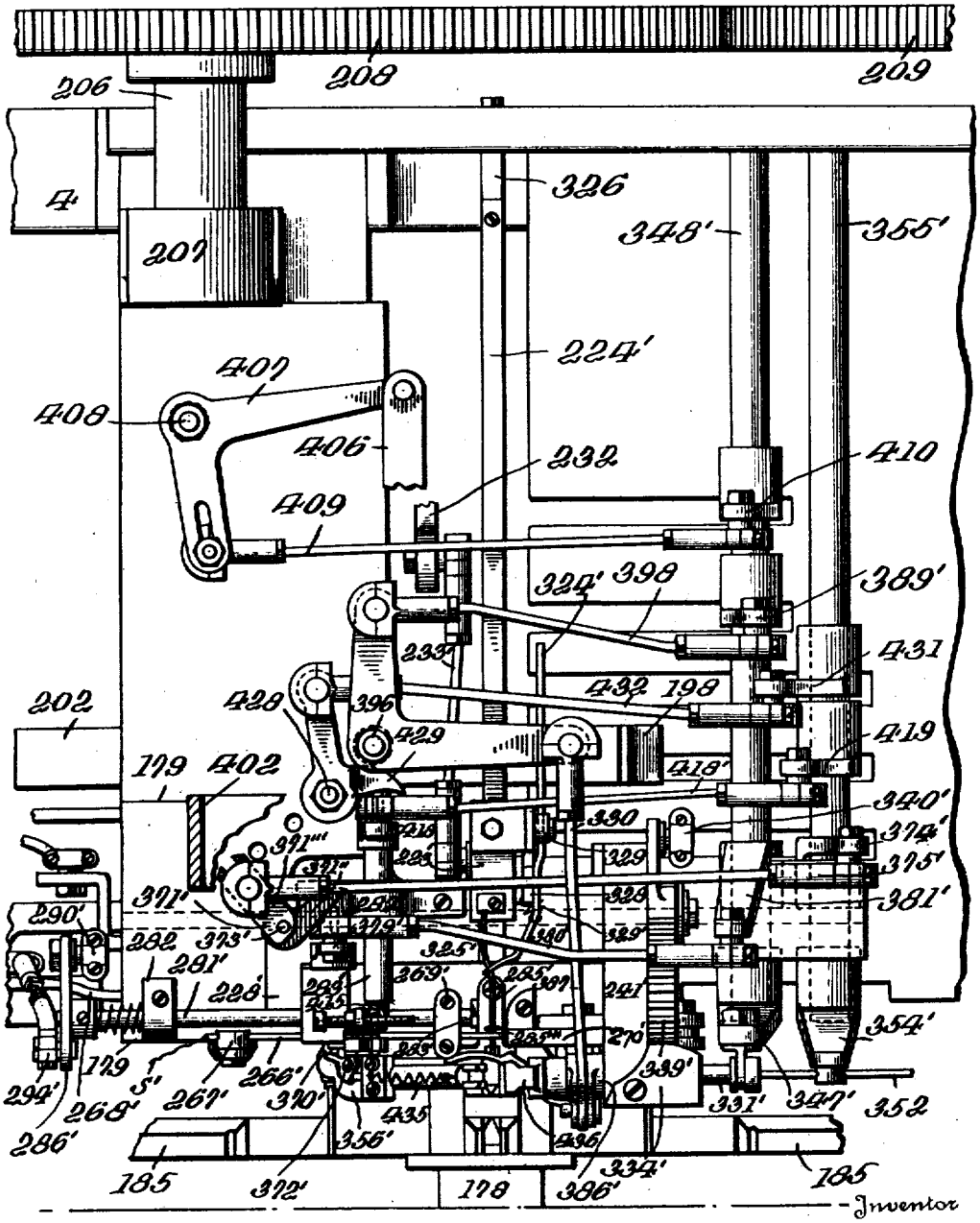
Inventor
FIG. 24. EDWARD E. WEST
By Fisher, Moore & Moore
Attorneys

BAG MAKING, STRINGING AND TAGGING MACHINE

Original Filed Jan. 10, 1939 42 Sheets-Sheet 20

Inventor

EDWARD E. WEST

By

Fisher, Moore & Moore

Attorneys

BAG MAKING, STRINGING AND TAGGING MACHINE
Original Filed Jan. 10, 1939 42 Sheets-Sheet 21
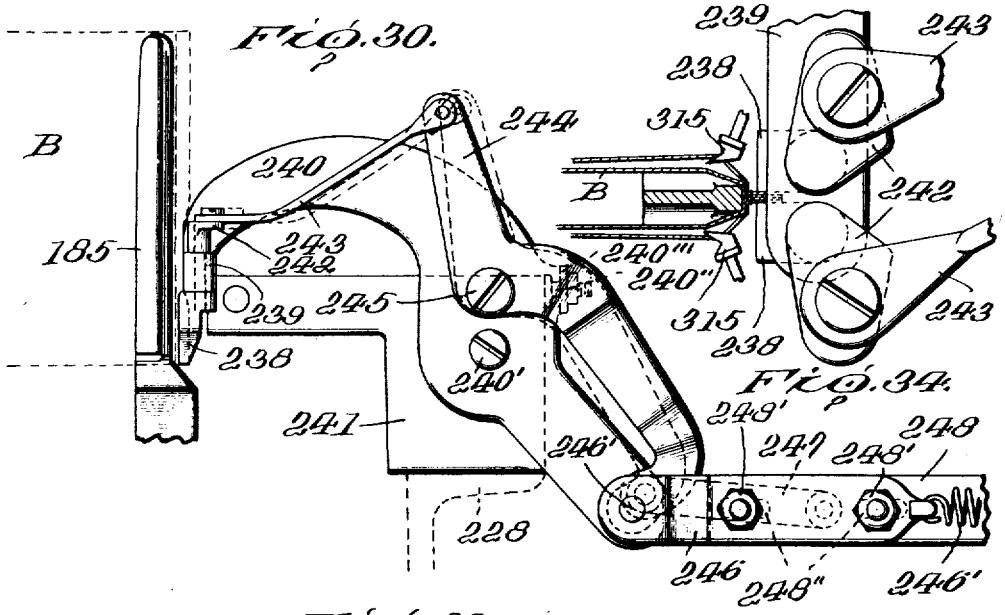
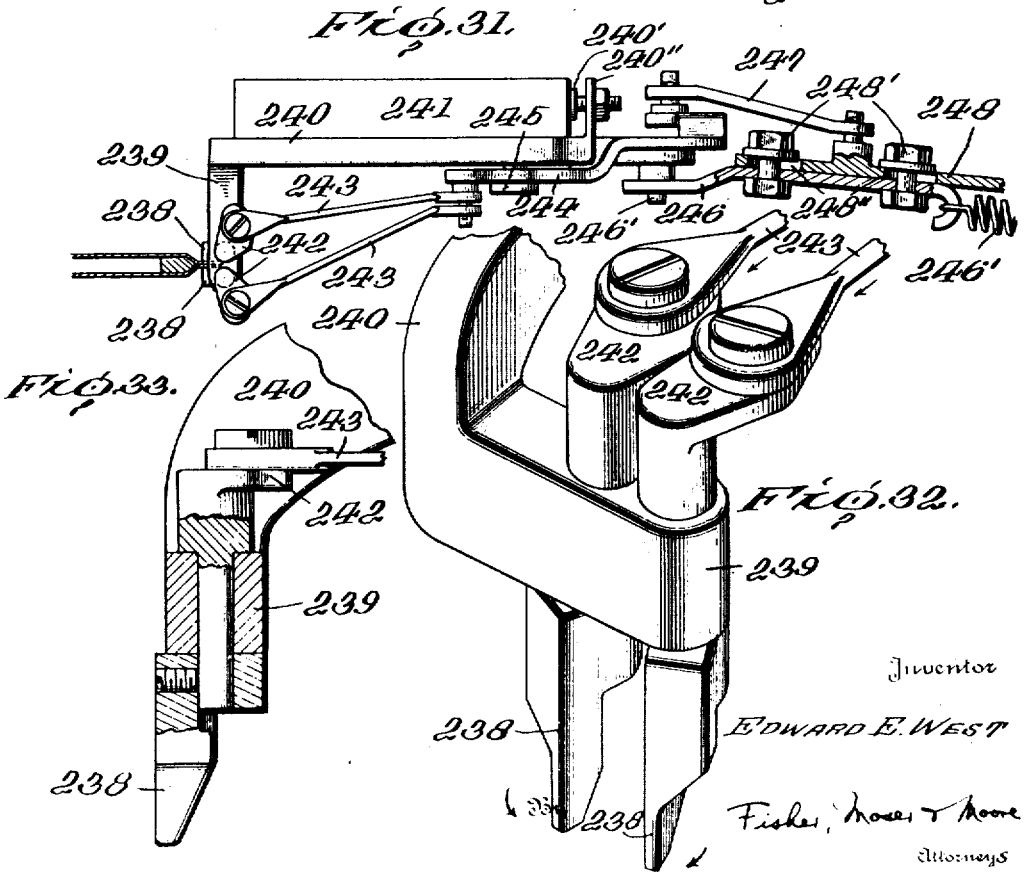
Inventor
EDWARD E. WEST
Fisher, Moser & Moore
Attorneys BAG MAKING, STRINGING AND TAGGING MACHINE
Original Filed Jan. 10, 1939 42 Sheets-Sheet 22
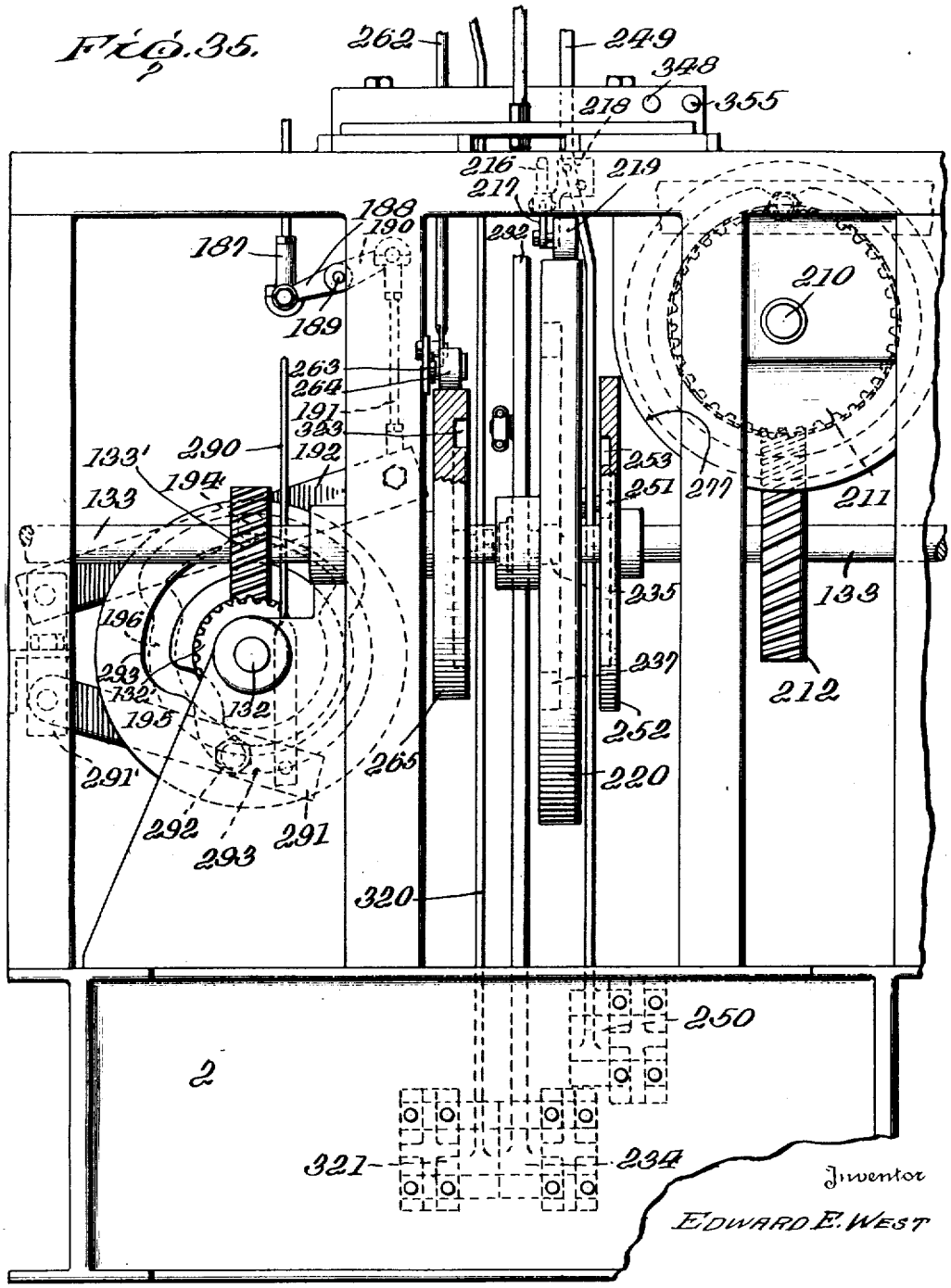
Inventor
EDWARD E. WEST
By
Fisher, Moser & Moore
Attorneys BAG MAKING, STRINGING AND TAGGING MACHINE
Original Filed Jan. 10, 1939 42 Sheets-Sheet 23
Fig. 36.
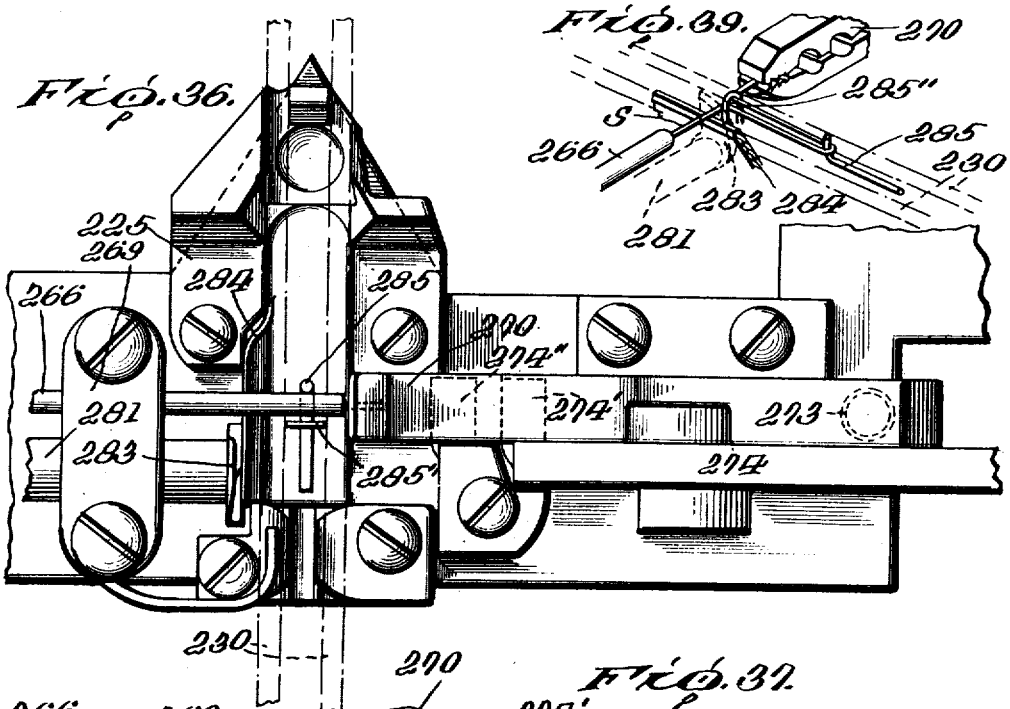
Fig. 39.
Fig. 37.
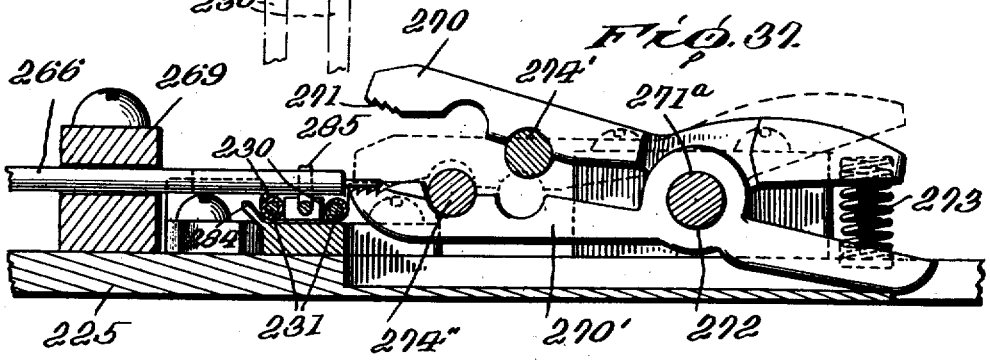
Fig. 38.
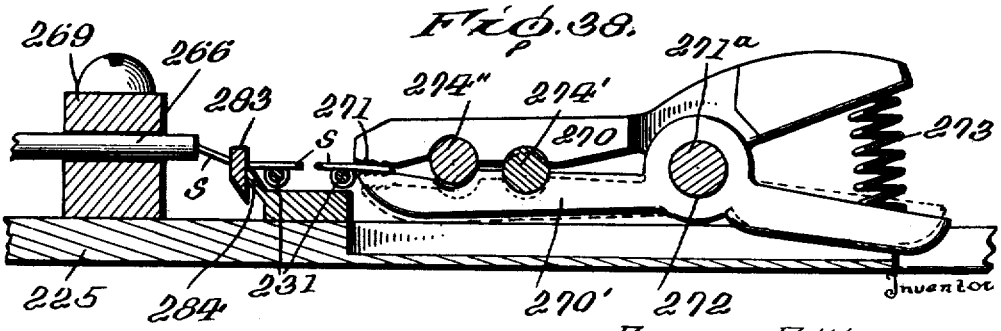
Inventor
EDWARD E. WEST
By Fisher, Moser & Moore
Attorneys BAG MAKING, STRINGING AND TAGGING MACHINE
Original Filed Jan. 10, 1939 42 Sheets-Sheet 24
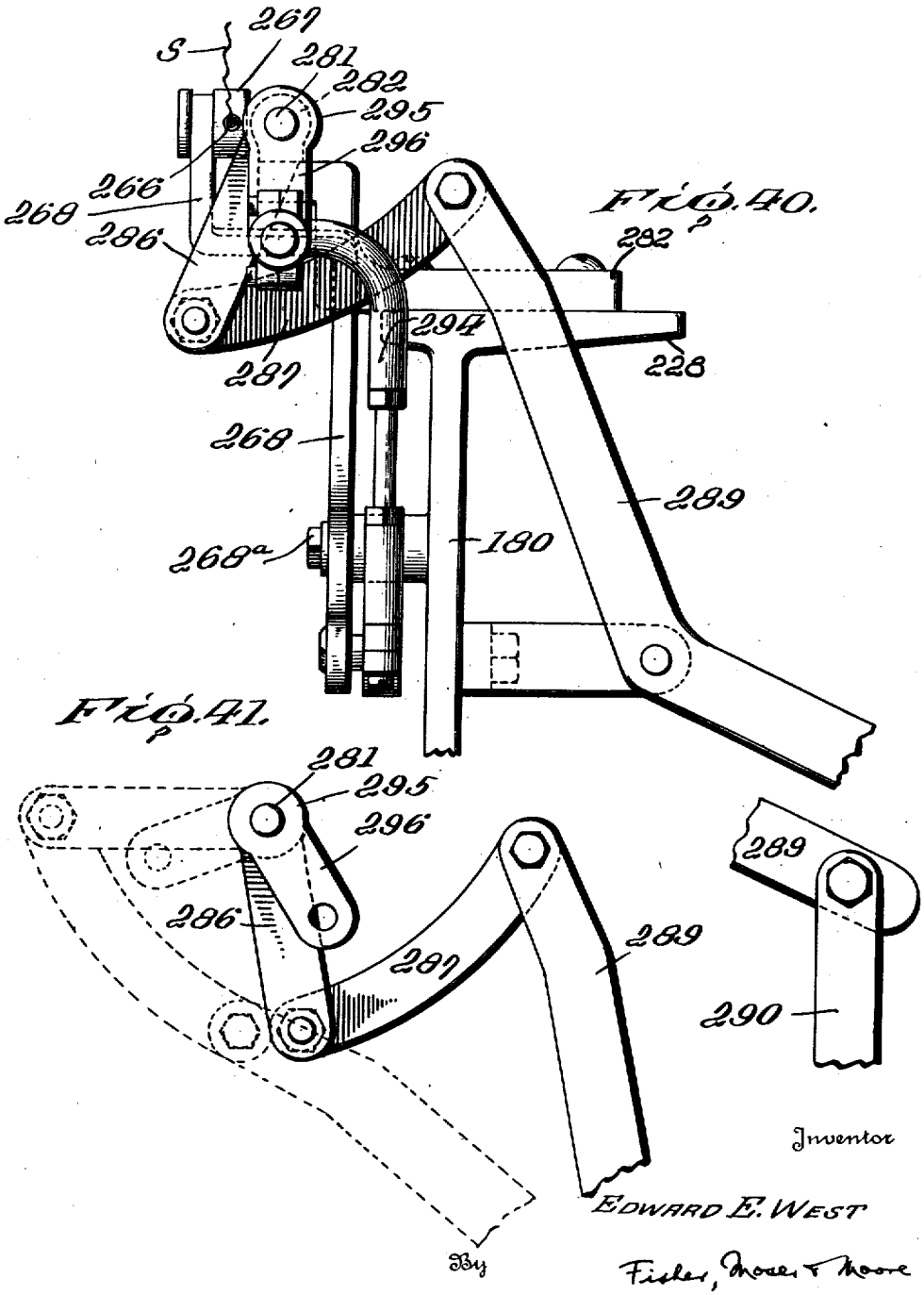
Inventor
EDWARD E. WEST
By Fisher, Moser & Moore
Attorneys Jan. 23, 1945. E. E. WEST Re. 22,596

BAG MAKING, STRINGING AND TAGGING MACHINE

Original Filed Jan. 10, 1939 42 Sheets-Sheet 25

Inventor
Howard E. West

Fisher, Moore & Moore
Attorneys

Jan. 23, 1945. E. E. WEST Re. 22,596

BAG MAKING, STRINGING AND TAGGING MACHINE

Original Filed Jan. 10, 1939 42 Sheets-Sheet 26

Inventor
EDWARD E. WEST

By Fisher, Moser & Moore
Attorneys

Jan. 23, 1945.

E. E. WEST

Re. 22,596

BAG MAKING, STRINGING AND TAGGING MACHINE

Original Filed Jan. 10, 1939 42 Sheets-Sheet 27

Inventor
EDWARD E. WEST

By Fisher, Moore & Moore
Attorneys

Jan. 23, 1945. E. E. WEST Re. 22,596
BAG MAKING, STRINGING AND TAGGING MACHINE
Original Filed Jan. 10, 1939 42 Sheets-Sheet 28
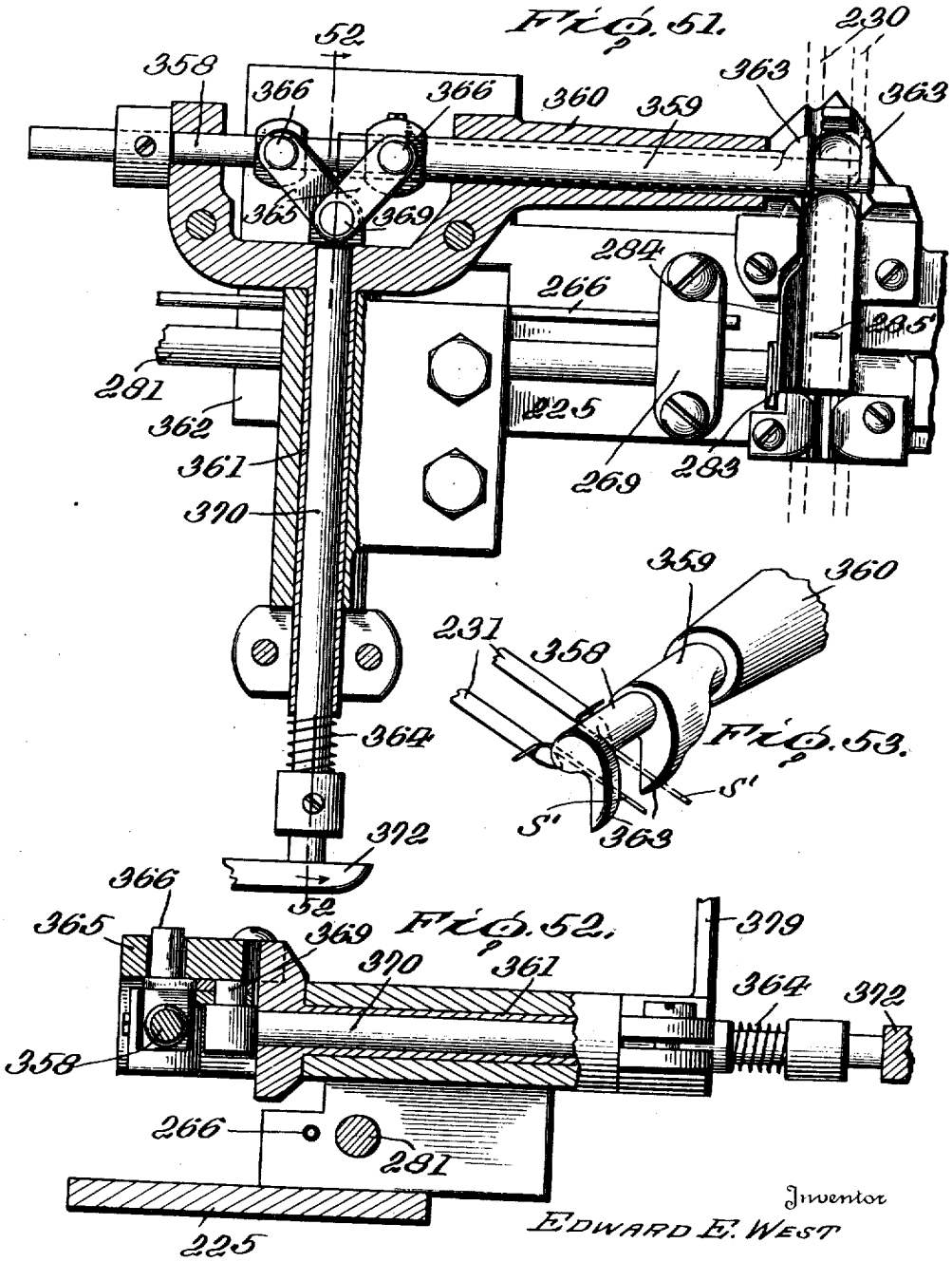
Inventor
EDWARD E. WEST
By Fisher, Moore & Moore
Attorneys Jan. 23, 1945. E. E. WEST Re. 22,596

BAG MAKING, STRINGING AND TAGGING MACHINE

Original Filed Jan. 10, 1939 42 Sheets-Sheet 29

Inventor
EDWARD E. WEST

By

Attorneys

Jan. 23, 1945. E. E. WEST Re. 22,596
BAG MAKING, STRINGING AND TAGGING MACHINE
Original Filed Jan. 10, 1939 42 Sheets-Sheet 30
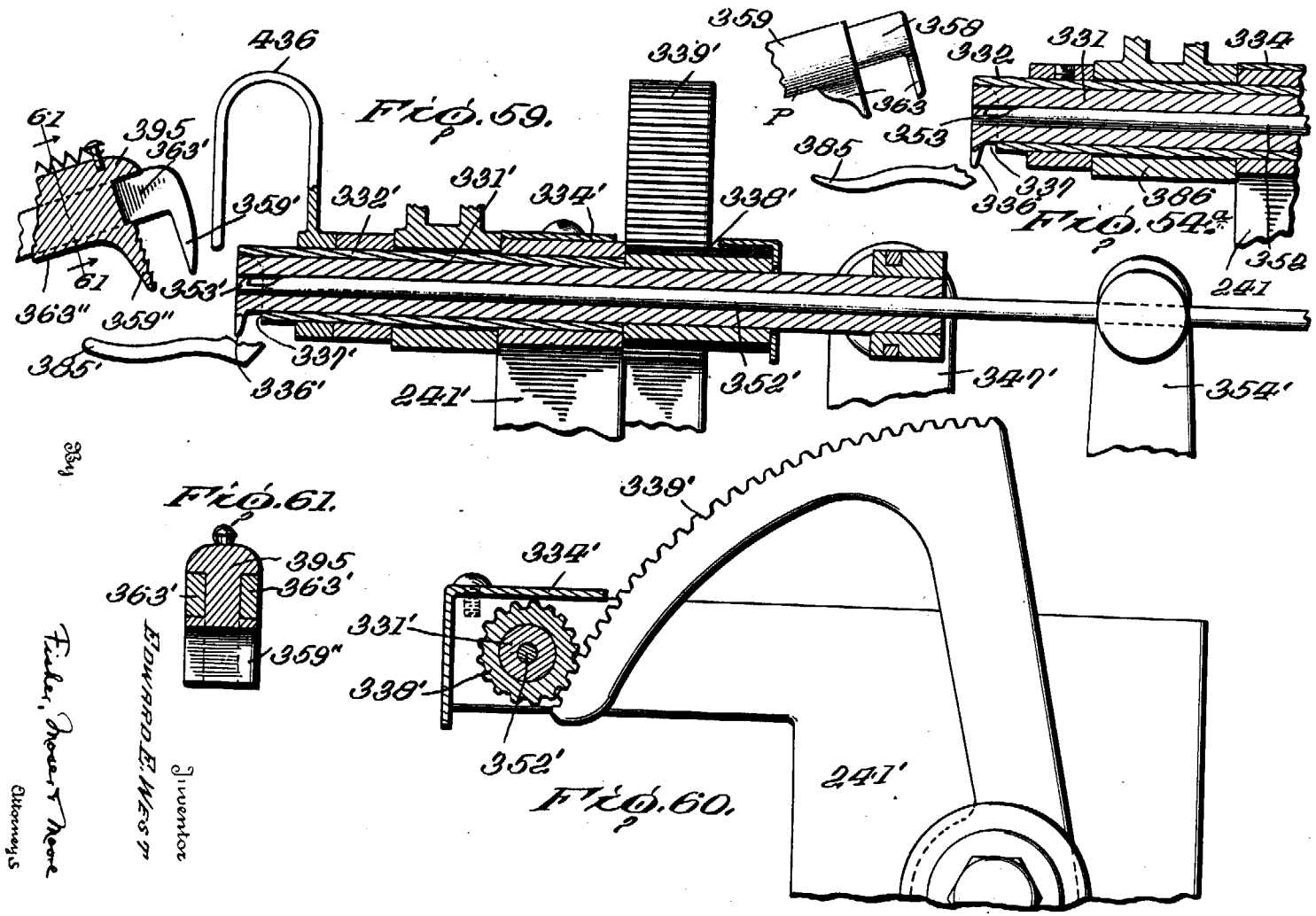

BAG MAKING, STRINGING AND TAGGING MACHINE
Original Filed Jan. 10, 1939 42 Sheets-Sheet 31
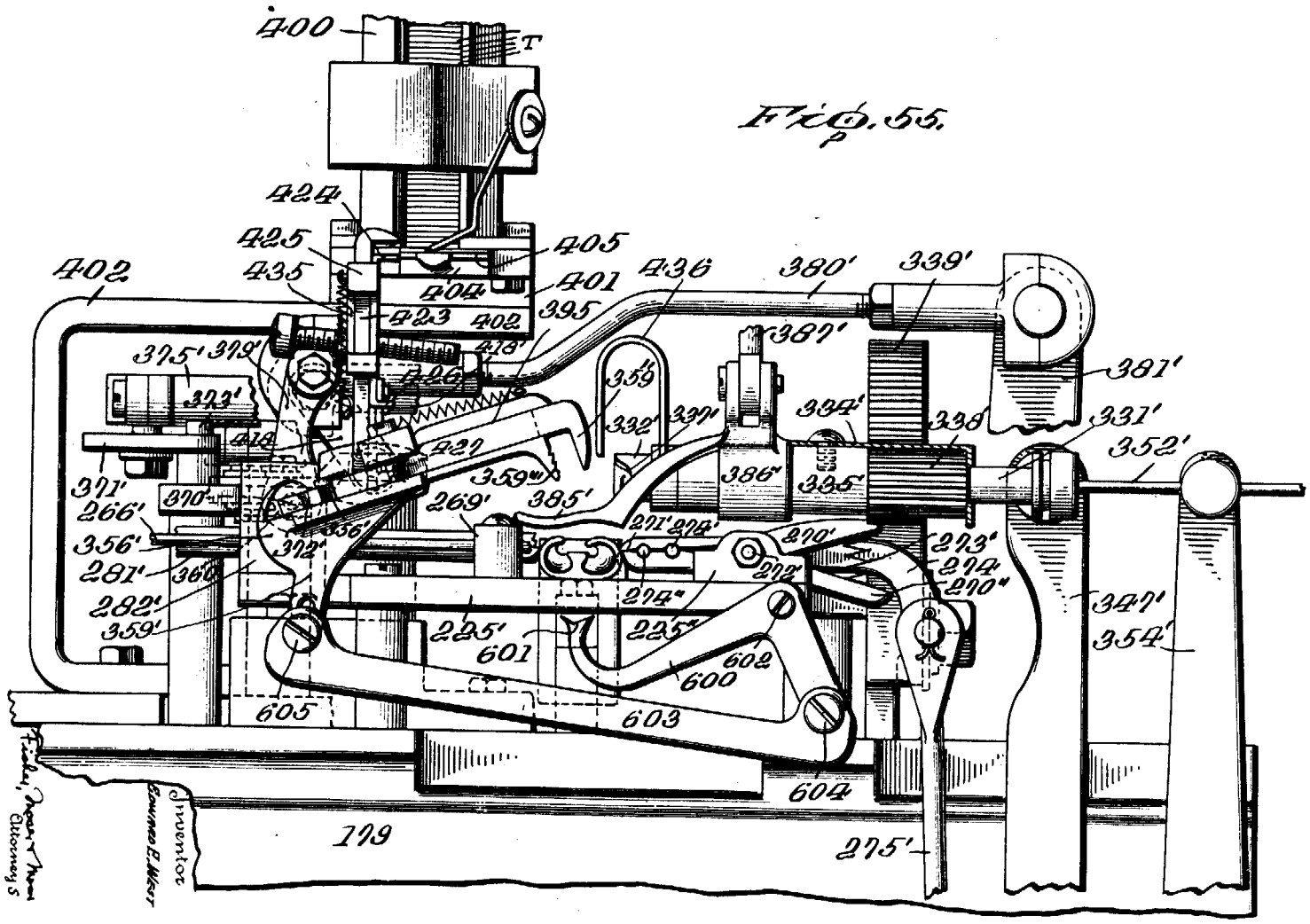

Jan. 23, 1945.

E. E. WEST

Re. 22,596

BAG MAKING, STRINGING AND TAGGING MACHINE

Original Filed Jan. 10, 1939 42 Sheets-Sheet 32

Inventor
EDWARD E. WEST

By Fisher, Moser & Moore
Attorneys

BAG MAKING, STRINGING AND TAGGING MACHINE
Original Filed Jan. 10, 1939 42 Sheets-Sheet 33
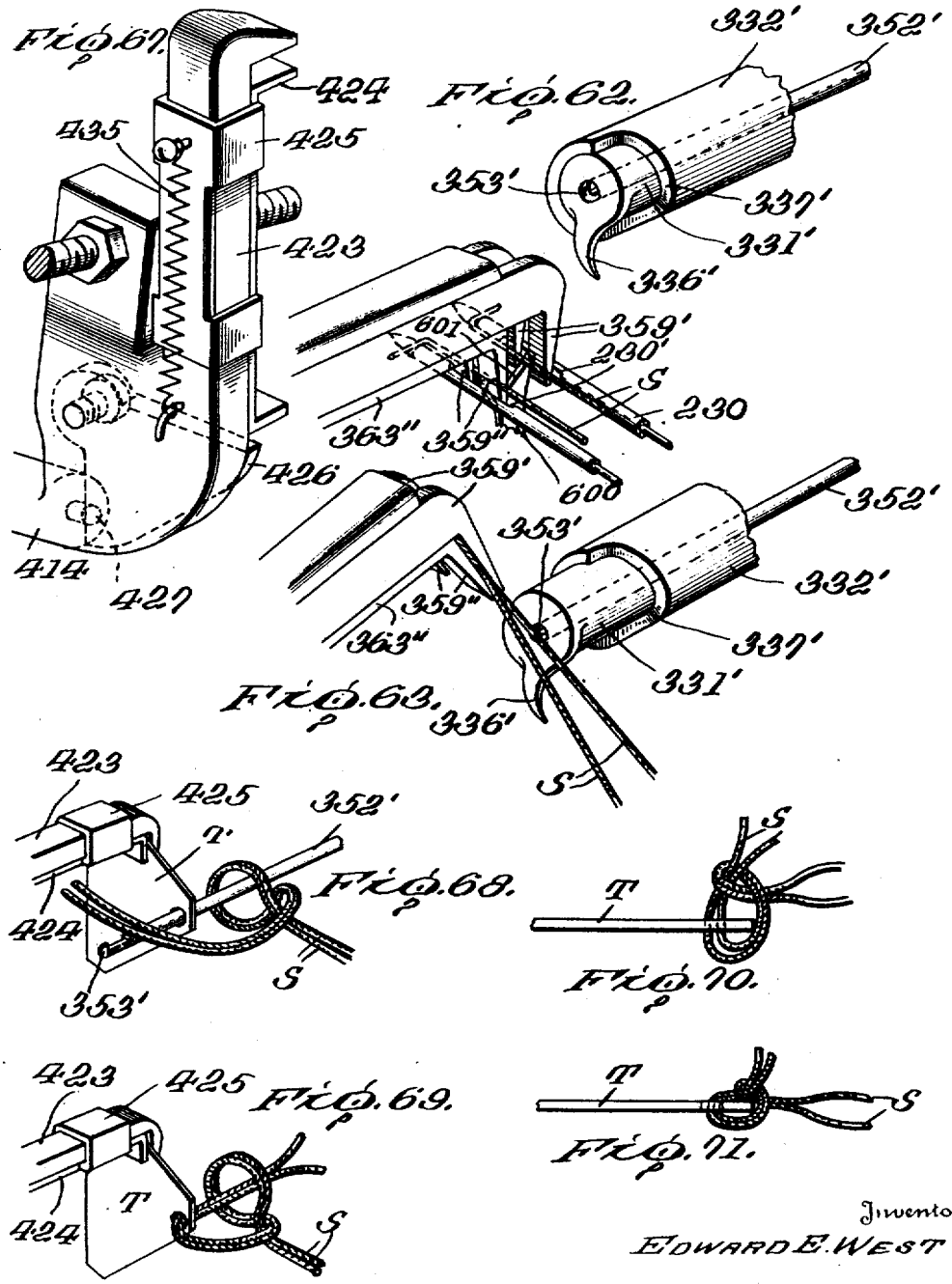
Inventor
EDWARD E. WEST
By Fisher, Moore & Moore
Attorneys

BAG MAKING, STRINGING AND TAGGING MACHINE

Original Filed Jan. 10, 1939 42 Sheets-Sheet 34

Inventor

EDWARD E. WEST

By

Fisher, Moser & Moore

Attorneys

BAG MAKING, STRINGING AND TAGGING MACHINE
Original Filed Jan. 10, 1939 42 Sheets-Sheet 35.
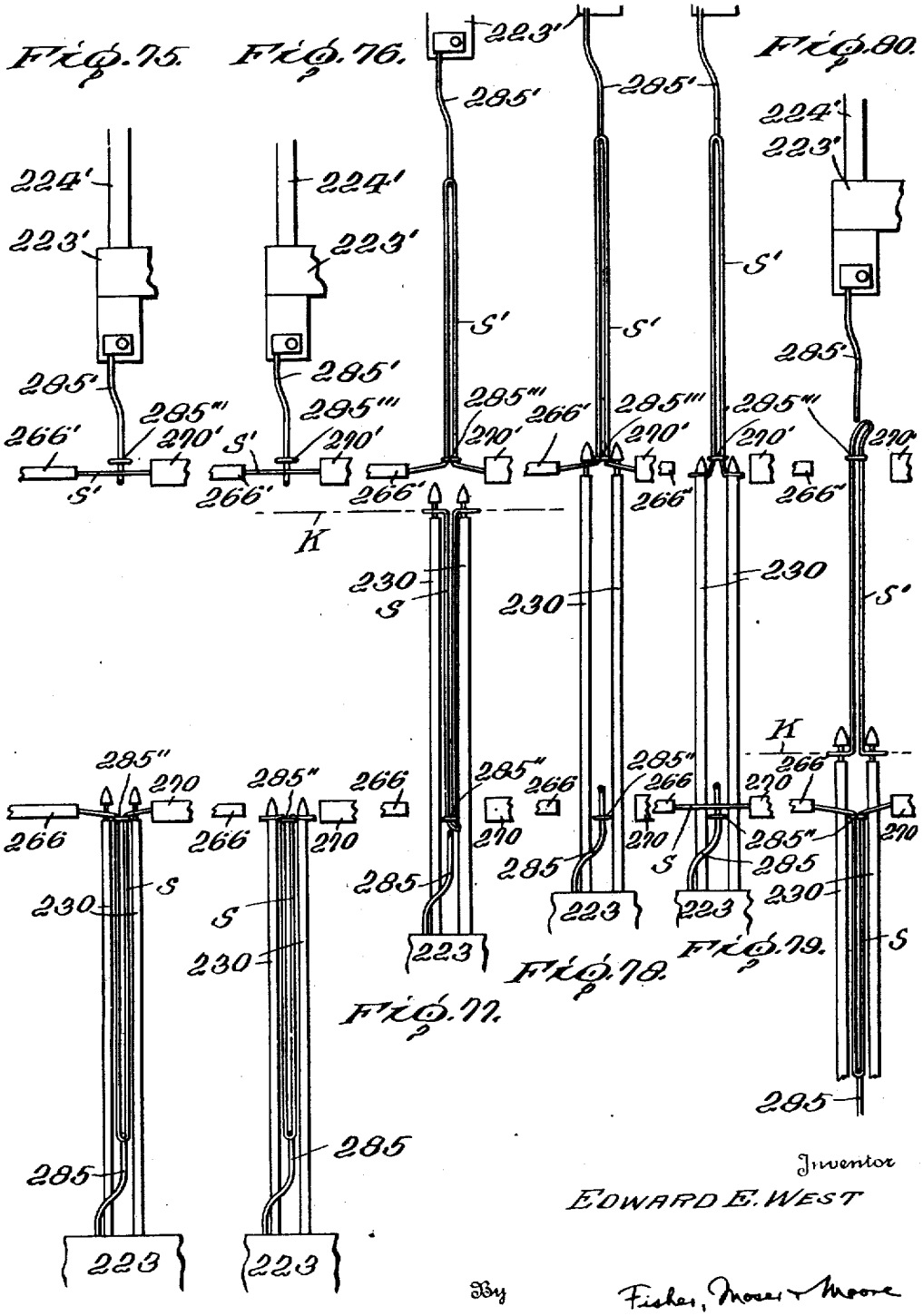
Inventor
EDWARD E. WEST
By Fisher, Moser & Moore
Attorneys

BAG MAKING, STRINGING AND TAGGING MACHINE

Original Filed Jan. 10, 1939 42 Sheets-Sheet 36

Inventor

EDWARD E. WEST

By

Fisher, Moore & Moore

Attorneys

Jan. 23, 1945. E. E. WEST Re. 22,596
BAG MAKING, STRINGING AND TAGGING MACHINE
Original Filed Jan. 10, 1939 42 Sheets-Sheet 37
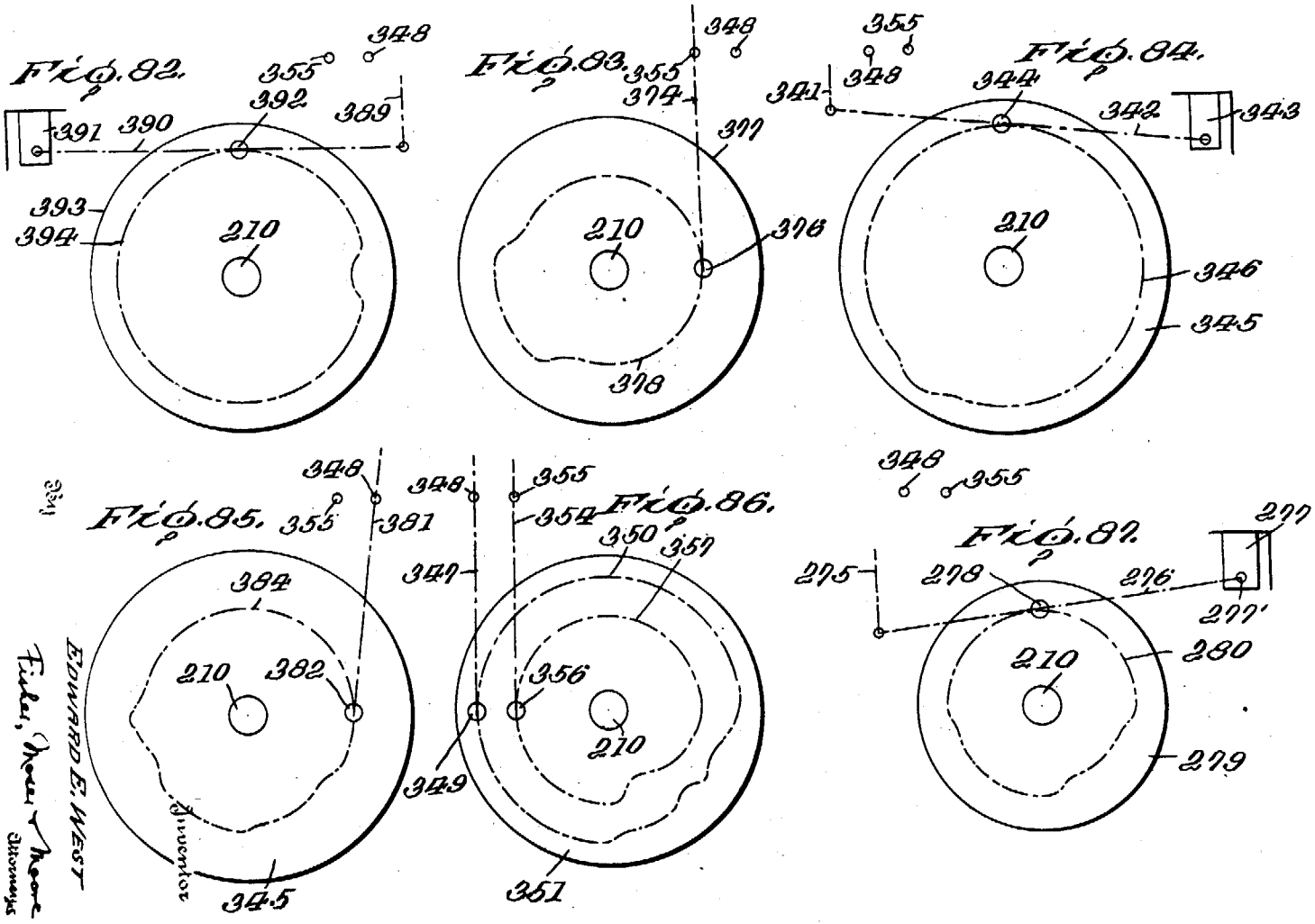

Jan. 23, 1945. E. E. WEST Re. 22,596
BAG MAKING, STRINGING AND TAGGING MACHINE
Original Filed Jan. 10, 1939 42 Sheets-Sheet 38
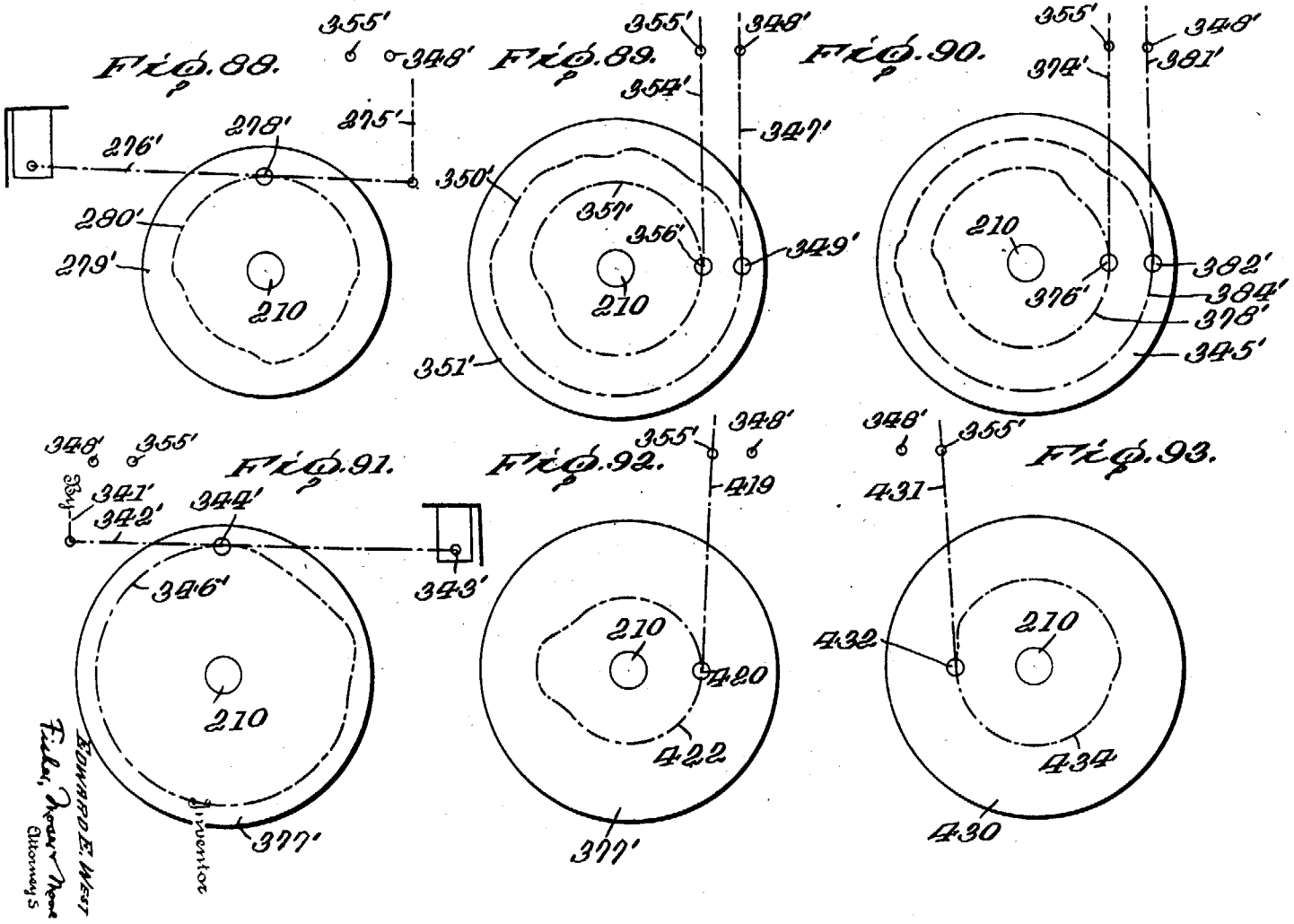

BAG MAKING, STRINGING AND TAGGING MACHINE
Original Filed Jan. 10, 1939 42 Sheets-Sheet 39
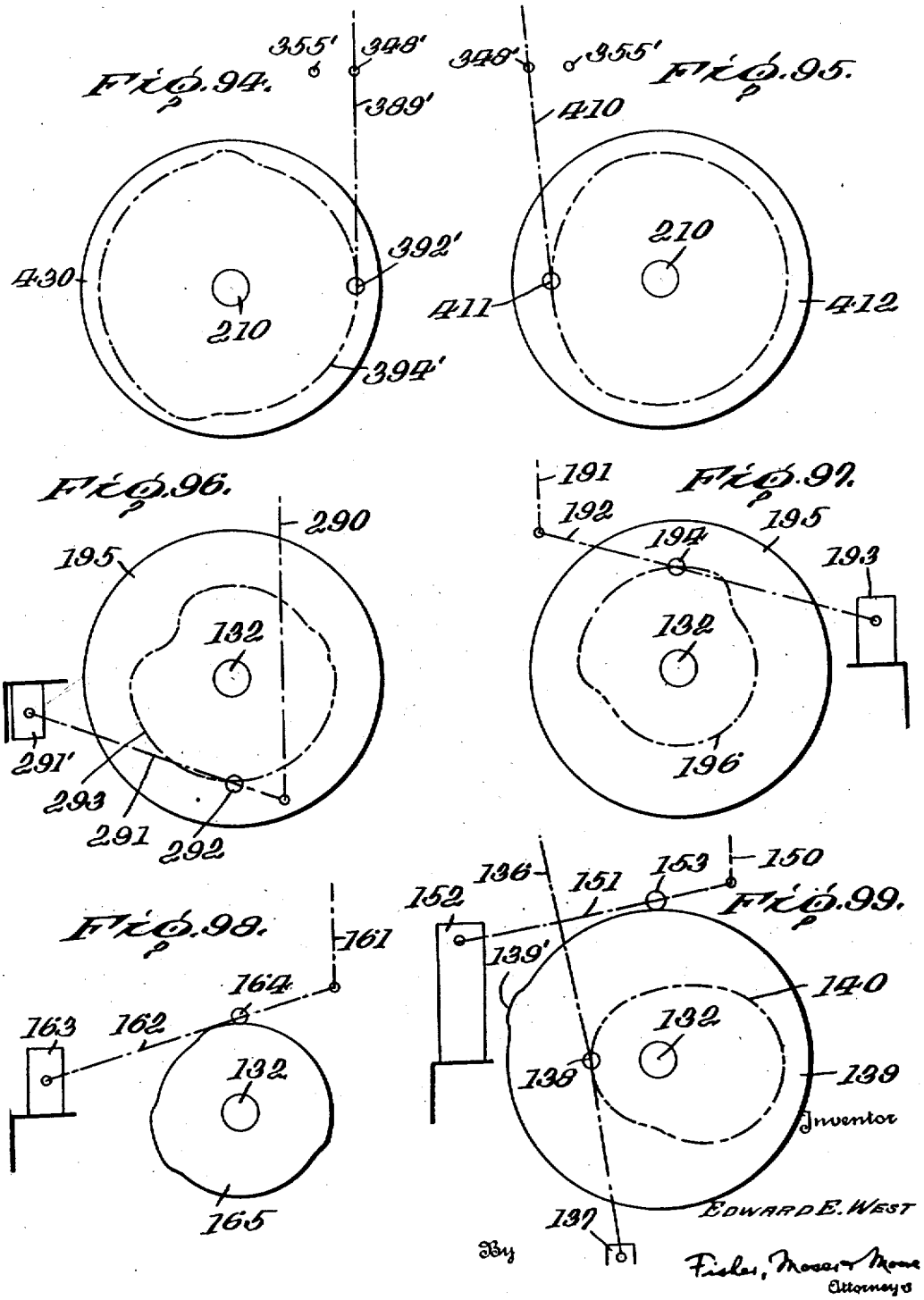

BAG MAKING, STRINGING AND TAGGING MACHINE
Original Filed Jan. 10, 1939 42 Sheets-Sheet 40
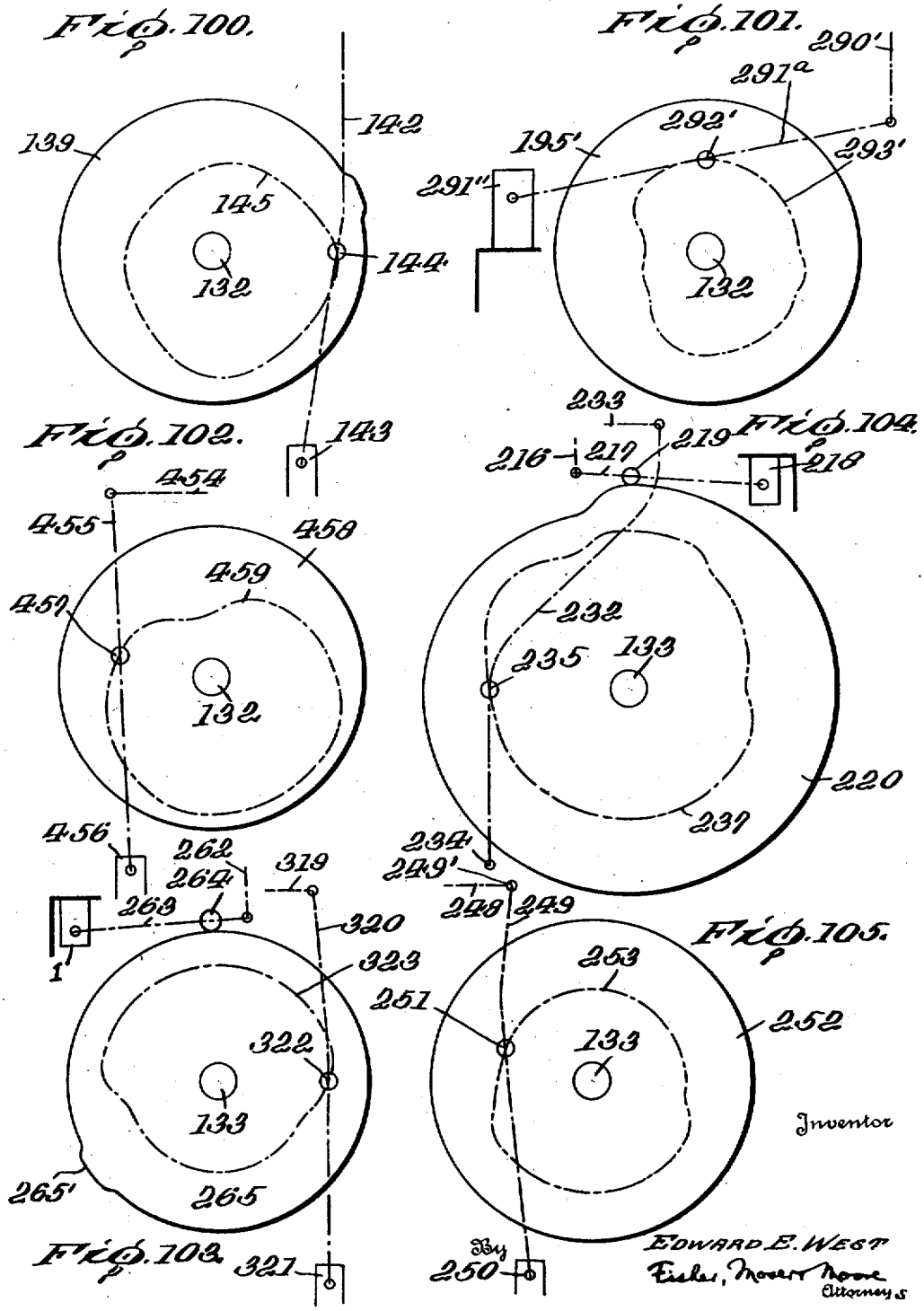

Jan. 23, 1945. E. E. WEST Re. 22,596
BAG MAKING, STRINGING AND TAGGING MACHINE
Original Filed Jan. 10, 1939 42 Sheets-Sheet 41
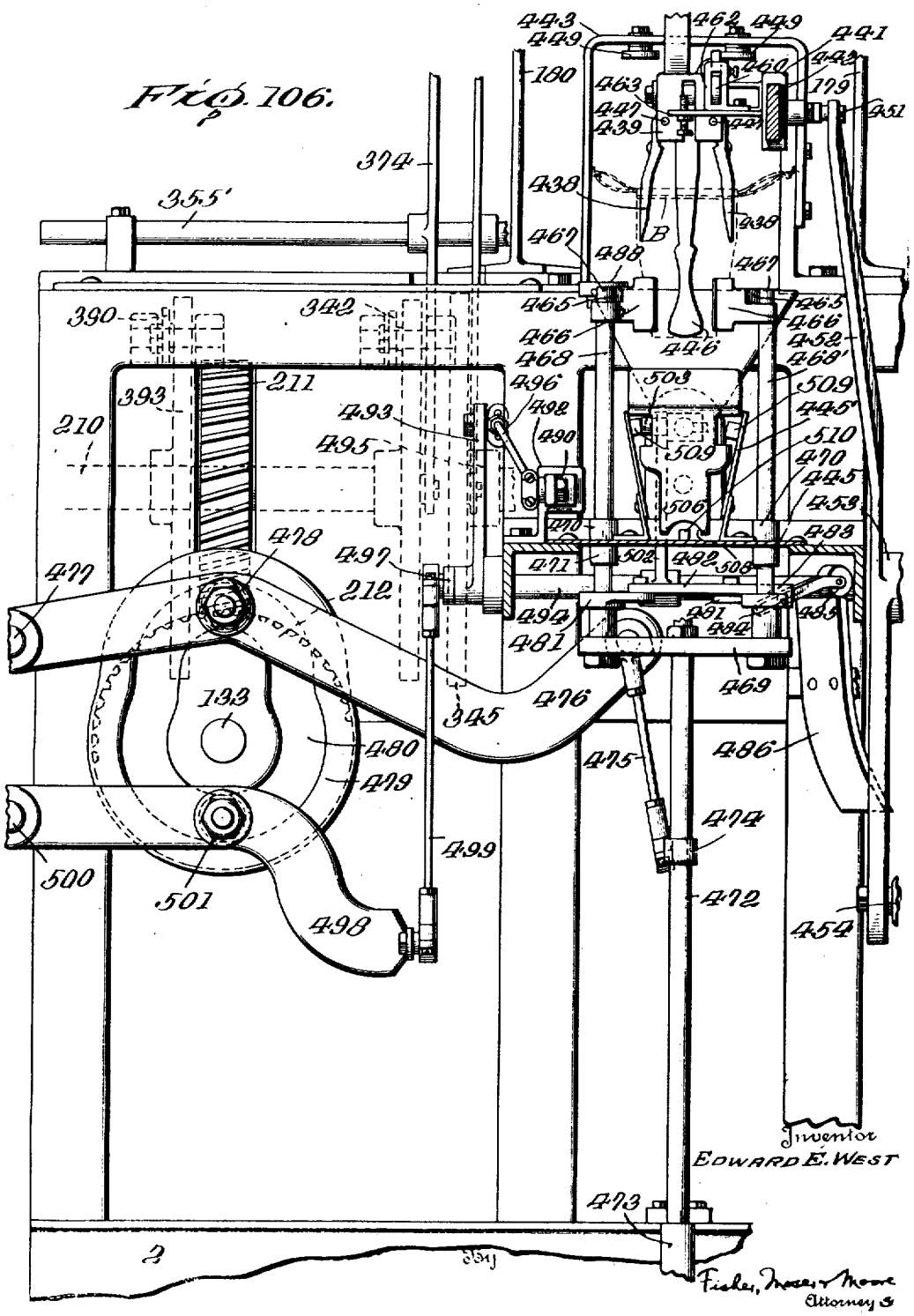

Jan. 23, 1945. E. E. WEST Re. 22,596

BAG MAKING, STRINGING AND TAGGING MACHINE

Original Filed Jan. 10, 1939 42 Sheets-Sheet 42

Inventor

EDWARD E. WEST

By

Fisher, Moore & Moore

Attorneys

Reissued Jan. 23, 1945

Re. 22,596

UNITED STATES PATENT OFFICE 22,596

BAG MAKING, STRINGING, AND TAGGING MACHINE

Edward E. West, Richmond, Va.

Original No. 2,274,622, dated February 24, 1942, Serial No. 250,223, January 10, 1939. Application for reissue December 11, 1942, Serial No. 469,042

68 Claims. (Cl. 112—10)

The present invention relates to a machine for automatically forming hemmed bags from a continuous strip of fabric, inserting draw strings in the hems and attaching a tag to the completed bag.

The principal object of this invention is to provide a machine particularly adapted for forming tobacco bags and the like, providing the mouth end of the bags with draw strings, and attaching tags or tabs to the said draw strings.

A further object is to provide a machine of the class referred to which will effectively, uniformly and speedily form, string and tag tobacco bags and the like, wherein the successive means for accomplishing these operations are in timed relation with respect to each other whereby they constitute in effect one continuous and synchronized operation.

Another object is the provision of novel means for accurately maintaining the proper relative position of the oppositely disposed sides of the hems as the folded fabric strip and bag lengths pass through the bag making portion of the machine.

A still further object is to provide automatic means for stopping the machine when the bag hems get out of alinement.

Another object is to provide improved means for feeding the bag lengths to the side seamers.

A further object is the provision of an improved automatic means for feeding the formed bags onto the bag holding arms.

Another object is to provide an improved needle mechanism for stringing and knotting the mouth ends of the bags.

Another object is the provision of a novel, accurate and automatically operated tagging mechanism whereby tags or tabs are attached to the draw strings of the bag.

A still further object is the provision of an improved means for removing the strung and tagged bags from the bag holding arms and turning the bags right side out and delivering the same to a storage or transfer device.

These and other objects and advantages will be apparent as the specification is considered in connection with the accompanying drawings wherein:

Figure 6 is a fragmentary plan detail showing the bag length intermittent conveyor and pusher blade, the latter being in retracted position;

Figure 7 is a fragmentary plan view similar to Figure 6, but showing the pusher blade in advanced position;

Figure 9 is a detail section, partly broken away, through the strip folding member, creasing rolls and safety device;

Figure 16 is a plan view of the bag stringing and tagging portion of the combined bag making and stringing machine;

Figure 17 is a side elevation of the bag flank feeding and chain thread cutting mechanism;

Figure 18 is an enlarged sectional elevation of the bag chain thread cutters, feed pusher and hem clamping members;

Figure 22:
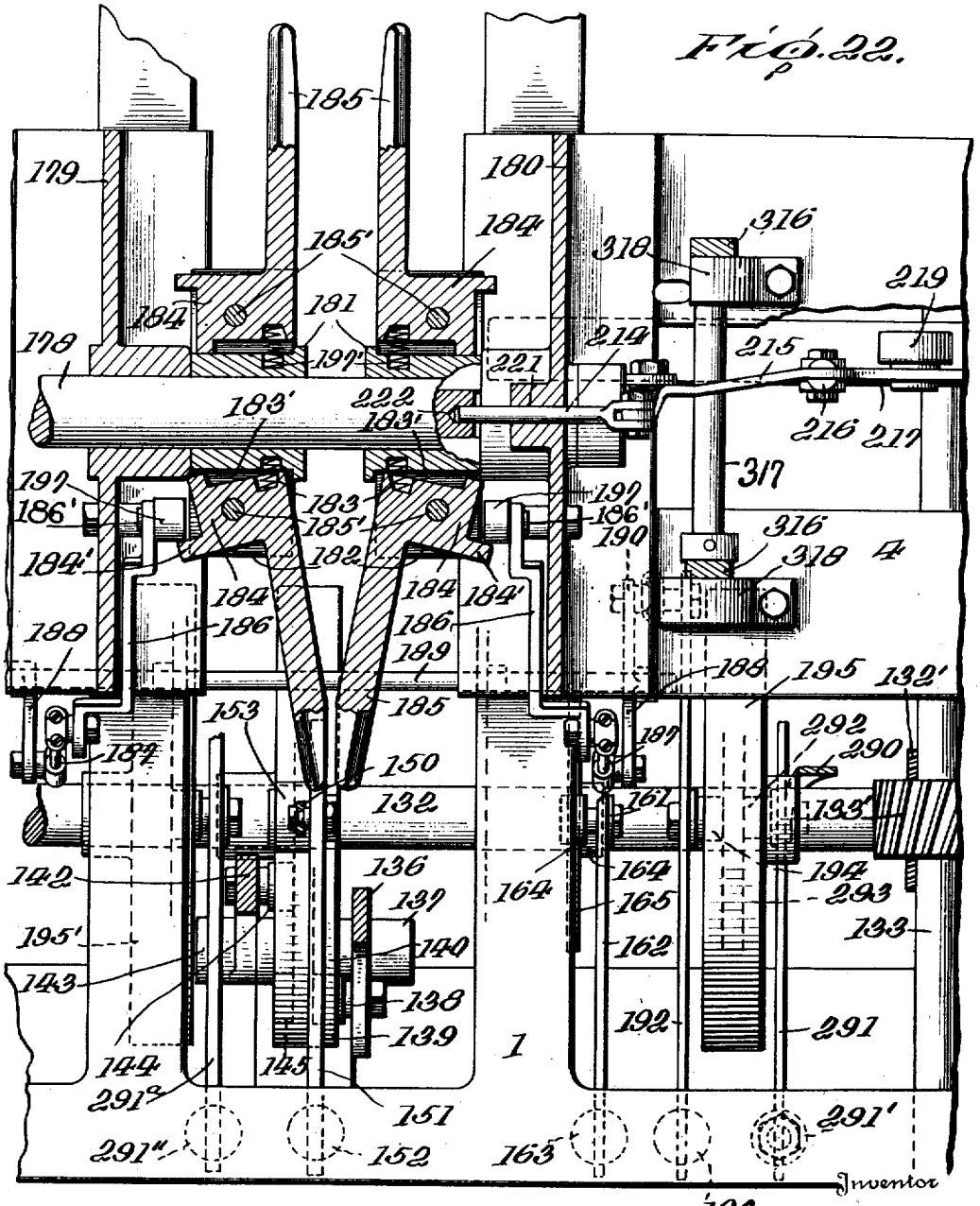
Figure 56:
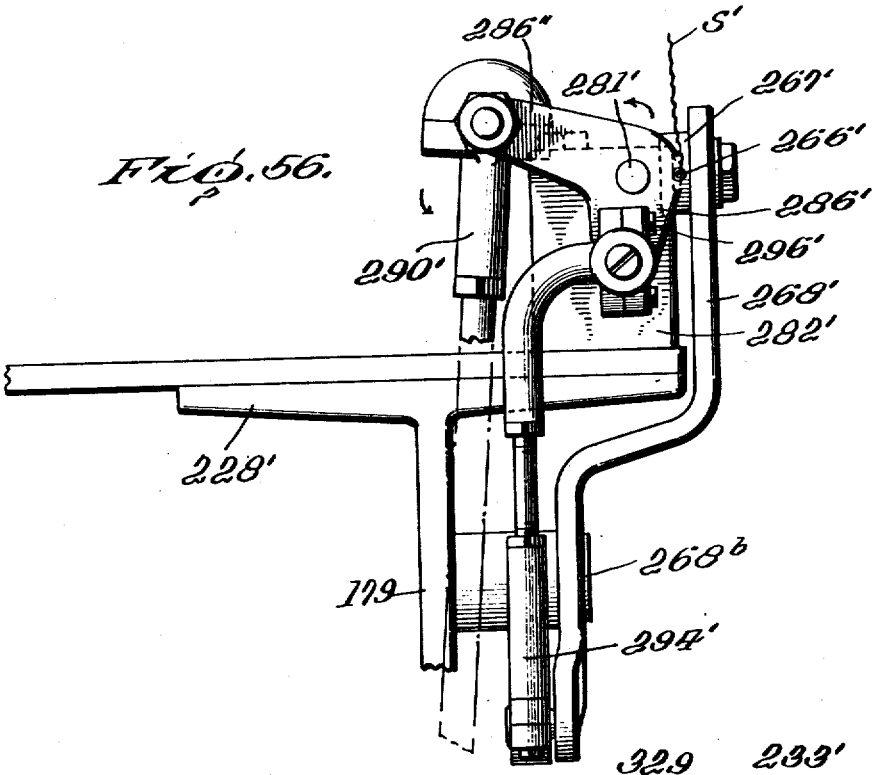
Figure 57:
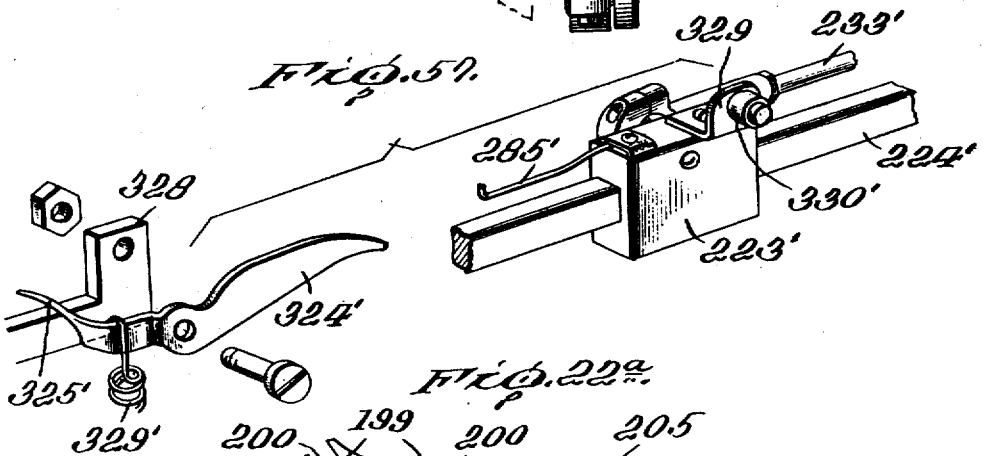
Figure 22A:
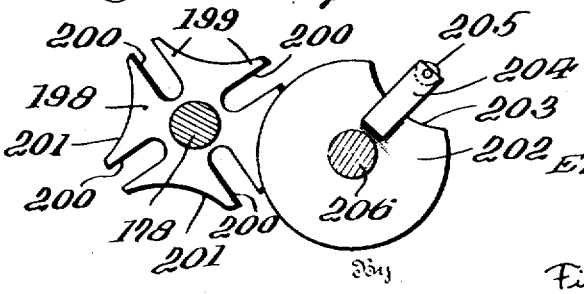
Figure 23:
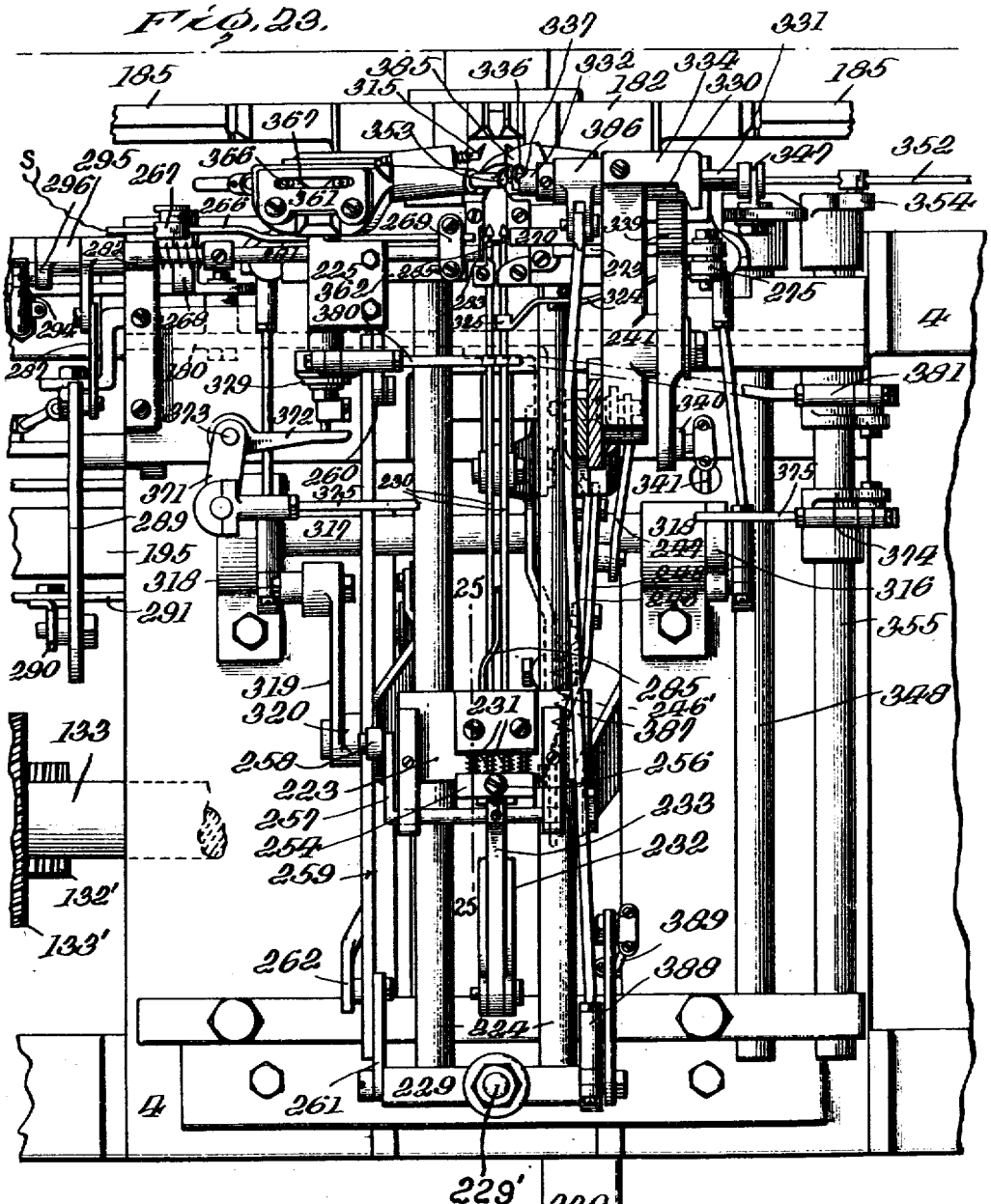
Figure 23A:
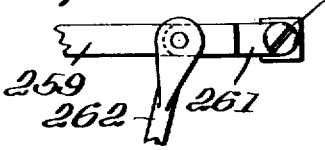
Figure 72:
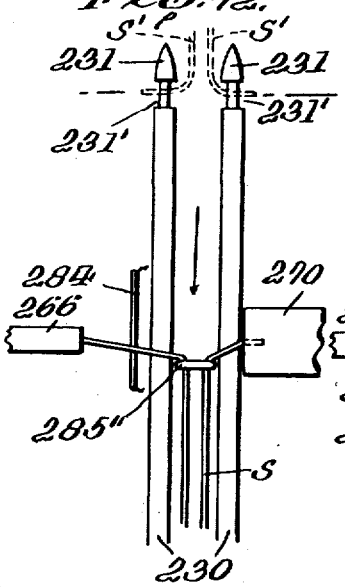
Figure 73:
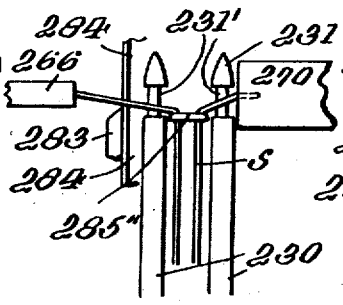
Figure 74:
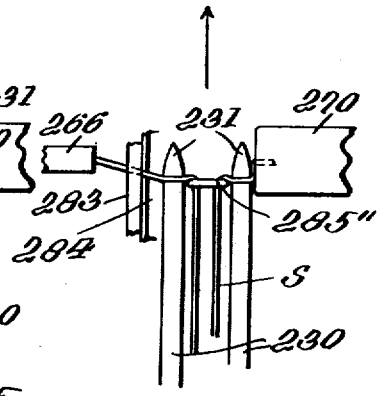
Figure 25:
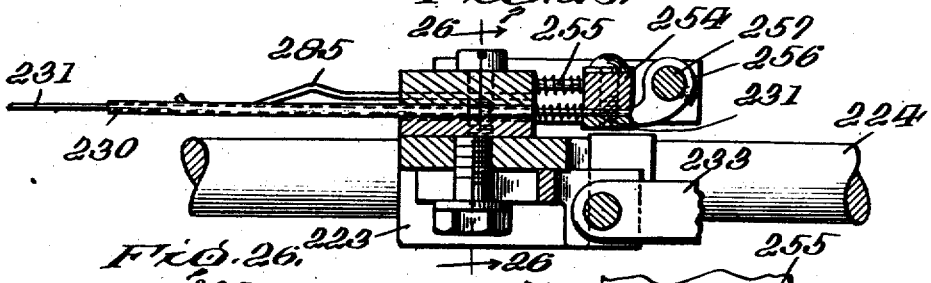
Figure 26:
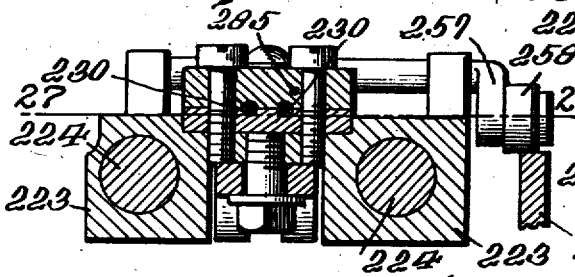
Figure 27:
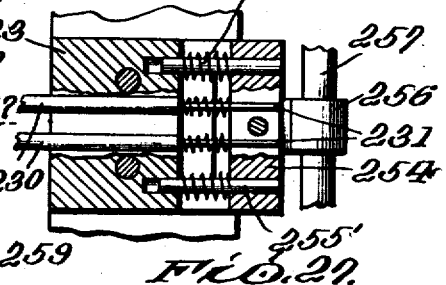
Figure 28:
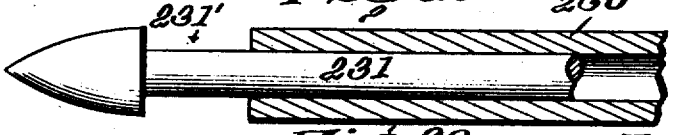
Figure 29:
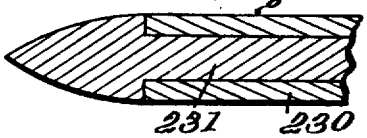
Figure 42:
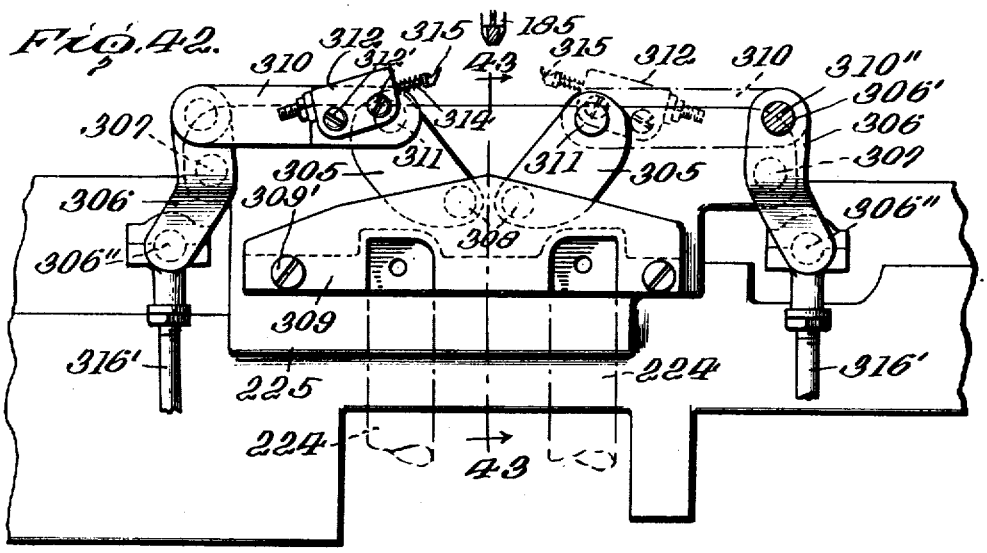
Figure 44:
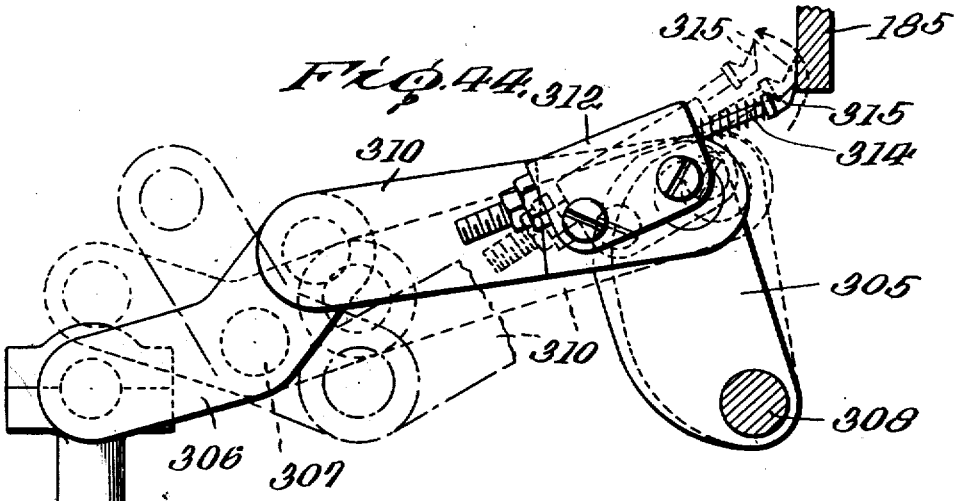
Figure 43:
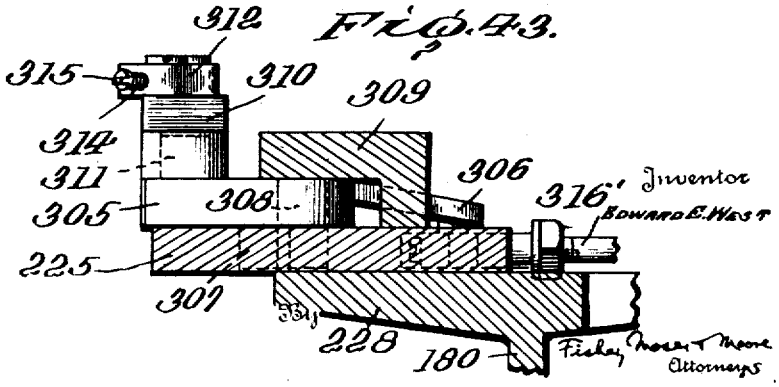
Figure 45:
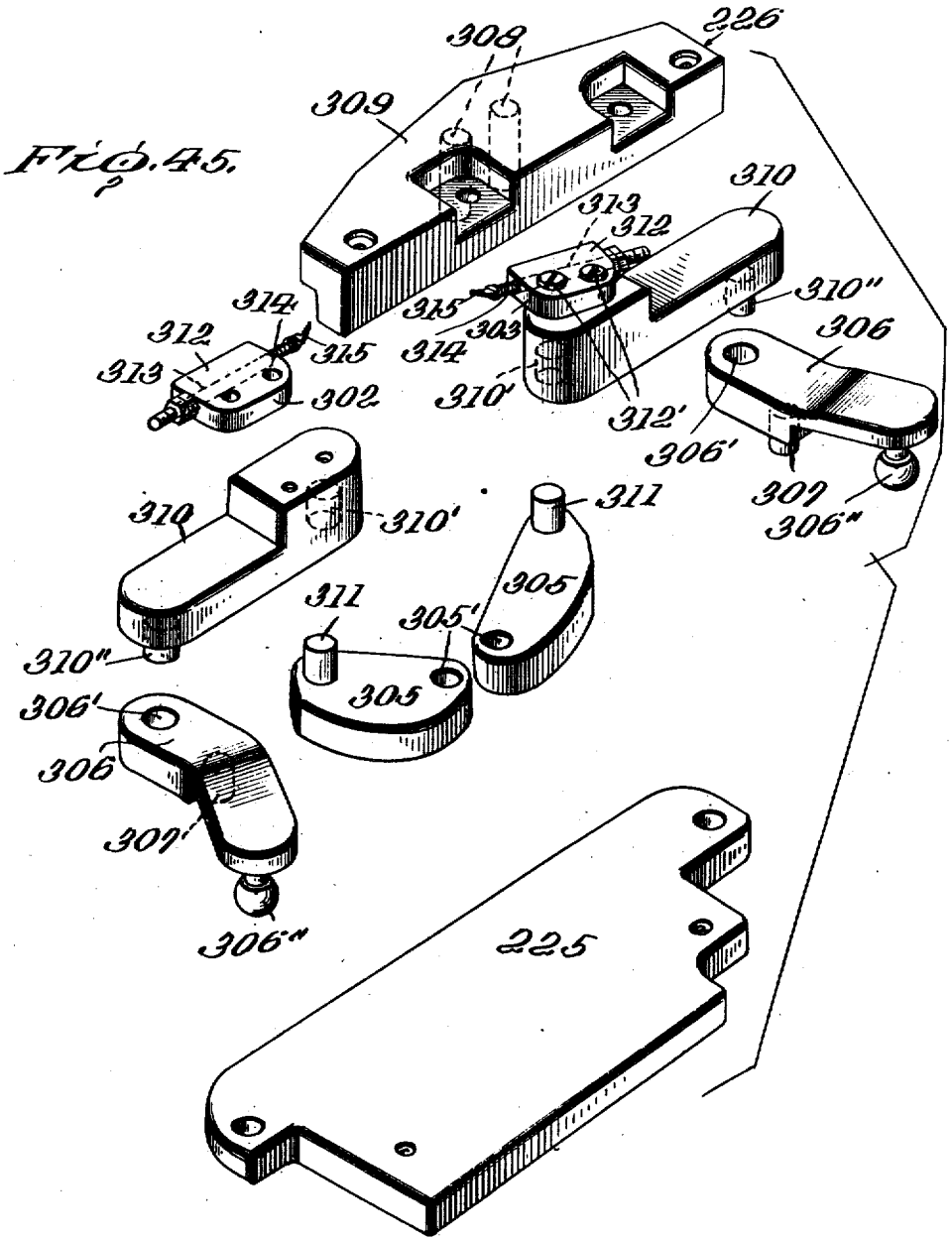
Figure 46:
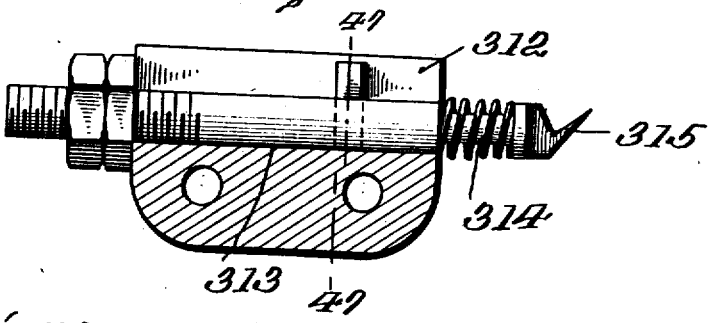
Figure 47:
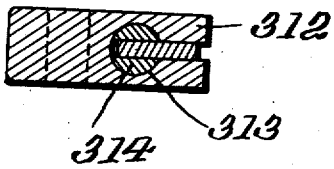
Figure 48:
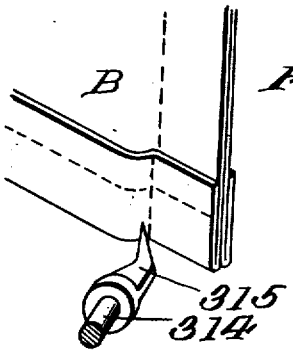
Figure 49:
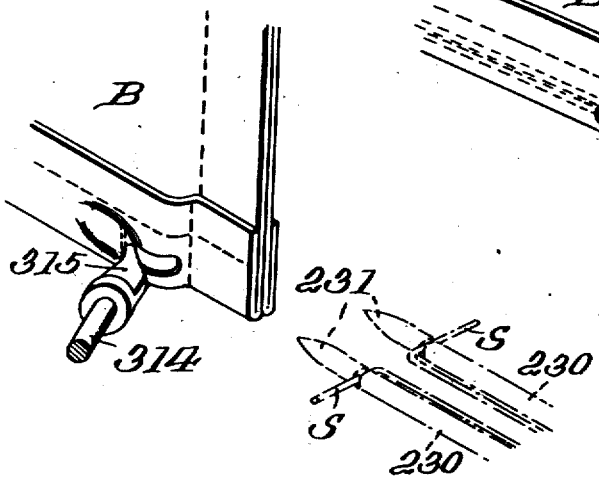
Figure 50:
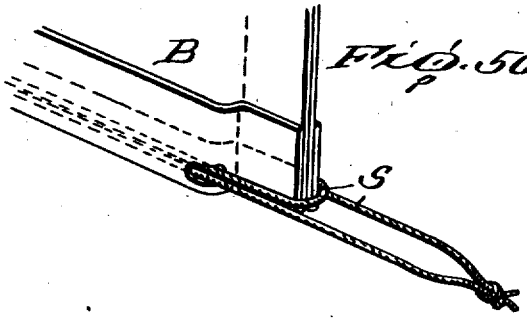
Figure 54:
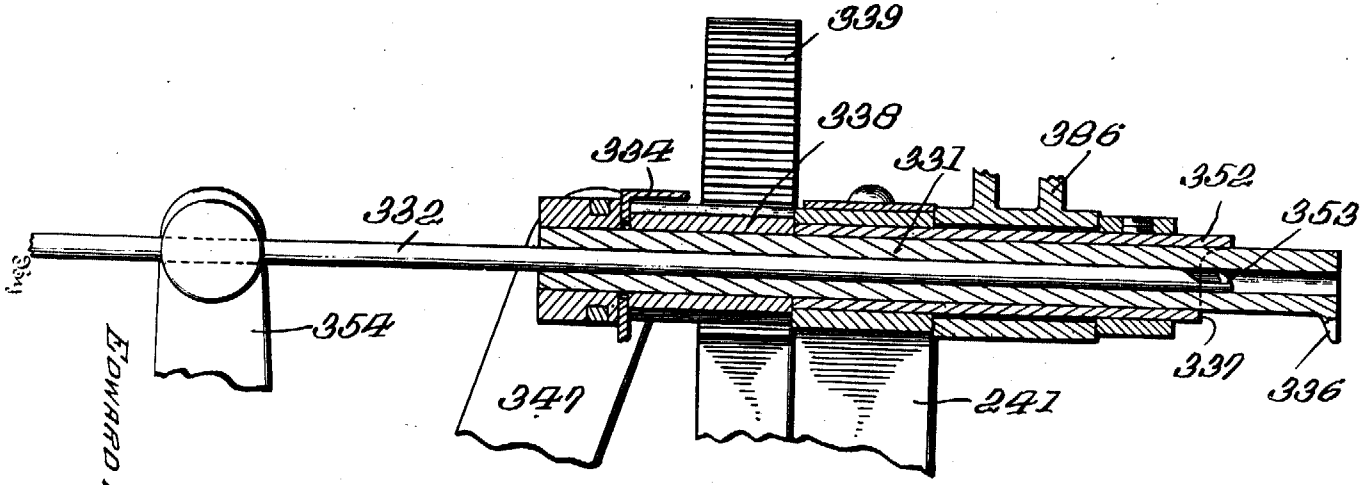
Figure 58:
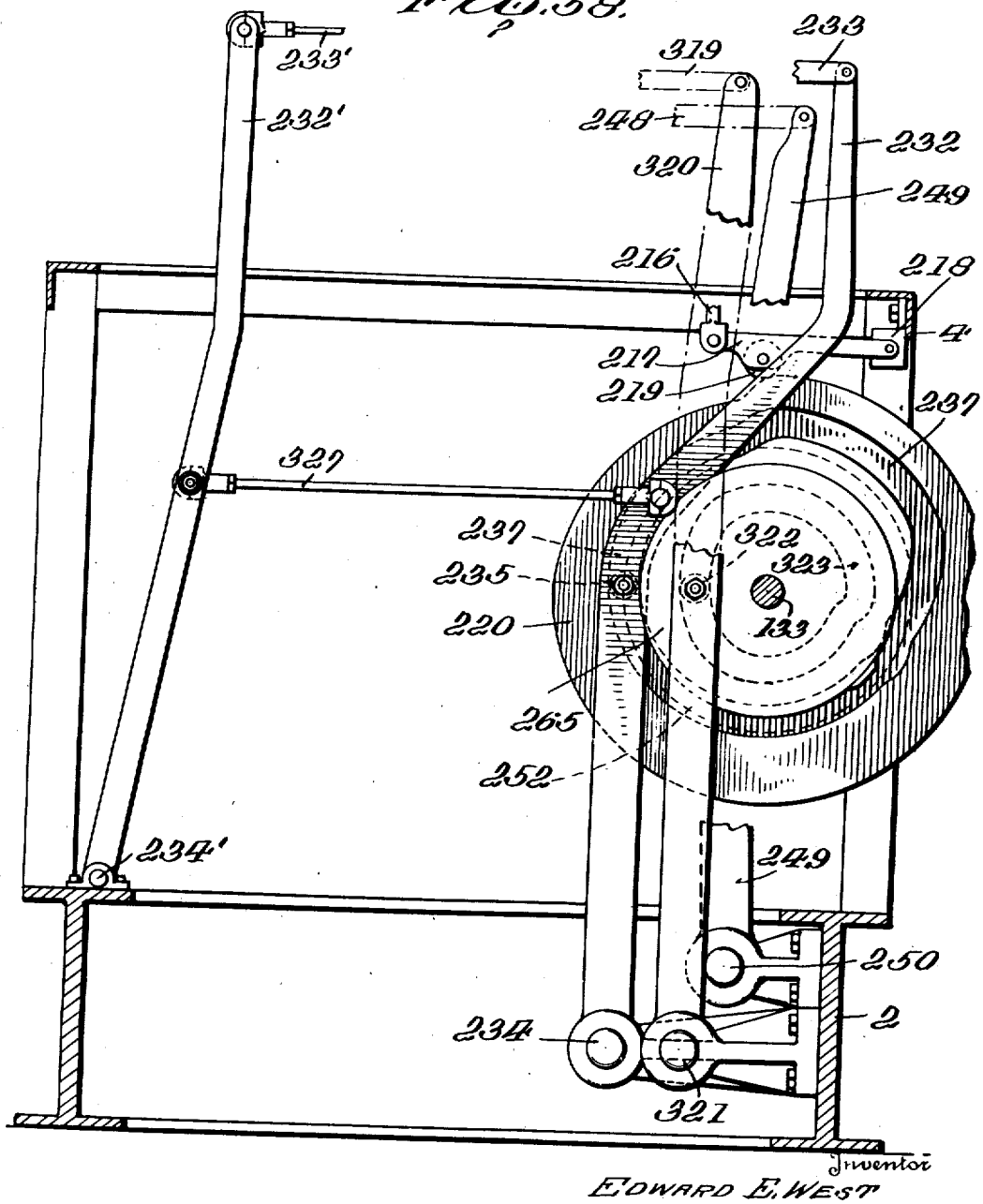
Figure 64:
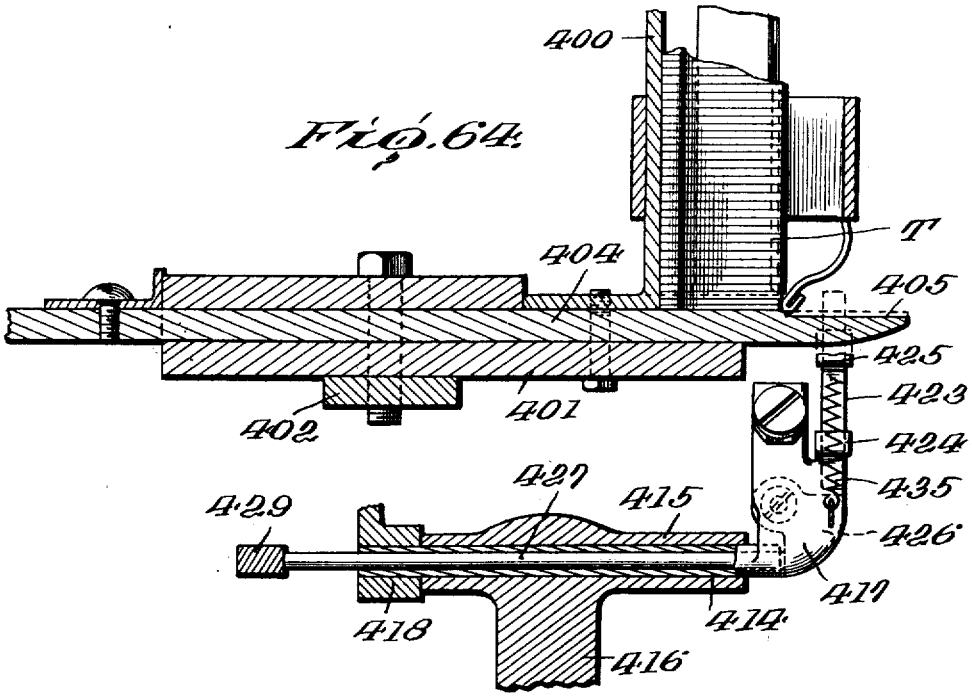
Figure 65:
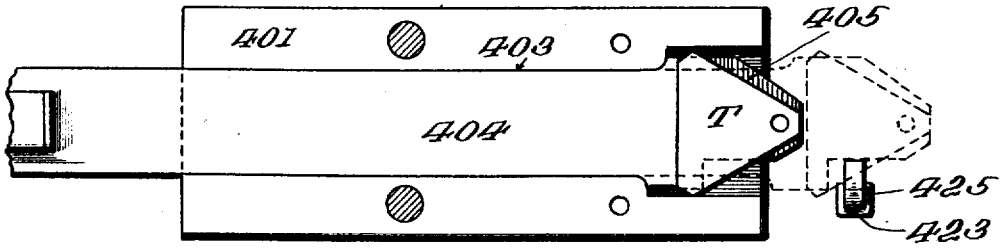
Figure 66:
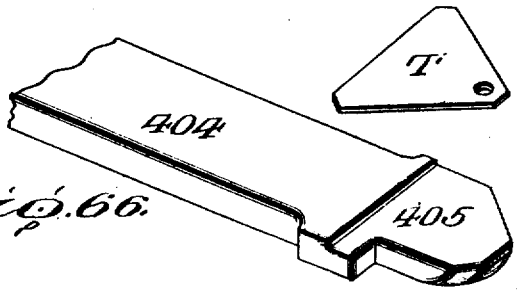
Figure 81:
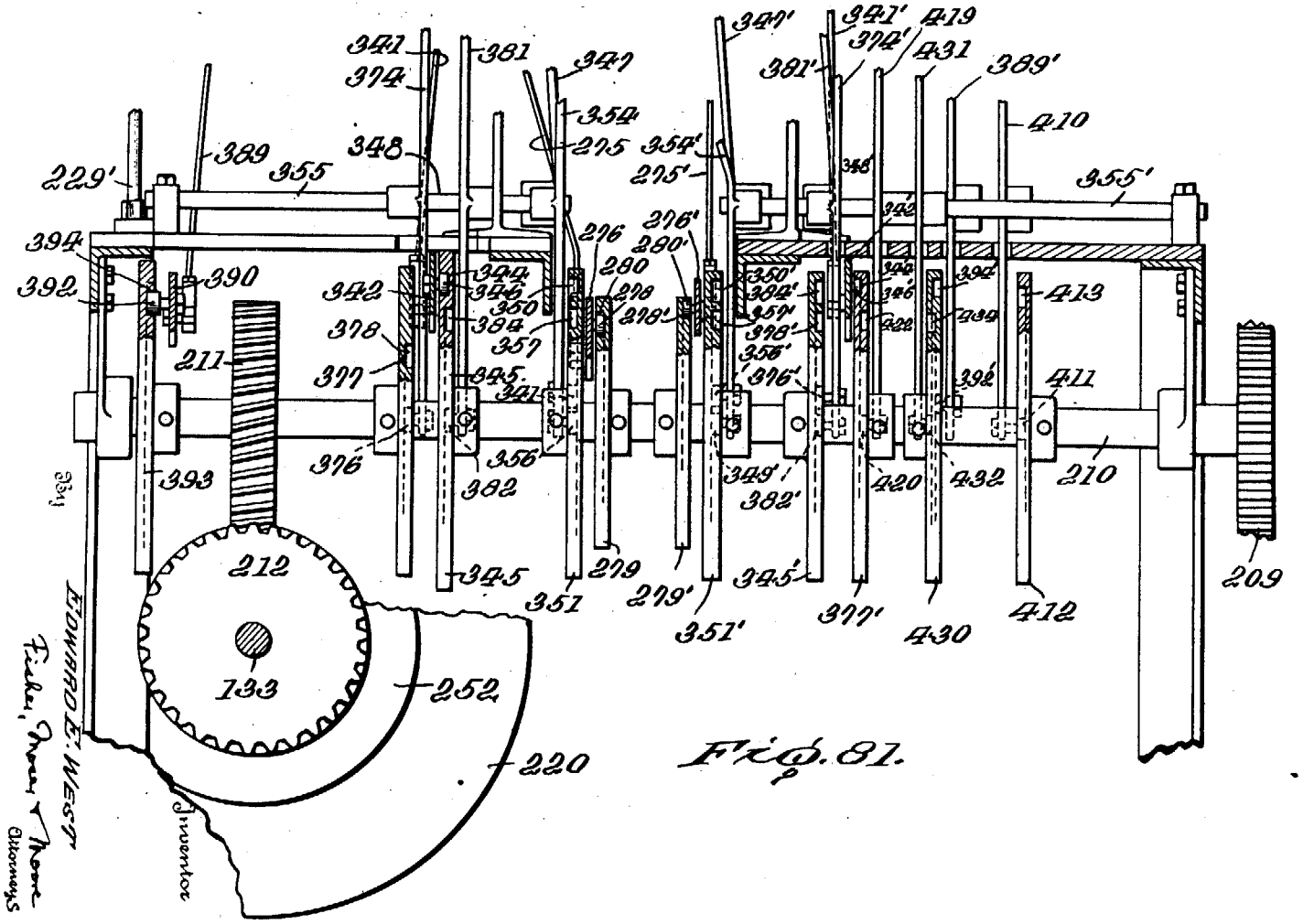
Figure 707:
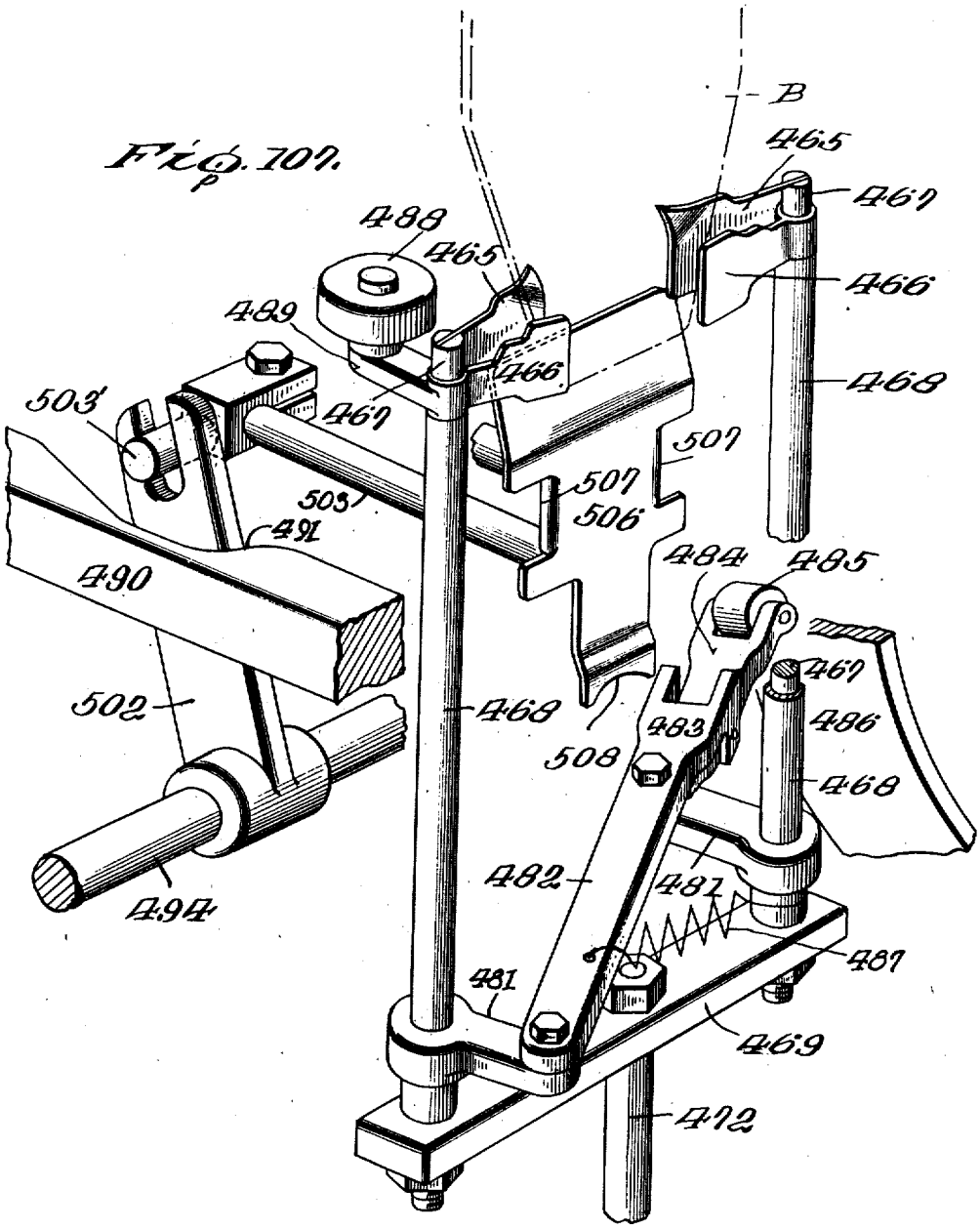

Figure 18*a* is an elevation of one of the bag thread cutters;

Figure 19 is a front elevation of the bag feeding mechanism, showing the top and bottom hem clamps and the side clamps;

Figure 20 is a front elevation of a bag in the position it assumes as it is being pushed onto a pair of holding arms of the rotating turret head;

Figure 21 is a rear elevation of the turret head, with a pair of bag holding arms in tilted bag receiving position, showing the turret head locking mechanism and some of the driving cams on two of the driving shafts;

Figure 22 is a top plan sectional view of the turret head, means for actuating the bag holding arms to receiving and gripping position and the turret locking means;

Figure 22*a* is a detail of the Geneva movement for operating the turret;

Figure 23 is a top plan of the string feeding, cutting, stringing, clamping and knotting mechanism on the left side of the machine, as viewed from the front;

Figure 23*a* is a side elevation of the bell crank for actuating the needle saddle left arm;

Figure 24 is a corresponding plan view of the string feeding, cutting, stringing and knotting mechanism on the right side of the machine;

Figure 25 is a section along the line 25—25 of Figure 23 through the needle saddle mounted on the guide track, with the needles and string drawing hook mounted therein, and showing the cam means for opening and closing the needles;

Figure 26 is a section through the needle saddle, along the line 26—26 of Figure 25;

Figure 27 is a section along the line 27—27 of Figure 26 through the needles saddle, showing the cam member for opening and closing the needles;

Figure 28 is a section through a needle's sleeve with the needle in open position;

Figure 29 is a section through the needle and needle sleeve, showing the needle in closed position;

Figure 30 is a side elevation, viewed from the rear of the machine, of the goose neck and clamping means for gripping the hem of the bag during the stringing and knotting operation, showing the clamps in hem gripping position;

Figure 31 is a top plan of the goose neck, clamps and operating linkage, showing the clamps gripping the side hem of the bag position on the bag holding arms;

Figure 32 is a perspective view of the goose neck and clamping members;

Figure 33 is a side elevation, partly in section, of the goose neck and clamps;

Figure 34 is an enlarged plan view of a portion of the goose neck with the clamps in gripping position on the side hem of the bag and the snaggers entering the opposite sides of the hems to provide openings for the needles;

Figure 35 is a side elevation of the side of the machine showing the cams on the main driven shaft and the connecting levers for operating the bag arms, needles, snaggers, goose neck and turret lock;

Figure 36 is a plan of the left hand string feed tube, cutter bar and string gripping element;

Figure 37 is a side elevation of the structure shown in Figure 36, with the string gripper in open position receiving the string;

Figure 38 is a view corresponding to Figure 37, showing the string gripper in closed position with the string gripped in the jaws thereof;

Figure 39 is a perspective view showing the string positioned in the string gripper and the string being drawn outwardly by the string hook preparatory to the needles being threaded;

Figure 40 is a rear elevation of the linkage for operating the left hand string feeding tube and cutting bar;

Figure 41 is also a rear elevation of the string feeder and cutter operating mechanism showing the relative positions and the path of travel of the respective members;

Figure 42 is a plan view of the snaggers for forming needle openings in the hems of the bag;

Figure 43 is a section taken along the lines 43—43 of Figure 42;

Figure 44 is a plan view of one of the snaggers showing the path of travel it takes in forming the opening in the bag hem;

Figure 45 is a detailed perspective of the snaggers;

Figure 45 is a plan view of one of the snaggers;

Figure 47 is a section taken along the lines 47—47 of Figure 46;

Figure 48 is a perspective view showing one of the snaggers about to enter a bag hem;

Figure 49 is a perspective view showing one of the snaggers after having formed an opening in the hem and pulled the material away to provide an opening for the needle;

Figure 50 is a perspective view of the bag hems with the strings positioned therein;

Figure 51 is a plan view, partly in section, of the left hand knotter string gripper;

Figure 52 is a section taken along the lines 52—52 of Figure 51;

Figure 53 is a perspective view of the left hand knotter gripper showing the gripping jaws in open position;

Figure 54 is a cross section through the left hand knotting mehanism;

Figure 54*a* is a side elevation, partly in section, of the left hand knotter and string gripper;

Figure 55 is a side elevation of the knotting and tagging mechanism on the right side of the turret head;

Figure 56 is a rear elevation of the linkage for operating the right hand string feeding tube and cutting bar;

Figure 57 is a detailed perspective of the sliding string hook saddle and string disengaging member on the right side of the turret head;

Figure 58 is a rear sectional view of the machine frame showing the cams and levers actuated thereby for operating the turret head locking, needle and string hook saddles, goose-neck, and needle hole snagging devices, respectively;

Figure 59 is a cross section through the right hand knotting mechanism;

Figure 60 is a front elevation of the rack member for rotating the knotter barrel;

Figure 61 is a section along the lines 61—61 of Figure 59;

Figure 62 is a perspective view of the right hand knotter and string gripper, showing the gripper in position preparatory to gripping and elevating the string;

Figure 63 is also a perspective view of the right hand knotter and string gripper, showing the gripper in elevated position and the knotter rod in position to engage the string;

Figure 64 is a cross section through the tagging mechanism;

Figure 65 is a plan view of the sliding tag plate;

Figure 66 is a perspective view of the sliding tag plate and one form of tag;

Figure 67 is an enlarged perspective of the tag gripping member;

Figures 68 to 71 are views showing the formation of the knot about the tag;

Figure 72 is a diagrammatic view of the needles and string tube, fixed cutter blade and string gripper on the left side of the turret, showing the left hand draw string drawn to extended position and the needles extended through the bag hems to the right side of the turret in open position with the right hand draw string about to be gripped therein preparatory to the needles being drawn rearwardly through the hems to deliver the right hand string to knotting and tagging position;

Figure 73 is a diagrammatic view of the needles and stringing, gripping and cutting elements on the left side of the turret, showing the left hand draw string in gripper and extended position about to be clamped in the eyes of the needles;

Figure 74 is a diagrammatic view of the needles and stringing, gripping and cutting elements on the left side of the turret, showing the needles threaded with the left hand draw string and the needles about to proceed forwardly through the hems to deliver the same to the right hand knotter and tagger;

Figure 75 is a diagrammatic view of the threading and cutting mechanism on both sides of the turret, with the needles being threaded on the left side with the left hand draw string;

Figure 76 is a diagrammatic view of the complete threading and cutting mechanism, showing the needles threaded on the left side about to carry the left hand string forwardly through the hems to the knotting and tagging mechanisms on the side;

Figure 77 is a diagrammatic view of the complete threading and cutting mechanism, with the needles extended forwardly through the hems in position where the left hand draw string is acted upon by the right hand knotter and tagging mechanisms, showing the right hand draw string in extended position preparatory to being threaded in the needles;

Figure 78 is a diagrammatic view of the complete threading and cutting mechanisms, with the needles at the end of their forward stroke being threaded with the right hand draw string;

Figure 79 is a diagrammatic view of the complete threading and cutting mechanism, showing the forwardly extended needles threaded with the right hand draw string and also showing the left hand draw string extended across the needles and in gripped position;

Figure 80 is a diagrammatic view of the complete threading and cutting mechanism, showing the right hand draw string in position to be acted upon by the left hand knotter, and the left hand draw string in extended and gripped position preparatory to being gripped by the needles;

Figure 81 is a front elevation of the machine showing the cams mounted on the front driven shaft and the levers for actuating the various mechanisms in the stringing, knotting and tagging operations;

Figure 82 is a diagrammatic face view of the first cam on the front shaft showing the cam groove, roller and lever for operating the left hand knot tightening lever;

Figure 83 is a diagrammatic face view of the second cam on the front shaft showing the cam groove, roller and lever for operating the gripping jaws of the left hand knotter string gripper;

Figure 84 is a diagrammatic view of the left face of the third cam on the front shaft showing the cam groove, roller and lever for operating the left hand knotter barrel rack member.

Figure 85 is a diagrammatic view of the right face of the third cam on the front shaft showing the cam groove, roller and lever for raising and lowering the left hand knotter string gripper;

Figure 86 is a diagrammatic face view of the fourth cam on the front shaft showing the cam grooves, rollers and levers for reciprocating the left hand knotter rod and knotter pin, respectively;

Figure 87 is a diagrammatic face view of the fifth cam on the front shaft showing the cam groove, roller and lever for operating the left hand string gripper;

Figure 88 is a diagrammatic face view of the first cam on the front shaft, to the right of the turret head, showing the cam groove, roller and lever for operating the right hand string gripper;

Figure 89 is a diagrammatic face view of the second cam on the front shaft, to the right of the turret head, showing the cam grooves, rollers and levers for reciprocating the right hand knotter rod and knotter pin, respectively;

Figure 90 is a diagrammatic face view of the third cam on the front shaft, to the right of the turret head, showing the cam grooves, rollers and levers for raising, lowering and opening and closing the right hand string knotter picker;

Figure 91 is a diagrammatic face view of the fourth cam on the front shaft, to the right of the turret head, showing the cam groove in the left face thereof and the roller and lever for rotating the right hand knotter rod;

Figure 92 is a diagrammatic face view of the fourth cam on the front shaft, to the right of the turret head, showing the cam groove in the right face thereof and the roller and lever for raising and lowering the tag gripper;

Figure 93 is a diagrammatic face view of the fifth cam on the front shaft, to the right of the turret head, showing the cam groove in the left face thereof and the roller and lever for opening and closing the tag gripper jaws;

Figure 94 is a diagrammatic face view of the fifth cam on the front shaft, to the right of the turret head, showing the cam groove in the right face thereof and the roller and lever for operating the right hand string tightening lever;

Figure 95 is a diagrammatic face view of the sixth cam on the front shaft, to the right of the turret head, showing the cam groove in the left face thereof and the roller and lever for operating the tag slide;

Figure 96 is a diagrammatic face view of the first cam on the rear shaft, showing the cam groove in the right face thereof and the roller and lever for operating the left hand string tube and cutter bar;

Figure 97 is a diagrammatic face view of the first cam on the rear shaft, showing the cam groove in the left face thereof and the roller and lever for operating the bag holding arms of the turret head;

Figure 98 is a diagrammatic face view of the second cam disk on the rear shaft showing the cam roller and lever for opening and closing the respective pairs of bag pushing and opening fingers and gripping jaws;

Figure 99 is a diagrammatic face view of the third cam on the rear shaft showing the cam roller and lever for operating the bag presser finger; and the cam groove in the right face of the cam and roller and lever for operating the bag pusher fingers and the bag gripper and feed carriage;

Figure 100 is a diagrammatic face view of the third cam on the rear shaft showing the cam groove in the left face thereof and the roller and lever for operating the bag pusher finger slide;

Figure 101 is a diagrammatic face view of the fourth cam on the rear face thereof and the roller and lever for operating the left hand string tube and cutter bar;

Figure 102 is a diagrammatic face view of the fifth cam on the rear shaft showing the cam groove in the right face thereof and the roller and lever for operating the bag turning and gripping finger slide;

Figure 103 is a diagrammatic face view of the first cam on the main driven shaft showing the cam groove in the right face thereof and the roller and lever for operating the snaggers;

Figure 104 is a diagrammatic face view of the second cam on the main driven shaft showing the cam groove in the left face thereof and the roller and lever for operating the needle saddle;

Figure 105 is a diagrammatic face view of the third cam on the main driven shaft showing the cam groove in the left face thereof and the roller and lever for operating the goose neck and side hem gripper clamps;

Figure 106 is a front elevation of the bag turning mechanism; and

Figure 107 is a detailed perspective of the bag turning and delivering mechanism.

Generally considered, the operation of my improved machine is as follows:

Cloth is continuously fed from a reel or other source of supply, and after the edges of the strip of cloth have been folded over or doubled upon the other strip, these folded edges are passed beneath two spaced sewing heads and by which the folded edges are stitched to provide hems. The strip of hemmed cloth is moved over a pleating or folder plate and doubled or folded into a suitable bag width, with the stitched hems arranged along one side thereof. The folded continuous strip then passes through pressing rollers and beneath a cutter which cuts the strip into bag lengths or blanks, and thereafter the open or unsewed side edges of the bag lengths are stitched together by sewing heads, which also join the bag blanks together in continuous chain formation, with their hemmed ends left open or unstitched to provide filling openings or mouths.

The bags are delivered in chain form to a horizontally disposed feeding and cutting mechanism which grips the hems of the successively fed bags, cuts the connecting seam threads and slides or pushes successive bags "inside out" onto one horizontally disposed pair of four radially positioned pairs of bag holding arms on a rotating turret head. Intermittent rotation of the turret head, approximately one quarter of a turn, moves the bag holding arms, upon which the bag is positioned, upwardly to a vertical position into alignment and operative relation with a reciprocating needling mechanism. The ends of the bag hems adjacent to the needles are now snagged and pulled apart to form openings in each hem to facilitate the initial insertion of the needles and draw strings on their forward stroke into and through the hems. String knotter grippers and knotters, arranged on both sides of the turret head adjacent the respective ends of the hems, elevate and knot the opposing ends of the draw strings and in addition, the knotter on the right side operates in conjunction with a tagging mechanism, whereby the ends of one of the strings are pulled through the eyelet of a tag and the knot tied therearound. The turret head is thereafter again rotated, approximately one quarter of a revolution, to move the bag holding arms, carrying the threaded and tagged bag, from the vertical threading and tagging station downwardly and forwardly to a horizontal position. In this position a reciprocating and oscillating turning and delivering member is moved into engagement with the horizontally disposed bag holding arms, and turns the bag right-side-out and when drawn rearwardly and moved downwardly carries the finished bag from the holding arms into engagement with a clamping and pushing means which delivers the same in upright, open mouth position into a storage hopper or transfer compartment.

As the turret head is rotated intermittently, by means of a Geneva movement, a bag is being simultaneously fed onto one set of horizontally disposed bag holding arms, while a second set of arms with a bag positioned thereon have been moved to the vertical threading and tagging station, and a third set of arms have been moved to the horizontal turning and delivering station, whereas the fourth set of bag holding arms, having had a bag removed therefrom in the horizontal turning station, are in a vertically disposed idle position on the underside of the turret, preparatory to being rotated to the initial horizontal feeding position. As the means for feeding, stringing, tagging and delivering the bags are successively and simultaneously operated through the medium of cams mounted on shafts, which are geared together and driven from a main drive shaft, all of the shafts and cams rotate in the same clockwise direction and the movements of the respective operating means are synchronized or properly timed. By virtue of the aforesaid synchronous movement of the shafts, cams and various operating mechanisms, it should be noted that the operations, from drawing the cloth from its source of supply through to the last step of delivering the finished strung and tagged bag in right-side-out, open mouthed position into the bag hopper, constitutes in effect one continuous movement.

Folding, Hemming and Cutting Mechanism

Referring more particularly to the drawings 1 denotes the main frame comprising a base 2, uprights 3 and a top portion 4. Mounted on the top 4, at the front thereof are a pair of spaced conventional sewing machine heads 5 and 5' respectively, to which a continuous strip of bag making material, preferably cotton, is fed from a roll 6, in turn rotatably mounted on a shaft 7' of a roll support 7, at the front of the frame. This strip passes upwardly and rearwardly over cross rods or guide members 8 and 8', and finally through a pair of spaced guides or folders 9 (Fig. 2), which fold the side edges of the strip upwardly and inwardly in advance of the sewing heads. As the folded side edges pass beneath the presser feet 10 of the sewing heads the folded edges are sewn in any suitable manner, in the present instance by a single thread stitch, to form the hems 11.

Figure 10:
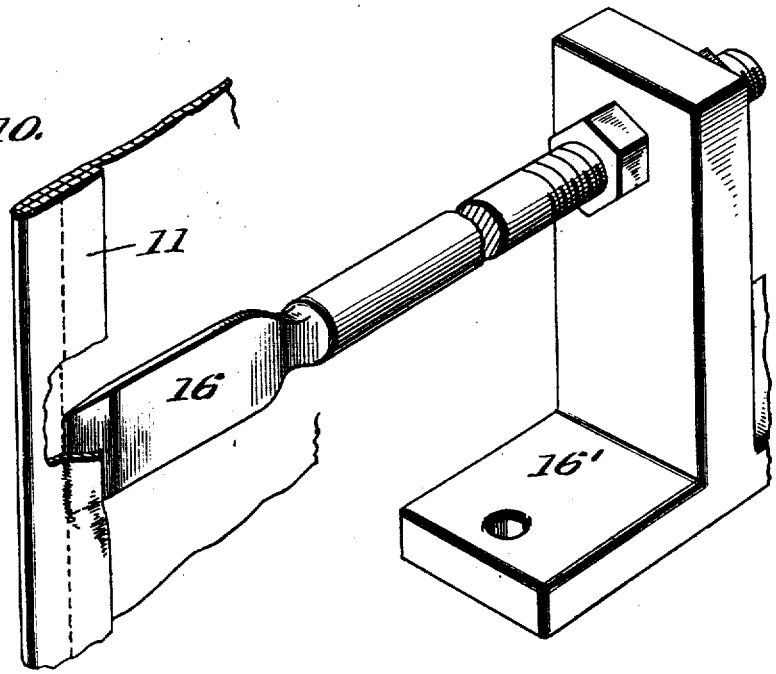
Figure 10 is a detail elevation of one of the guide fingers for engaging and aligning the hems of the fabric strip as the latter passes over the folding member and to the creasing rolls.
Figures 14, 15:
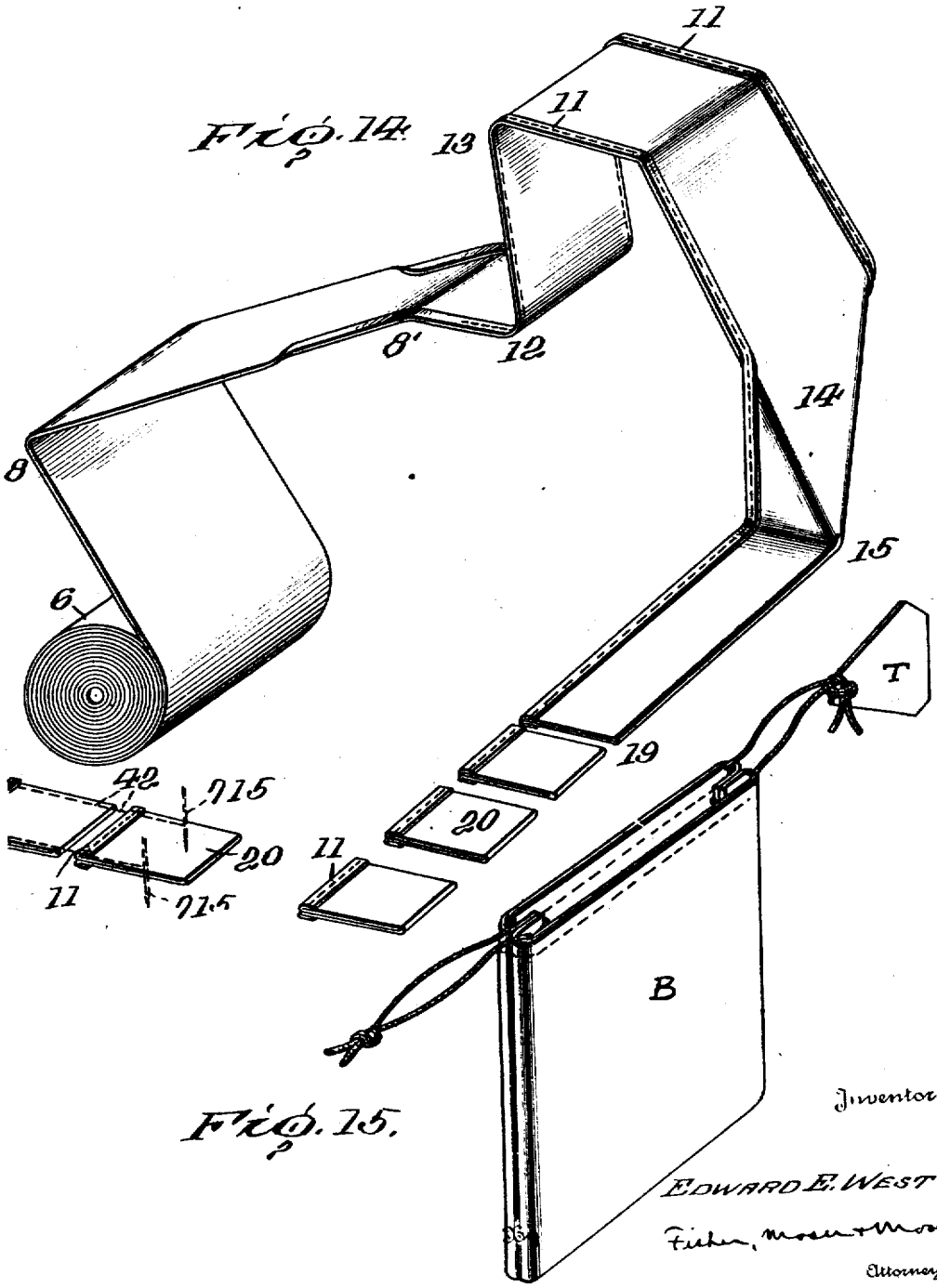
Figure 14 is schematic view illustrating the various operations performed by the machine from the time the strip of fabric leaves the supply roll up to the time that the severed bag lengths emerge from beneath the double sewing machine head in chain formation, preparatory to being strung and tagged.
Figure 15 is a perspective view of the bag after stringing and tagging.

From the presser feet the sewn strip continues its rearward travel beneath a lower guide roller 12 (Figs. 2 and 14) and thence upwardly in a substantially vertical direction over a second or upper guide roller 13, spaced a considerable distance above the roller 12. At this point the direction of travel is substantially reversed as the strip passes downwardly over a V-shaped sheet metal folding member 14, supported in the frame 1 by means of an adjustable support 14', and thence to and between a pair of horizontal closely spaced folding and creasing rolls 15 and 15' (Fig. 4), the latter rolls being arranged side by side and at right angles to the upper and lower guide rolls 13 and 12 respectively. The rolls 15 and 15' are geared together at one end as at 15'' (Fig. 4) to rotate in unison. The folding member 14 and the folding and creasing rolls 15 and 15' fold the strip longitudinally intermediate the hems 11. A pair of aligned oppositely disposed guide fingers 16 (Figs. 3, 4, 9 and 10) adjustably mounted in brackets 16', suitably supported in the frame 1, engage with their squared chisel ends under the hems 11 and at the same time press the strip closely to the sides of folder 14, as best shown in Figs. 9 and 10. These fingers compensate for any relative unevenness or irregularity in position of the hems, thus insuring that one side hem will aline or register with the other as the two hems pass between the rollers 15 and 15' where they are pressed together, it being essential that the hems be in perfect alinement when cut and delivered to transfer mechanism about to be described. The folded strip is pulled or fed by two pair of upper and lower feeding rollers 17 and 17' and 18 and 18' respectively to and beneath a cutter which shears the hemmed strip into bag lengths 20, when the pivoted blade 19 thereof is lowered into shearing engagement with the fixed blade 19', over which the bag making material passes. Positioned between the two sets of feed rollers is a conventional tension member or rack 20' (Fig. 4) beneath which the strip of fabric travels. This rack keeps the slack in the strip under the desired tension. The rollers 17—17' like the rollers 15, are geared together at their inner ends by gears 17'' (Fig. 4) and the top roller 17 is connected by sprocket chain 67, to roller 15' for simultaneous rotation. Rollers 18—18', which are intermittently driven in a manner hereinafter described, are geared together by meshing gears 18''. During the folding operation just described, a pair of aligned, oppositely disposed, resilient metal, electric contact fingers 21, (Figures 3 and 9) mounted in brackets 21', lightly engage the outer edges of the hems 11, adjacent the extremities of the guide fingers 16, so that in the event the guide fingers 16 fail to function properly or the hems otherwise get out of alinement with each other, the hems will ride from beneath the contact fingers 21. The latter will then automatically engage the sides of the sheet metal folding member 14 or the chisel points 16, thus making electrical contact and opening a switch, not shown, and breaking the circuit from electric motor drive 22, and stopping the machine to permit of adjustments or repairs being made.

Reciprocating knife 19 previously referred to, is located directly in advance of the rollers 18 and 18', and adjacent one end of an endless conveyor 23, upon which the bag lengths are deposited after being severed from the folded strip, by knife blade 19. This conveyor 23, comprises a plurality of horizontally disposed belts 24 of equal length, mounted upon and driven by horizontally disposed transverse grooved rollers 25 and 25', the roller 25 which is much larger than the roller 25' being positioned slightly in advance of the path of movement of movable blade 19, and the smaller roller 25' being mounted in the frame 1 at one end of the machine. These belts 24 carry the severed bag lengths to a transfer plate 26, at one end of the machine from where they are fed forwardly and in a substantially right angular direction with respect to the conveyor 23, to and beneath a machine head 27, for a purpose presently understood. It may be stated here that the folded strip and the bag lengths severed therefrom travel in a constant substantially horizontal plane, and that the bag lengths are transversely disposed on the conveyor 23, with the hems 11 facing forwardly or to the front as they reach the transfer plate 26. It should also be noted that the conveyor 23 includes a belt 28 (Figs. 3, 4 and 6), at the front thereof which may be termed a bag length guiding belt and which is shorter than the other belts 24, that is, does not extend across the top of the plate 26 to the roller 25', but passes from grooved roller 25 to a small roller or pulley 29, suitably supported by the transfer plate 26, below slot 30 cut in the inner edge thereof. The spring safety electrical contact fingers 21, engage the hems 11 at a point directly in line with the guide belt 28, and the squared or chisel ends of the guide fingers 16 being aligned with the inner longitudinal edge of guide belt 28, cooperate with the spring pressed safety fingers in accurately positioning the sides of the hem 11. When the bag lengths reach the end of guide belt 28 the hems of the former ride off the latter upon and slide over the plate 26, and the movement of the bag lengths is continued by the belt 24, until a stop bar 31 (Figs. 4 and 6), is reached, at which time movement of the conveyor 23 is interrupted, as will be later explained. Bar 31, is suitably secured to the top of transfer plate 26 along the top outer side edge thereof directly above the grooved conveyor roller 25'. An L-shaped angle iron guide member 31' adjustably secured to the top of transfer plate 26, in spaced parallel relation to the bar 31, by a nut and bolt fastener 31'', cooperates with the latter in maintaining the bag lengths in proper position as they are fed to the double sewing machine head 27.

Bag Length Feed to Side Seamer

After the bag lengths have been conveyed to the outer edge of the plate 26 with their hems 11 facing toward the front of the machine 1, a thin smooth resilient blade 32, carried by the forward end of a bifurcated reciprocatory pusher arm 33, is rocked downwardly into firm but resilient engagement with the top side of the hem 11, of the folded bag lengths or blanks and is then moved forwardly to advance the bag lengths in a manner presently understood. The bifurcated pusher arm 33 is slidably mounted upon the forward end of a rocker arm 34 by means of a sliding bracket or sleeve 35, and the arm 34 is pivotally supported intermediate its ends in an upright portion 36 of frame 1, by means of a pin or shaft 37, and is adapted to be rocked on its pivot by an arm 712 in turn actuated by a cam 709 (Figure 2), for moving the pusher arm 33 and blade 32 into and out of contact with the severed bag lengths, in a manner discussed more fully as the description proceeds.

The pusher arm is reciprocated to and fro to advance the bag lengths, through the medium of slotted link members 38 and 38' (Figures 3 and 4) adjustably connected together by a headed bolt 38''. Link 38 is pivoted to the sliding sleeve member or bracket 35 and the link 38' is connected at its rear end to the upper end of a vertically disposed rocker arm 39, in turn pivotally mounted intermediate its ends in one end of frame 1, as at 39', and operatively connected to an eccentric 713 (Figure 3) on main shaft 75 in a manner presently described. On the forward stroke of pusher arm 33 the bag lengths are moved beneath the presser feet 40 of the double sewing head 27 which sews the side seams 42, and connects the bags together in chain formation. The presser feet 40 (Figs. 3 and 6) are fixed on a shaft 40' rotatably supported by a bracket 40'', suitably secured to and supported by the sewing machine head 27. A pair of upper and lower feed or puller rollers 41 (Figs. 2 and 4), connected for simultaneous rotation by gears 41' and 41'' grip the bags as they emerge from the sewing head and feed them in horizontal position to a pair of bag folding arms 185 on a rotating turret head (Figures 16, 21 and 22).

Driving Variable Speed and Gear Reduction Mechanism

The motor 22 has a drive shaft 43 which carries a small sprocket 44 and a larger sprocket 45, the small sprocket 44 being connected to a sprocket 46 on a longitudinally disposed horizontal shaft 47 (Figs. 2 and 3) by means of a chain 48, while the larger sprocket 45 drives a sprocket 49 on one end of the drive shaft 50 of the sewing machine head 27, by means of a chain 51. The shaft 47, which is driven at a fixed speed by the motor 22, and is suitably mounted for rotation in the frame 1, and carries the sprocket 46 at one end thereof, passes through a "Reeves" variable speed drive unit 52 of conventional construction (Figures 2 and 5) and rotatably carries at its other end a small gear 53 for a purpose hereinafter referred to. By adjusting the drive belt 55 of this unit in a manner well known, the amount of cloth passing through the machine can be regulated to produce a bag of the desired width. Positioned directly above the shaft 47, and extending parallel therewith, is a second variable speed shaft 54 which also passes through the variable speed drive unit, the drive belt 55 of the latter operatively connecting the two shafts together. Upper shaft 54 is operatively connected at one end thereof with a shaft 55' which extends between and drives the spaced sewing machine heads or hemmers 5 and 5', through the medium of a pair of gears 60'' which mesh with gears 60' on the opposite ends of the drive shaft for the heads, the respective shafts 54 and 55' being provided with sprocket gears 56 and 57 driven by a drive chain 58. The outer or opposite end of upper shaft 54 (Figs. 2 and 5) carries a fixed gear 59, meshing with a gear 60 of a conventional gear reduction unit mounted in a gear box 62. A drive chain 63 connects a sprocket 64 on a short transverse gear reduction unit drive shaft 65, with a sprocket 66 (Fig. 4) on folding and creasing roller 15, for driving the same, the rollers 15 and 15' being geared together at their inner or front ends for simultaneous rotation by gears 15''. The upper and lower feeding rollers 17 and 17', also geared together at their inner or forward ends by a pair of gears 17'', only the top one of which is shown, are driven by a horizontally disposed sprocket chain 67 connecting with sprocket gears 68 and 69 fixed to the inner or forward rollers 15' and 17 respectively.

As previously stated, longitudinally arranged lower shaft 47 rotatably carries at one extremity thereof the small pinion gear 53. This gear meshes with a large idler spur gear 71 (Figs. 2 and 5) rotatably mounted on the end of a stub shaft 72, and on this same stub shaft and fixed to the idler spur gear 71 is a pinion gear 73 meshing with a second idler spur gear 74, rotatably mounted on a stub shaft 74'. Idler gear 74 meshes with and drives a spur gear 76, fixed to a main longitudinally disposed horizontal drive shaft 75 suitably mounted in the frame 1, at the rear of the machine and extending substantially from one end to the other thereof. The desired gear ratio is thus obtained for feeding the material from roll 6 at the proper speed to produce a bag of a predetermined depth. Stub shaft 72 is supported on a bracket 72' in turn bolted to an upright part of frame 1, and stub shaft 74' is fixedly supported by a slotted segmental plate 77 (Figure 5), mounted upon the stub shaft 72 for pivotal movement about the axis thereof. Stub shaft 72 thus serves the double purpose of supporting idler spur gear 71 and pivotally supporting the slotted plate or segment 77. A bracket or arm 78 fixed to the frame by bolts or the like 79 carries a stud 80 which extends through an arcuate slot 81 formed in the plate 77 and locks the plate against movement. In order to adjust the machine to make bags of different sizes, it is necessary to remove the gear 76, on main drive shaft 75, and substitute another gear having a greater or lesser number of teeth, according to whether a larger or smaller bag is wanted. This necessitates movement of the plate 77 about its pivot 72, to cause the idler spur gear 74 on stub shaft 74', to properly mesh with the newly assembled gear 76. This can readily be accomplished by loosening a nut 82 on stud 80 and swinging the plate either in a clockwise or anti-clockwise direction according to requirements. The plate can be securely locked in the desired position after adjustment, by tightening the nut 82.

Intermittent Operation of Bag Length Conveyor

Figure 11:
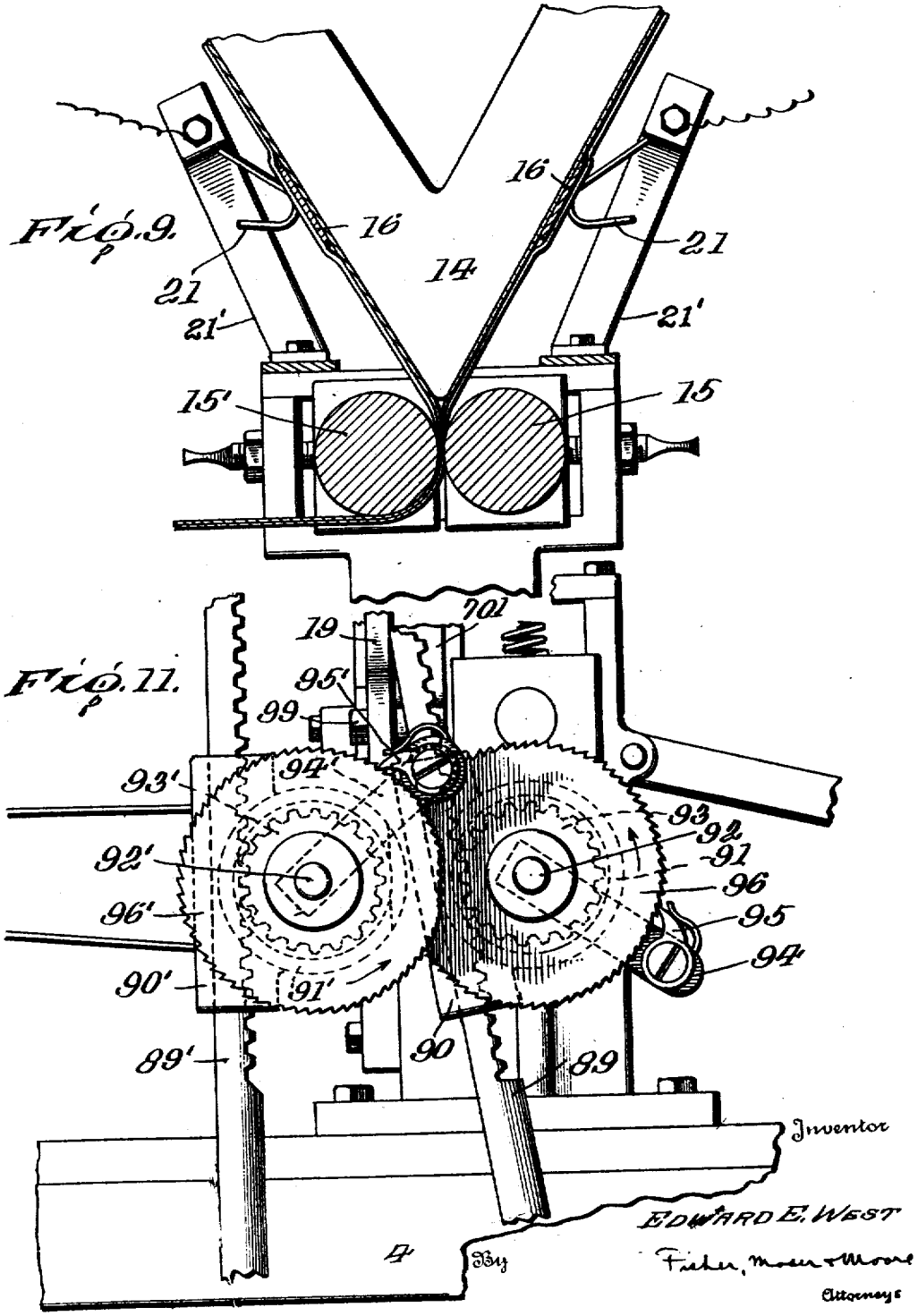
Figure 11 is a fragmentary side view of the rack bars and associated parts for driving the intermittent feed rolls and belt conveyer.
Figure 12:
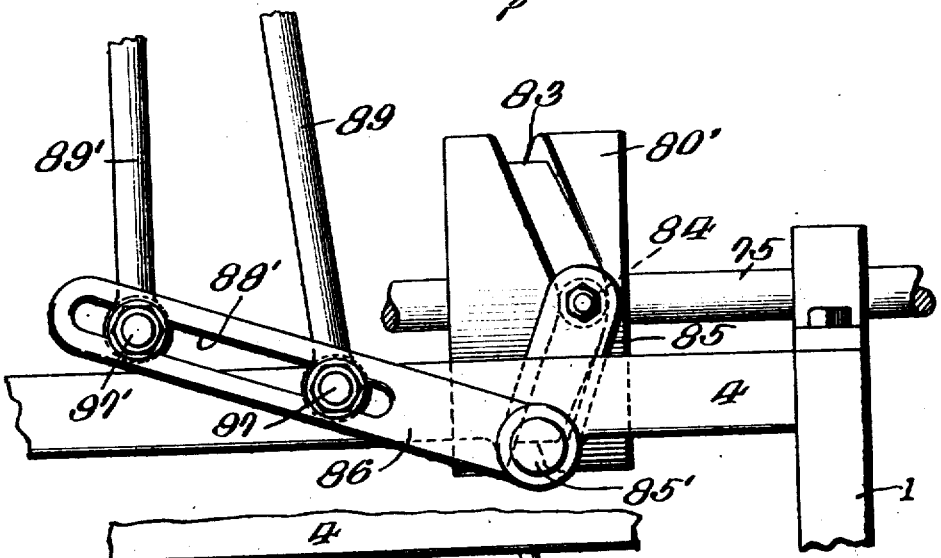
Figure 12 is a fragmentary detail of the lower ends of the rack bars and showing the cam for actuating the bars.
Figure 13:
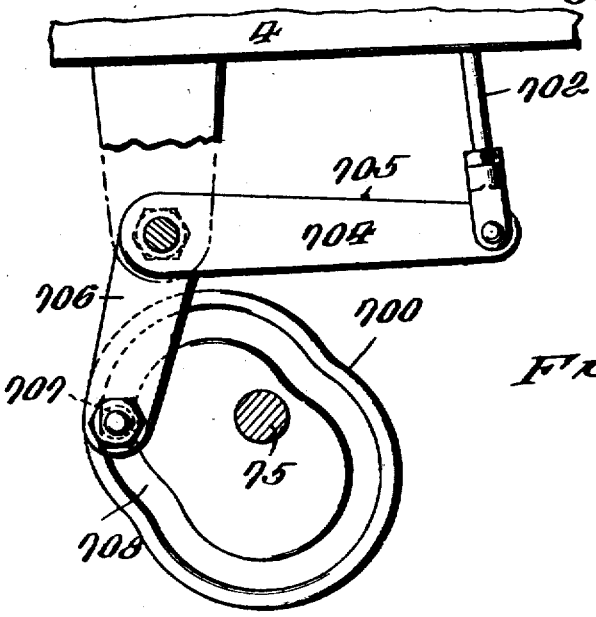
Figure 13 is a fragmentary detail of the cam and linkage for actuating the strip or bag length cutting knife.

Mounted upon and for rotation with the main drive shaft 75, is a cam 80' (Figs. 4 and 12), formed with a peripheral cam groove or slot 83 into which a small roller 84, rotatably carried by an arm 85 fixedly mounted on stub shaft 85', extends, shaft 85' being journaled in a bearing 85'' mounted on frame 1. A slotted arm 86, fixed on stub shaft 85', is pivoted to the lower ends of a pair of vertically disposed rack arms 89 and 89' respectively, by means of stub shafts 97—97' on the ends of the rack arms and which extend through slot 83' (Figure 12) of arm 86. The upper ends of these rack arms (Figs. 3, 4 and 11) reciprocate through guides 90 and 90' formed on housings 91 and 91' through which the rear ends of shafts 92 and 92' of feed roller 18' and conveyor roller 25 rotatably extend. Rotatably or loosely mounted upon the shafts 92 and 92', close to their outer or rear ends, are gears 93 and 93' respectively (Figure 11), to which short bent arms 94 and 94' are suitably fixed, for movement therewith. These arms carry ratchet pawls 95 and 95', constantly held in spring pressed engagement with ratchet gears 96 and 96', in turn fixed to and rotating with the shafts 92—92', in slightly spaced relation to the gears 93 and 93'.

Rotation of cam 80' by main drive shaft 75 causes the rack arms 89 and 89' to reciprocate in their guides 90 and 90', and oscillate the freely mounted gears 93—93'. On the upstroke of the rack arms the ratchet pawls ride freely over their respective ratchet gears 96—96', in an anti-clockwise direction as viewed from the front of the machine, and the conveyor 23, and feed rolls 18—18' remain stationary, however, on the down stroke rotation of gears 93—93' is reversed and the pawls 95—95', engage with the ratchet teeth of gears 96—96' and rotate the latter in a clockwise direction, thus causing the intermittent conveyor 23 and feed rolls 18—18' to operate. This intermittent movement continues indefinitely or as long as the motor is kept running, the slack take up mechanism 20' taking care of the slack in the fabric strip, as previously described.

Cutter Blade Operation

Figure 3:
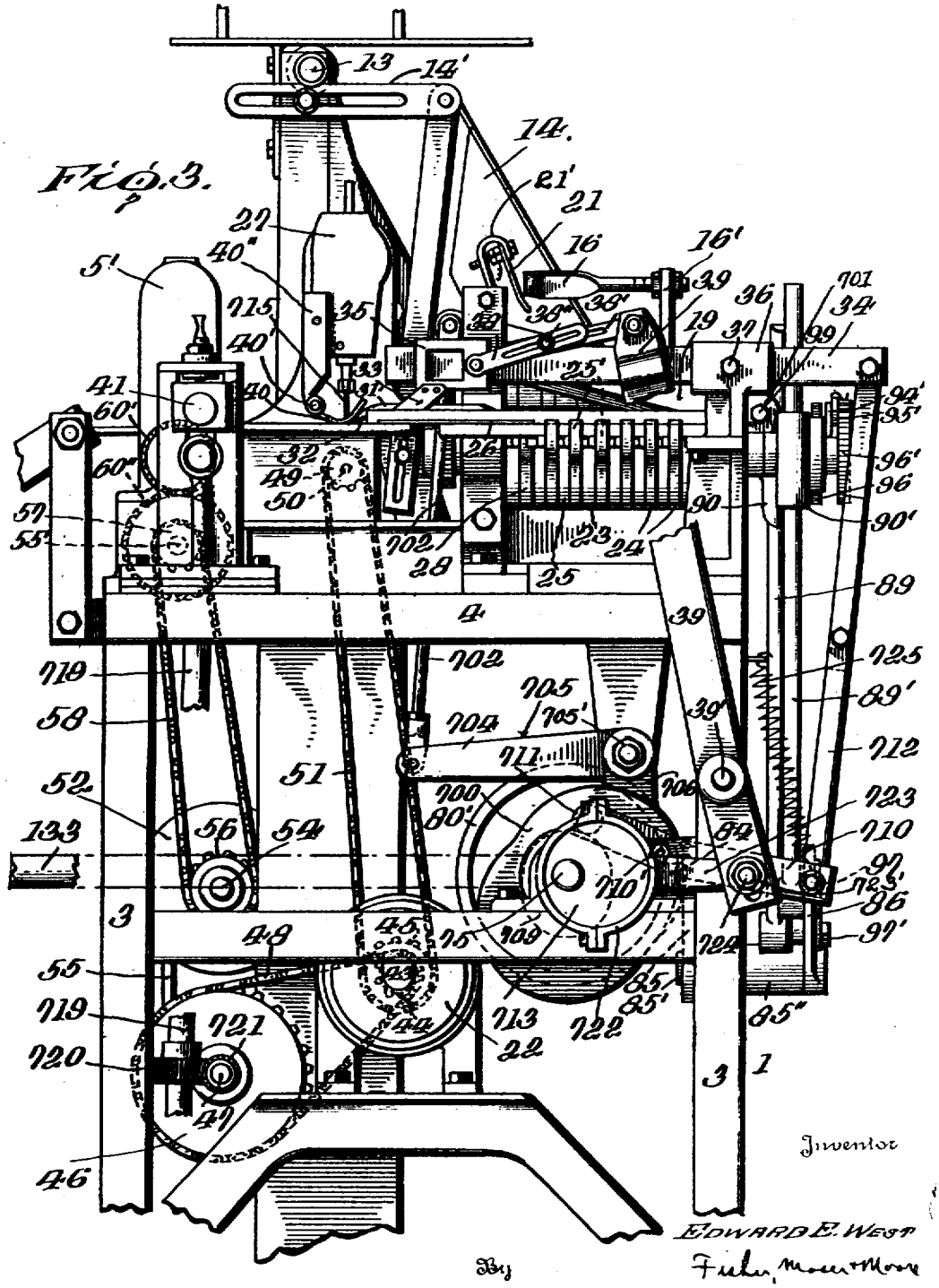
Figure 3 is a fragmentary side elevation of the right hand end of the machine viewed from the right side of Figure 1.

The movable cutter blade 19 is pivoted at its rear or outer end, as at 99, to the supporting bracket 701 for feed roller 18, and pivotally attached to its front end is a depending rod 702 which in turn is pivotally connected at its lower end to one arm 704 of a bell crank 705 (Figure 3). It might here be noted that bracket 701 also supports the fixed arm 19' of knife 19. Bell crank 705 is pivotally mounted in the top portion 4 of the frame 1, as at 705', and has an arm 706 carrying a small roller 707, which engages in a cam slot 708 formed in the side of a cam or disk 700, fixed on the main drive shaft 75. The movable bag severing blade 19 is thus intermittently actuated directly from the main drive shaft 75 to automatically sever the folded material into bag widths when the required amount of folded cloth has been fed beneath the knife and onto the intermittent conveyor 23, while the latter is stationary. The conveyor 23 then advances the severed sections step by step until they are positioned above the transfer plate 26 and with one side edge against the stop and aligning member 31. In this position the hem or mouth end of the bag will have been moved off the short hem guide belt 28 and onto the smooth top face of plate 26, by the other and longer belts 24. The mouth of the bag lengths at this station is toward the front of the machine and in position to be moved at right angles to the conveyor belts 24.

Pusher Blade Rocking Means

The pusher blade 32 is rocked toward and away from the severed bag lengths by means of the cam 709, fixed on main drive shaft 75, adjacent one end thereof, and adapted to actuate a horizontally arranged rocker arm 710, pivoted intermediate its ends, as at 710' in the frame 1 (Figure 3). The forward end of the rocker arm 710 carries a small roller 711 which rides on the periphery of the cam 709, and the rear end of this arm 710 is pivotally connected, by means of the previously mentioned arm or link 712, to the rear end of rocker arm 34, on which slide bracket or sleeve 35 is mounted. Rotation of main drive shaft 75 in a clockwise direction causes the cam 709 to rock the arm 34 on its pivot in an obvious manner by the mechanism just described, thus lowering the pusher blade 32 into engagement with the hem of the previously advanced bag, immediately after the latter reaches the plate 26, whereupon the action of eccentric 713 under continued rotation of shaft 75, causes the bag lengths to be advanced beneath the sewing machine head. Both the forward and return rocking movements of the blade toward and away from the bag is assisted by a coil spring 725 (Figure 3) which causes the roller 711 to closely engage and follow the periphery of the cam at all times.

Pusher Blade Reciprocating Means

The eccentric 713, which as previously explained is mounted on one end of main drive shaft 75, adjacent the cam 709, is adapted to actuate a collar or strap 722, which encircles the periphery of the eccentric. This strap is formed with an integral arm 723 pivotally connected to the lower end of vertical rocker arm 39, at 723'. Rotation of the eccentric on main shaft 75, causes the rocker arm 39 to push the sliding bracket 35, forwardly on rocker arm 34, and this results in a corresponding forward movement of the bag by the bifurcated pusher arm 33 and its blade 32, beneath the sewing machine head 27, which in turn sews the side seams, thus completing the bag. Continued rotation of shaft 75 causes the cam 709 and eccentric 713 to now rock the blade 32 upwardly and move the same rearwardly respectively, into position for moving the next succeeding bag. This cycle is repeated upon each rotation of shaft 75.

Presser Feet

Figure 8:
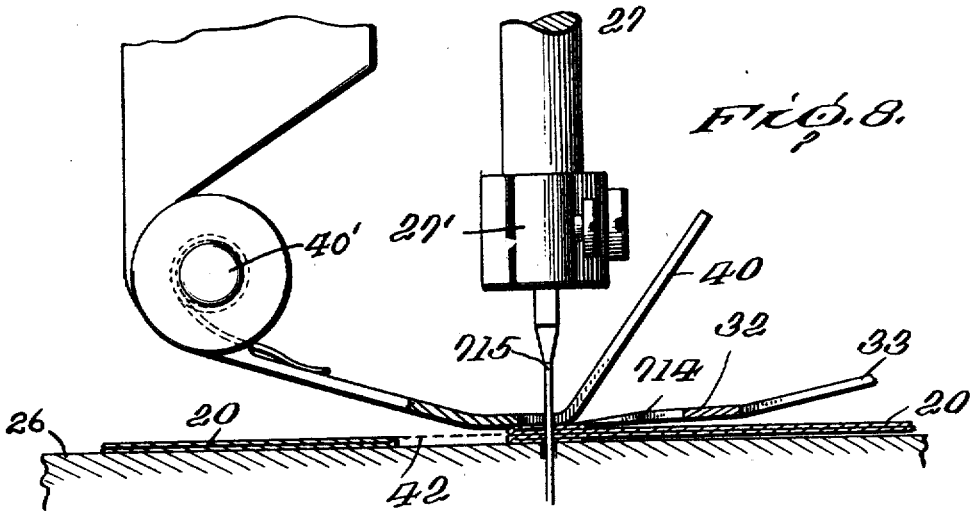
Figure 8 is a detail side elevation, partly in section, showing one of the needles for the double sewing machine head and presser foot therefor, and also showing the pusher blade about to push a bag length beneath the presser foot.

Because of the flimsy nature of the bag material and the necessity for keeping the bags accurately positioned it is essential that the downwardly spring pressed presser feet 40 of the sewing head 27, be kept out of contact with the hems of the moving bag blanks until several side stitches have been taken through the hems 11, by the needles 715. This insures continued accuracy in the alinement of the hems, which is most important in subsequent operations. With this object in mind the transversely extending pusher blade 32, is inclined downwardly and forwardly to a slight degree from a horizontal plane and is formed at each end with relatively deep slots 714 (Figures 6 and 8), adapted to straddle the needles 715, of the side stitching head 27. On its forward or pushing stroke, the top face of the downwardly inclined pusher blade engages beneath and elevates the presser feet to give ample clearance for the hem of the bag and at the same time the slots 714, permit the needles 715, to sew several stitches before the cam 709 and eccentric 713 respectively, elevate the forward end of rock arm 34, and slide the pusher blade rearwardly thereon and above the next oncoming blank, to complete the cycle. As the pusher blade commences its return compound arcuate horizontal stroke the blade rides over the curved rear ends of the presser feet and permits the latter to move gently into engagement with the bag being sewn, thus maintaining the moving bag under tension but obviating the danger of stretching the bag unduly.

Bag Feed from Double Sewing Head

Figure 1:
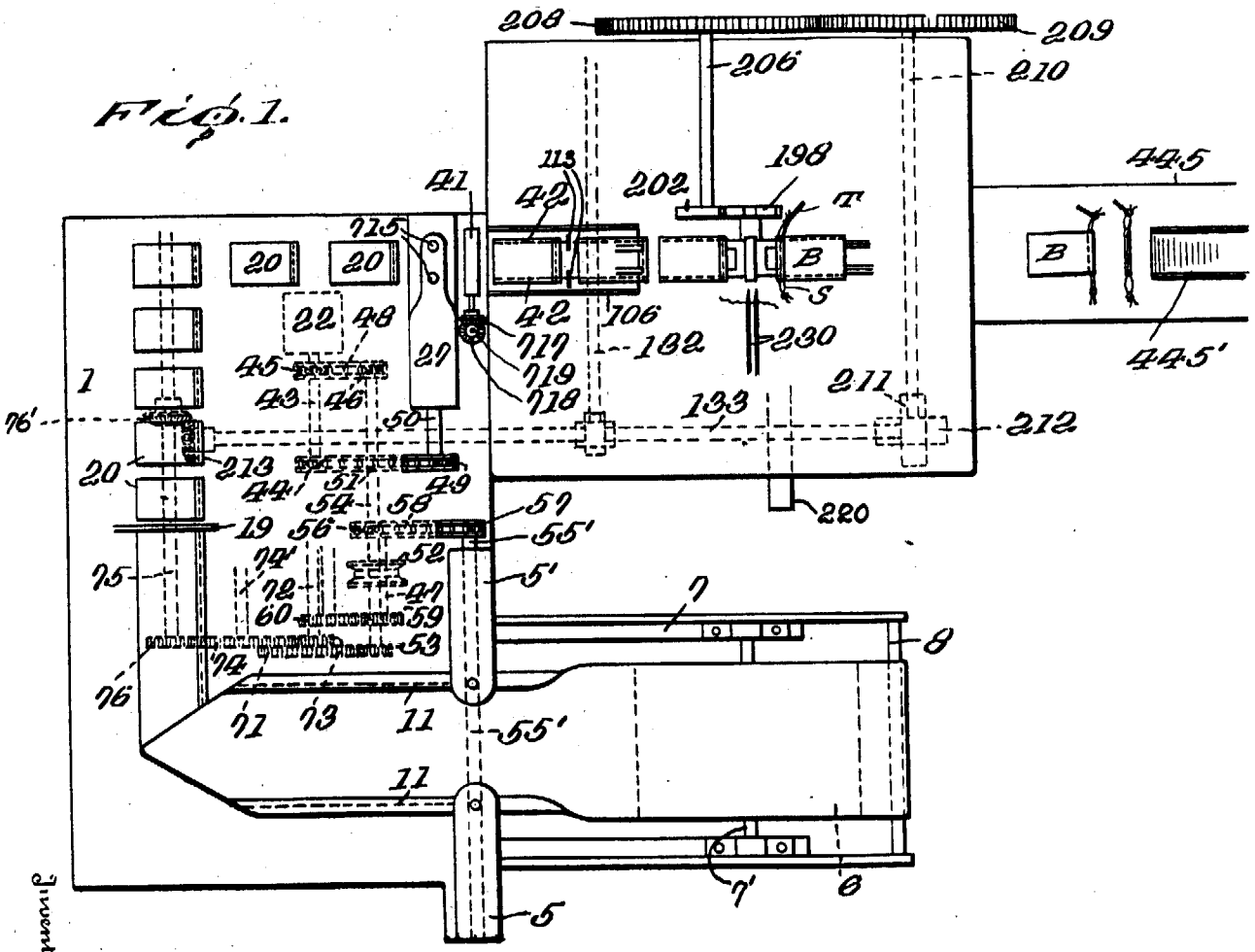
Figure 1 is a diagrammatic plan view of my improved bag making and stringing machine, showing the bag making mechanism and the stringing mechanism at the front and rear, respectively, of the combined machine.
Figure 2:
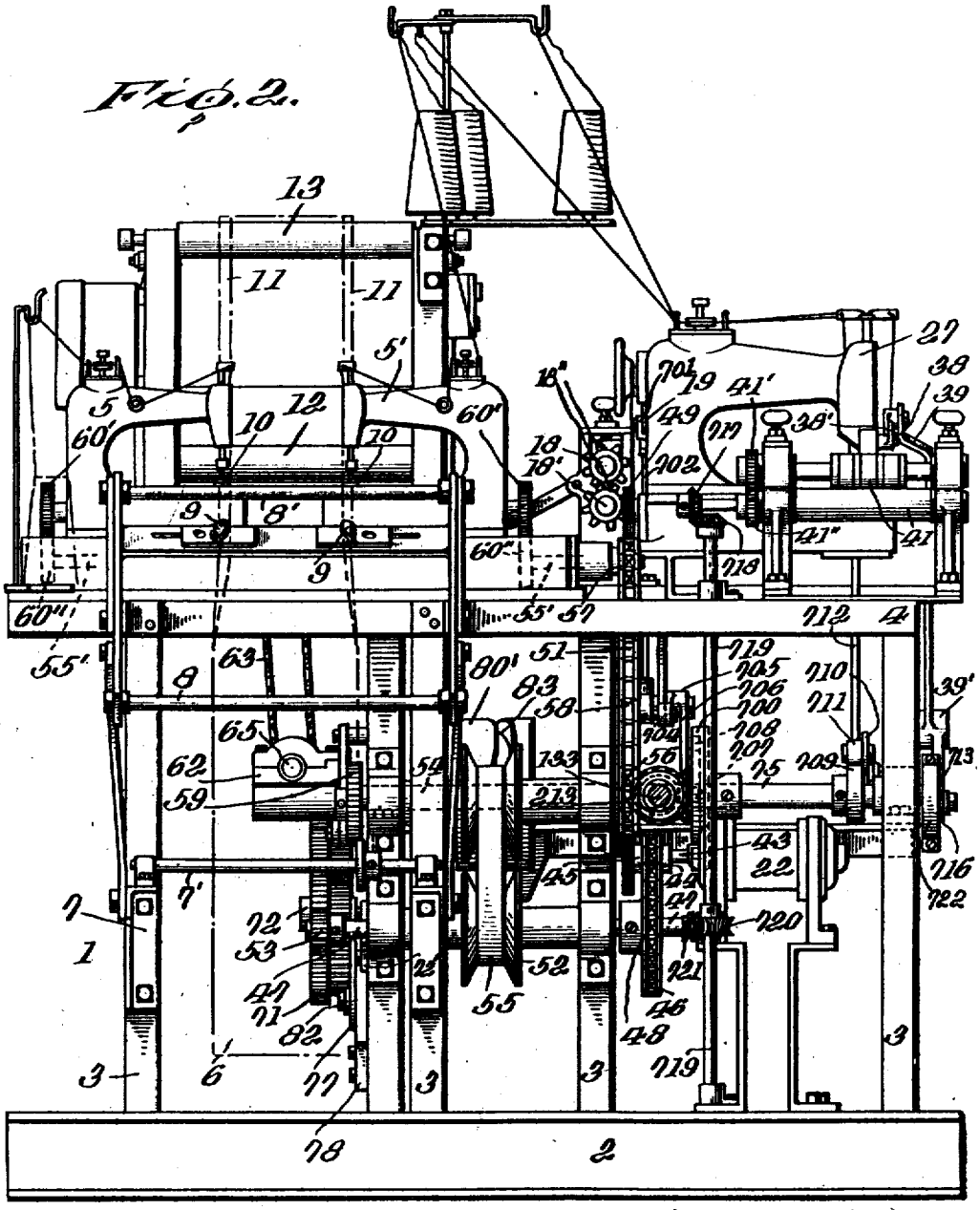
Figure 2 is a front elevation of the bag making portion of the machine.
Figure 4:
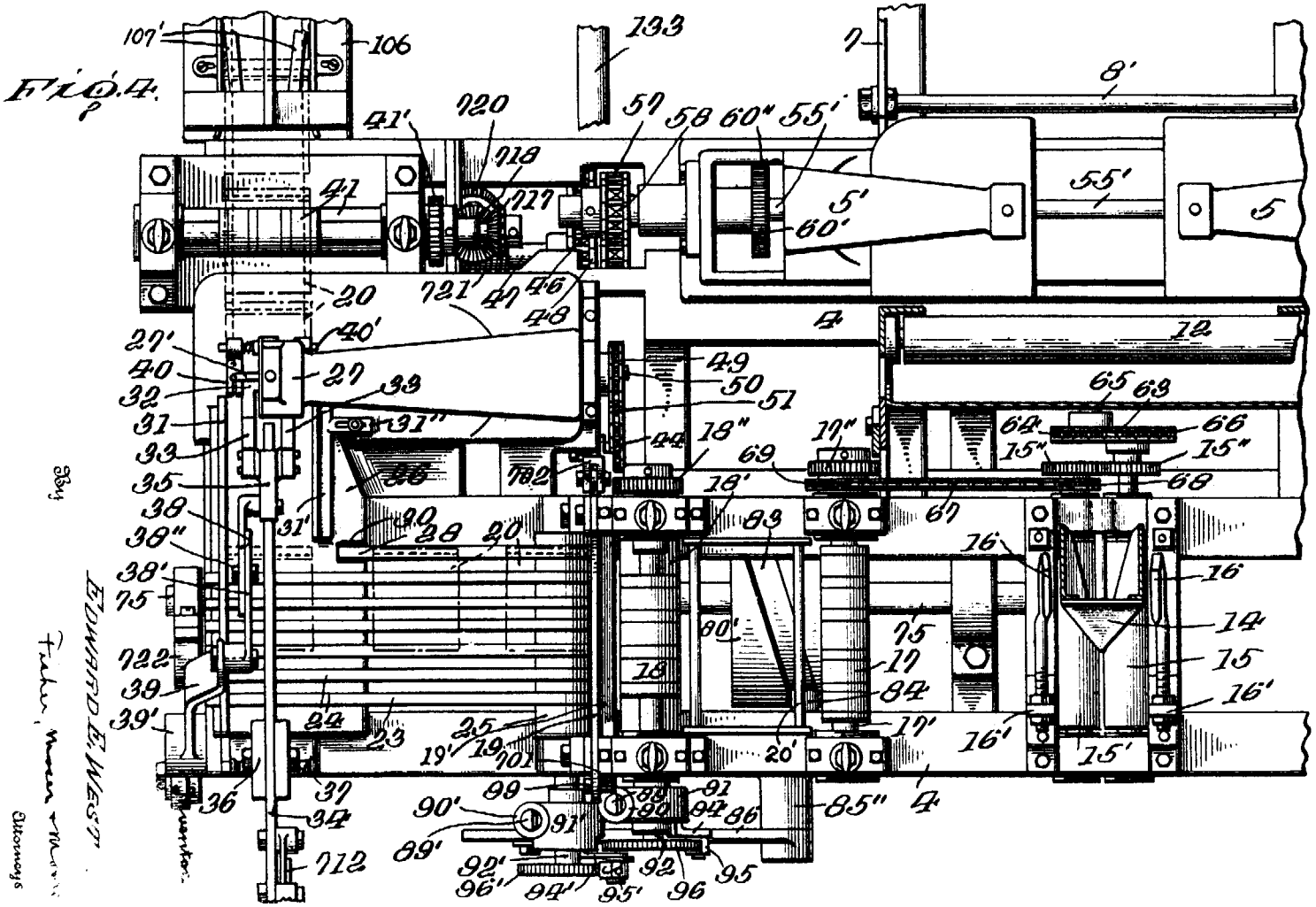
Figure 4 is a fragmentary plan view showing the fabric strip folding and feeding rolls and conveyer.
Figure 5:
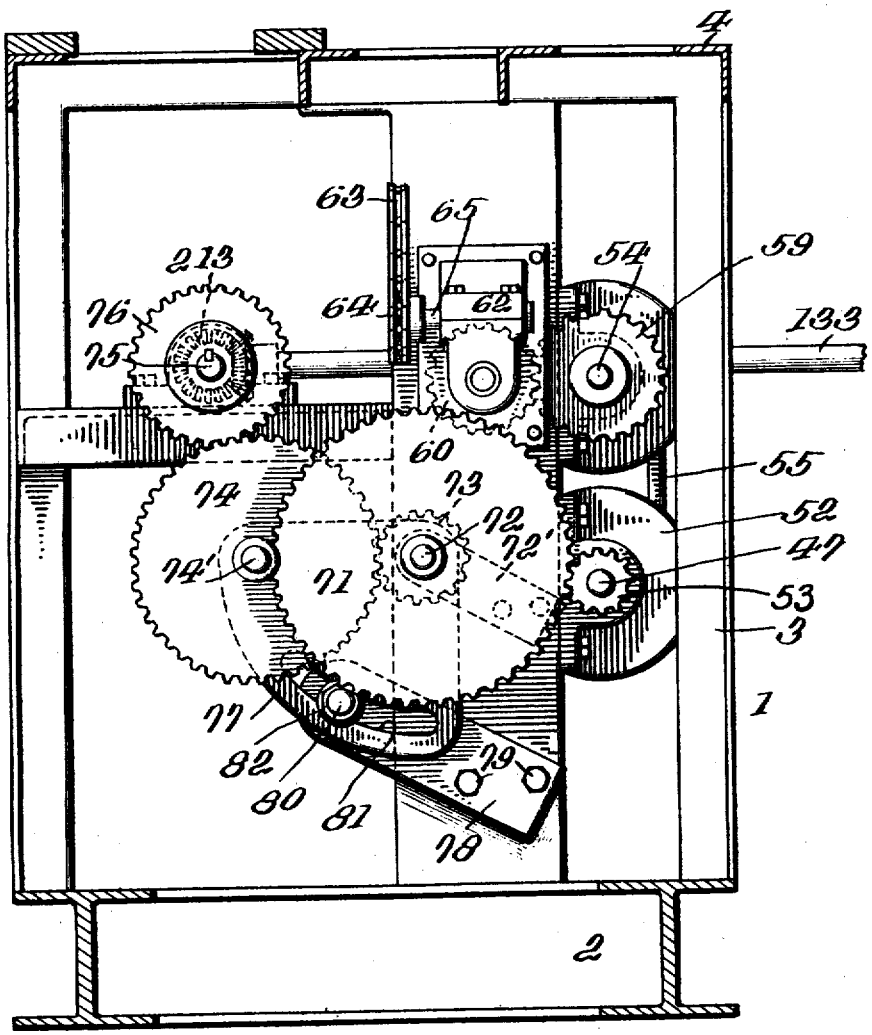
Figure 5 is a fragmentary detail elevation of the left end of the machine showing the variable speed and reduction gearing for the bag making mechanism.

The completed bags are pulled from beneath the sewing head 27, which, as previously stated, sews the side seams and connects the bags in chain formation, by means of the pair of upper and lower feed rolls 41 previously described as being mounted in advance of the sewing head (Figs. 2, 3 and 4). These feed rolls are, as previously stated, driven through gears 41'—41'' on the inner ends of the respective rolls, and the shaft of the lowermost roll 41 carries a bevel gear 717, which meshes with a bevel gear 718, on the uper end of a substantially vertically disposed drive shaft 719. Shaft 719 is journaled at its lower end in the base of the frame and carries a worm gear 720, intermediate its ends, which meshes with and is driven by a worm 721 on one end of lower horizontally disposed shaft 47, the latter being driven directly from the motor drive shaft 43, by means of sprocket chain 48, as previously described. The feed rollers 41 deliver the bags, still in chain formation, to a horizontal feed plate 106, hereinafter described, where the chain threads connecting the bags together are cut and the individual bags then moved to the respective stringing, knotting, tagging, reversing and delivering mechanism, driven from shaft 133 (Figs. 2 and 5).

Adjustments for Bags of Greater Width

To adjust the machine for a wider bag it is merely necessary to adjust the drive belt 55 for the "Reeves" variable speed, drive unit, in the customary manner, thus increasing the speed of upper or variable speed shaft 54, and in turn the speed of the sewing machine heads 5 and 5'. This also increases the speed of reduction unit 61 which drives the folding and creasing rollers 15—15' and the first pair of pulling rollers 17—17'. The throw of rack bar 89 must also be increased by sliding the lower end of the bar toward the right side of the machine in slot 88' of arm 86 (Figure 12) or towards the free end of this arm, thus increasing the speed of feed rollers 18—18'. Up to this point, that is, until the material reaches the second pair of feed rollers 18—18', the cloth is fed continuously, however the feed now becomes intermittent through the action of the feed rollers 18—18' and the conveyor 23. The speed of the conveyor belts must accordingly be reduced to accommodate the larger or wider bag blanks and this is done by shortening the throw of rack bar 89', by moving the same to the left or towards the rack bar 89. The respective rack bars pivotally support at their lower ends the stub shafts 97 and 97' and these shafts project through the slot 88' of arm 86 and may be adjusted in the slot when nuts 98 on the rear ends of these stub shafts are loosened, as previously described. It is necessary to provide means for accurately adjusting the speed of the conveyor belt to insure delivery of the bags against the stop or bag aligning bar 31, at the outer side edge of plate 26, without crushing or misaligning the same. Of course it is also necessary to increase the spacing of the needles of the sewing machine head 27 which sews the sides of the blank, in order to accommodate the increased width of bag blank passing therebeneath. This can readily be done by removing the bar 27' in which the needles 715 are carried, and substituting one of greater width.

Bag Feeding Mechanism

*(Figs. 16 to 19)*

Two uprights 105, on the top portion 4 of frame 1 rigidly support a substantially flat, rectangular feed or transfer plate 106, over which the bag lengths, in chain formation are drawn, in a manner about to be explained, as they leave the sewing head 27. Spring bridge pieces 107, at either end of the plate, support and space a guide rod or track 108 above the top face of the feed plate. Two spring arms 107', fixed on the rear bridge pieces, extend forwardly and downwardly and resiliently engage the top surfaces of the bags as they are fed along the plate 106 to chain thread cutters 113. A slide 109, sleeved on the guide track 108, carries a bag pusher member comprising a downwardly extending bifurcated member 110, the bifurcations of which in turn support two forwardly and downwardly extending spring fingers 111. These fingers engage under the bag hem, of the foremost bag of the chain and advance the bags intermittently, beneath the cutters 113 which severs the connecting threads, as the slide 109 is reciprocated. Bag guide runners 112, suitably mounted on the feed plate 106, cooperate with the plate to provide a guide or runway along which the bags 20 are fed in chain fashion, as they are conveyed from the sewing mechanism, in the manner described. Plates 106 and previously mentioned transfer plate 26, lie in substantially the same horizontal plane to insure accuracy of feed.

The two bag thread cutters 113 of substantial L-shape are mounted on the forward ends of rods 115 which are fixed at their rear ends to a rock shaft 116 in turn pivotally mounted in blocks 117 on the underside of feed plate 106. The cutters, extending upwardly and vertically movable through guide slots 114 in the feed plate 106, adjacent the forward ends of the guide runners 112, are provided with suitable cutting edges 113', more particularly shown in Figure 18*a*, so that when the rock shaft 116 and rods 115 are rocked downwardly the cutters 113 are likewise moved downwardly through the guide slots until their respective cutting edges 113' engage with two fixed cutting blades 113' (Figure 18*a*) suitably mounted on the feed plate 106 and extending into the slots 114, and thereby shear or sever the connecting bag threads. Two relatively flat leaf springs 113'', pivotally mounted on the forward ends of the rods 115 adjacent the cutters 113, extend upwardly and are vertically movable through the slots 114 simultaneously with the cutters 113. The springs 113'' engage the forward faces of the cutters 113 and the side of the slots 114 and thus maintain the cutters 113 in vertical alignment with respect to the stationary cutters 113' thereby assuring of an accurate cutting or shearing contact between the respective cutting blades.

A lug 118, mounted on rock shaft 116, carries a tension spring 119 which is compressed against the underside of the feed plate 106, when the rock shaft and cutters are rocked or moved downwardly to perform the cutting action, thus returning the cutters to their normal elevated position. It should be noted that the bag pusher fingers 111 engage the bag while the latter is stationary with its hem slightly to the rear of the thread cutters 113, and that the cutting of the thread occurs as the bag is being pushed forwardly, that is, while in motion. In other words, the forward stroke of pusher fingers 111 is somewhat greater than the combined length of and distance between successive bags. By cutting the threads, while the bags are in motion, the slight frictional or holding effect of the thread cutters, places the bag being advanced under slight tension. This causes the aligned ends of the pusher fingers 111 to maintain proper alignment of the hem as the bag is delivered to a reciprocating gripper and feed carriage 120, which is moving rearwardly to meet the then forwardly moving pusher arms 111.

After the side seam threads, connecting the moving bags in chain fashion, have been severed by the cutters 113, the bags are advanced by pusher fingers 111 into position to be gripped by suitable mechanism on the reciprocating bag gripper and feed carriage 120. This carriage comprises a pair of guide rods 121, slidably extending through the journal blocks 117 for rock shaft 116 and through a similar pair of blocks 117' at the forward end of the feed plate, on the underside thereof. These rods 121 carry, at their outer or forward ends, two spaced uprights 122 and two spaced parallel intermediately disposed rock shafts 123 and 123', respectively, which extend transversely between the uprights, and are geared together at one end by segmental gears 124 and 125, as shown in Figure 19. The forward end of the feed plate 106, like transfer plate 26, has an extended reduced portion 126 which is cut away to form two relatively short, integral bag supporting fingers 127, to permit of the carriage 120 moving close to the body of plate 106, as will be later understood.

The rock shafts 123 and 123' carry adjacent their opposite ends two pairs of crossed gripping jaws 128 and 128' respectively, adapted to intermittently grip the side edges of a bag when the latter has been advanced into proper position, between upper and lower fingers of the respective pairs, by the pusher fingers 111 and the rock shafts 123 and 123' have been actuated to rotate in appropriate directions, in a manner later described. There are also two pairs of spaced combined pusher and bag opening fingers 129 and 129', fixed to the respective shafts 123 and 123', intermediate the ends thereof, which function to push the bags and at the same time open the mouth of the bag, when carriage 120 is advanced. In addition to the hem opening and pushing fingers 129 and 129', previously described as being mounted upon the respective shafts 123—123', there are two additional pairs of hem gripping fingers 100—100', formed on hubs 101, loosely mounted on these shafts 123—123', intermediate the fingers 129—129'. The fingers 100—100' are outside of and overlap the fingers 129—129'. The hubs 101 are provided with segmental gears 102 which mesh with segmental gears 103 on a top shaft 104 and a lowermost shaft 104' also journalled in the uprights 122, all of which are particularly shown in Figure 19. When the hem opening and pushing fingers 129—129' are rocked to open position, the intermediate gripping fingers 100—100' are likewise rocked in an opposing direction to receive the bag by virtue of the segmental gear connection, just described, thus causing the hem to be clamped between the said gripping fingers and the hem opening and pusher fingers 129—129'. The fingers 129—129' are simultaneously moved into engagement with top and bottom faces of the bag, at points slightly behind the hems, so that when the gripper and feeding carriage 120 moves forwardly, the combined pusher and bag opening fingers 129—129' engage the line of stitching of the hem and push the bag forwardly. The crossed gripping jaws 128—128' are normally maintained in open position, while the combined pushing and bag opening fingers 129—129' are normally closed, due to the action of a relatively heavy coil spring 130 which is connected at opposite ends to one of the gripping jaws 128 and the uppermost shaft 104, supported in uprights 122. To close the jaws 128—128' and open the fingers 129—129', it is necessary to rotate the shafts 123—123' against the tension of the spring 130, by operating mechanism described later on. As the fingers 129—129' engage beneath the hem on opposite sides of the bag, shafts 123—123' are rocked in opposing directions to slightly separate the fingers of each pair, thus opening the mouth of the bag to facilitate placement upon the bag holding arms of the turret head, hereinafter referred to. Due to the fact that the hem is engaged at both sides, that is, top and bottom of the flat bag, the two sides of the hem are maintained parallel and the hems are in a position to be aligned with the axis of the stringing needles. This is essential to the proper functioning of the stringing mechanism.

The bag pusher fingers 111 and the bag gripper and feed carriage 120 are operated from a longitudinally disposed driven shaft 132, suitably mounted in the base 2 of frame 1, and carrying a series of cam disks, as will be presently described. This shaft 132 is driven in a clockwise direction, as viewed from the left side of the machine, through a horizontal shaft 133 geared to the main driven shaft 75, by gears 76' and 213' on the shafts 75 and 133 respectively. The outer end of shaft 132 carries a gear 132' which meshes with a worm gear 133' on shaft 133. A cross head 134, fixedly mounted on the guide rod 121 intermediate the ends thereof for reciprocation therewith beneath the plate 106, is pivotally connected to the rear end of a horizontal, adjustable link arm 135, in turn pivoted at its forward end to the upper end of a vertically disposed lever 136 having its lower end fulcrumed in a fixed lug 137 on frame base 2. The vertical lever 136 (Figures 21 and 22) carries a small roller 138 which travels in a cam groove 140 in one side face of a cam 139 mounted on and for rotation with the longitudinally disposed driven shaft 132, as particularly shown in Figures 21, 22 and 99. The contour of cam groove 140 is such that clockwise rotation of cam 139 and its shaft 132, relative to roller 138, oscillate the vertical lever 136 thus causing the link arm 135 to reciprocate the cross head 134 and bag gripper and feed carriage 120 on the guide rods 121 in order to advance a bag to the bag holding arms. The slide 109, carrying the bag pusher fingers 111, is reciprocated on the feed guide member or track 108 by means of a relatively short, sectional adjustable link 141, pivoted at its upper end to the slide and at its other end to the top extremity of a vertically disposed, bent, main actuating lever 142. The lower end of lever 142 is fulcrumed to a fixed pivot lug 143 (Figures 22 and 100) on the frame base 2. A small roller 144 mounted on the lever 142, rides in a cam groove 145 in the other side face of the cam 139 mounted on the longitudinally disposed driven shaft 132. The cam groove 145 is so shaped, as shown in Figure 100 that upon the rotation of the cam 139, the roller is acted upon to cause the lever 142 to first swing forwardly and move the pusher fingers 111 and the bag engaged thereby into engagement with the oppositely moving gripper and feed carriage 120, and thence back into position to engage and advance another bag.

Fixed to a cross rock shaft 147, journalled in the front feed plate bridge piece 107, is a downwardly and forwardly inclined bifurcated, spring presser or bag holding finger 148, which is straddled by the pusher fingers 111, at the end of the forward stroke of the latter. Actuation of the rock shaft in an anti-clockwise direction causes the presser finger 148 to engage the top surface of the bag and momentarily hold the same in position, while the bag spring fingers 111 start on their return stroke and until the pusher and spring fingers 129—129' engage beneath the hem and about the line of stitching, upon the initial forward movement of the gripper and feed carriage 120 thus insuring proper hem alignment.

Rock shaft 147 is actuated intermittently by means of a relatively short crank arm 149, rigidly connected at one end to the shaft 147, and at its other end pivoted to the upper end of a vertically disposed lever 150. The lower end of lever 150 is pivotally connected to a bent arm 151, fulcrumed in a fixed lug 152 on frame 1, and carrying a roller 153 which rides on and is engaged by the hump or raised portion 139' on the periphery of the cam 139, fixedly mounted on the longitudinal shaft 132 (Figure 99). Upon each rotation of cam 139, as the hump 139' passes beneath the roller 153, lever 151 is first moved upwardly and then downwardly thereby rocking shaft 147 and lowering the raising. the presser finger 148 into and out of engagement with the top face of the bag, in timed relation to the movements of pusher fingers 111 and the carriage 120.

The chain thread cutters 113, previously mentioned, are intermittently tripped or actuated by a short slotted arm 154 (Figure 17) adjustably mounted upon and projecting forwardly from the upper end of bent lever 142, previously referred to as being operatively connected to cam 139. Arm 154 carries a pivoted lug or trip member 155 which engages and trips a crank arm 156, fixed to one end of rock shaft 116, on the forward movement of the lever 142 and pusher fingers 111, actuated thereby. Oscillation of rock shaft 116 actuates cutter carrying rods 115 which in turn move the cutters 113 downwardly through slots 114 until the cutting edges 113' engage with and sever the bag threads. After the cutters on their downward movement through slots 114 have severed the connecting threads, the spring 119 causes the rods 115 and cutters 113 to return to their normal elevated position, the pusher fingers 111 also being returned into position to engage the hem of the succeeding bag by the action of cam 139 on lever 142. During this return movement, the trip member 155 rides freely over crank arm 156.

The rock shafts 123—123' and the gripping jaws 128—128', and combined pushing and opening fingers 129—129' respectively, mounted on these shafts, are actuated through the medium of a horizontally disposed lifting arm 157 which is pivotally supported by a pair of parallel links 158 and 158' mounted upon posts 159 on frame top portion 4. Link 158 is pivotally connected, intermediate its ends, to the upper end of a vertically disposed adjustable lever 161, pivoted at its lower end to the front end of an arm 162, which is fulcrumed at its rear end in a fixed lug 163 on frame 1. A roller 164, carried by arm 162, rides on the cam shaped periphery of a cam 165, mounted on the longitudinally disposed shaft 132, as particularly shown in Figure 98. Once during each rotation of the cam 165, the link and lever mechanism, at predetermined times, elevates and lowers an arm 166, secured to the end of the lower rock shaft 123', for rotation therewith, to open and close the respective pairs of pushing and opening fingers 129—129' and gripping jaws 128—128', the reverse movement of the respective fingers and jaws being controlled by coil springs 130. The contour of cam 165 is such that it first elevates the lifting arm 157, approximately one half its full stroke, to partially open the combined pusher and opening fingers 129—129' sufficiently to permit the bag, being fed by the spring pusher fingers 111, to pass therebetween at the end of the forward stroke of the feed carriage 120. Upon continued rotation of cam 165, roller 164 on arm 162 is lowered by the action of spring 161' and the lifting arm 157 drops to its original lowered position, permitting the fingers 129—129' to press upon opposite sides of the bag, directly in the rear of the hem until the said fingers move forwardly under the hems. Further rotation of cam 165 now elevates lift arm 157 to its full elevated position or to the full extent of its upward stroke. This causes the hem jaws 128—128' to close on the sides of the bag and the bag opener fingers 129—129' to open, and as the latter have been previously advanced into the hem, and as the second pair of fingers 100—100' have gripped the outer faces of the hem, the mouth of the bag is pulled open. The fingers 129—129' hold the mouth of the bag in open position, as shown in Figure 20, until the carriage 120 reaches the end of its forward stroke, at which time the bag holding arms 185 are expanded and receive the bag in its correct aligned position thereon. The constantly rotating cam 165, by reason of its action on the arm 162, lever 161 and links 158—158' now permits the lifting arm 157 to drop to normal or lowered position and the gripper fingers 129—129' and 100—100' to open to release the bag, as the gripper and feed carriage 120 returns to its receiving station.

Rotating Bag Carrying Turret Head

*(Figures 16, 21 and 22)*

The purpose of this mechanism is to provide means, such as a rotating turret head, for receiving a hemmed bag from the aforementioned gripper and feed carriage 120 in a horizontal position and for intermittently rotating the bag to an upright or vertical string and tagging station and thence to a horizontal position at the delivery station. At this elevated position the bag holding means is locked against rotation, as shown in Figure 21, until the stringing and tagging has been completed, whereupon the bag holding means is again rotated to carry the finished bag downwardly to a horizontal station where the same is acted upon by a bag turning and delivery mechanism. While the turret head is intermittently rotated to carry the bag holding arms and bags to the respective vertical stringing and horizontal turning stations, it should be understood that when a hemmed bag is being fed onto a pair of turret bag holding arms in a horizontal position, the preceding pairs of turret bag holding arms have carried a strung and tagged bag from the vertical stringing station downwardly to the horizontal delivering position, and the succeeding pair of bag holding arms have carried a hemmed bag to the vertical stringing and tagging station. Thus different operations are continually taking place at each of the three stations.

The bag holding turret head comprises a shaft 178, journalled in vertically disposed, spaced bracket supports 179 and 180 which are mounted on the top portion 4 of frame 1. A pair of sleeves 181 are mounted upon and keyed to the shaft 178 and each of the sleeves is provided with a circumferentially disposed, radially extending, series of slotted hub portions 182, in the slots 183' of which the inner ends or offset base portions 184 of the bag holding arms 185 are mounted. There are four arms on each sleeve, arranged in pairs, that is, oppositely disposed arms on the respective sleeves constitute a pair, the arms of each pair having a pivotal movement as at 185', inwardly toward each other to retracted position from their normal open or parallel position, and return. The means for expanding and contracting each pair of arms, to facilitate the positioning of and to firmly hold the bags thereon, during the threading and tagging operations, is comprised of a pair of bell cranks 186, positioned along and pivoted, as at 186' to the outer sides of the turret head projecting hub portions 182, and pivoted to a pair of downwardly depending links 187, in turn pivotally connected to relatively short crank arms 188, fixed on a horizontally disposed rock shaft 189 suitably journalled in the frame 1. One of the crank arms 188 has a projection 190 thereon which is pivoted to a downwardly extending toggle arm 191, in turn pivoted to an arm 192 connected to a fixed pivot lug 193 on frame 1. A roller 194 on arm 192 travels in a cam groove 196 in one face of a cam disk 195, as shown in Figures 21 and 97, mounted on the longitudinally disposed driven shaft 132. The cam groove 196 is contoured (Figure 97) so that upon rotation of cam disk 195, the arm 192 and toggle 191 are reciprocated to in turn actuate the crank arms 188, links 187 and bell cranks 186. The bell cranks 186, fulcrumed adjacent their inner ends in the shaft supports 179 and 180 are provided with rollers or pins 197 on their outer ends. The rollers 197 are positioned to the rear of pivoted offset bag arm portions 184 whereby upon oscillation of shaft 189, resulting from the action of cam 195 on the link arms, the bell cranks 186 will be pulled downwardly thereby rocking the rollers 197 rearwardly into engagement with the flanges 184' of the offset arm portions 184, and rocking the same inwardly on their pivots against the tension of the springs 197', suitably positioned in recesses 183. This movement of the rollers 197 rocks the bag arms 185 inwardly to the closed horizontal bag receiving position shown in Figure 22. While the arms are in this position, a bag is placed, by the bag feeding carriage 120 and grippers 128—128', in its correct position on the bag holding arms 185. Continued rotation of cam 195 causes the bell cranks 186 to be rocked in the opposite or reverse direction to that just described, thus moving the rollers 197 back out of engagement with the flanges 184', and allowing the arms to spring back to their normal parallel or open position under the action of springs 197'. The arms now slightly stretch and tightly hold the bag with the hem portion in the proper aligned position to be moved into the path of the stringing needles upon the next rotation or step of the turret head. The timing of the movement of the side hem gripper jaws 128—128' is such that these jaws will be opened to release the bag before the turret is again rotated, as previously referred to.

Geneva Drive

*(Figs. 1, 16, 21, 22a and 81)*

The turret head is intermittently rotated to carry the bag holding arms to the various stations, by means of a Geneva mechanism as follows: A Geneva gear 198, keyed to one end of the turret head shaft 178, is formed with radial portions 199, four in number, separated by radial slots or grooves 200, the faces or extremities of these radial portions being arcuate, as shown in Figure 22a. Co-operating with this Geneva gear 198 is a circular disk 202, cut away at 203, and having a radially disposed arm 204 provided with a Geneva driving pin 205. The disk 202 is mounted on a horizontal shaft 206 journalled in support 179 and a suitable bearing 207, on the top frame portion 4. A large gear 208, mounted on the outer end of the shaft 206, meshes with a large gear 209 (Figure 16) on one end of a horizontally disposed driven shaft 210, extending across the front end of the machine and carrying a plurality of cams hereinafter referred to, for operating the threading, knotting and tagging mechanism. The opposite end of cam carrying shaft 210 is provided with a gear 211 which meshes with a spiral gear 212 mounted on the horizontally disposed main driven shaft 133. The shaft 133, as previously described, extends transversely of the frame and the outer end thereof carries a mitre gear 213 which meshes with the mitre gear 76' on the main drive shaft 75. Normally, the circular periphery of disk 202 engages one of the arc-shaped sectors 201 of the Geneva gear and once in each rotation of shaft 206, the Geneva pin 205 will engage one of the radial slots or grooves 200 and move the Geneva gear 198 one quarter of a turn. Each step by step movement imparted to Geneva gear 198, causes the turret head to rotate one quarter of a revolution thus moving the first or receiving pair of bag holding arms 185 from a horizontal to a vertical position and thence to a horizontal position, and finally to a downwardly extending vertical or idle position.

Turret Head Locking Mechanism

*(Figures 21 and 22)*

Means is provided for automatically locking the turret head and bag holding arms when a pair of arms and a bag have been elevated to the vertical threading position, and for maintaining the same in this locked position throughout the stringing, knotting and tagging operation. Thus a locking pin 214 (Figures 21 and 22) is pivoted to the extremity of one arm of a bell crank 215 in turn pivoted to the supporting bracket 180. The other end of bell crank 215 is pivotally connected to a vertically disposed lever 216 in turn pivoted at its lower end to one end of an arm 217 which is fulcrumed to a lug 218 (Figures 35 and 104) on the side of machine frame 1. Arm 217 carries a roller 219, intermediate its ends, which rests upon and rides over the periphery of a large cam 220, mounted on horizontal main driven shaft 133 as shown in Figures 21, 35, 58, 81 and 104. Locking pin 214 projects through a bearing 221 in the side of bracket 180 and extends into recesses 222 in the base of offset bag arm portions 184. The contour of cam 220 as best shown in Figure 104, is such that upon each rotation of the latter the action of the raised and depressed portions of the cam on roller 219, rocks the vertical arm of crank 215 inwardly and pushes the locking pin 214 into locking engagement with the offset bag arm portions 184. The arms are momentarily locked in vertical stringing position, until, during the continued rotation of the cam, the depressed portion of the latter is presented to the roller whereupon the reverse movement of crank arm 215 takes place and the pin 214 is withdrawn. The turret head is then free to be moved another one quarter turn by the Geneva gear.

From this point in the description, it is to be understood that such mechanism as feeding, gripping, stringing, cutting and knotting on one side are duplicated on the other side thereof. The corresponding parts on the two sides of the machine are in practically every instance identical in both construction and operation. However, due to the presence of the tagging mechanism on the right side of the machine, it was found necessary to make certain slight changes in the parts on the right side but the basic function and operation of these parts is identical with those on the left side. In order to enable a clear understanding to be had it is deemed advisable to describe the mechanism on both sides of the machine, pointing out wherein one side differs from the other. While it is thought that a description of and detail showing of one side would suffice, in every instance both sides are considered and described separately and illustrated in detail and wherever a repitition or duplication of the parts occurs it will be understood that this has been done so that no misunderstanding of the construction and operation of the various mechanisms may arise.

Bag Stringing Mechanism—Left Side

*(Figures 16, 23 to 29 and 72 to 80)*

The function of this mechanism is to insert the threads or draw strings simultaneously through both hems of the bag while the latter is maintained in a vertical or elevated position on the turret head bag holding arms 185, and to knot the free ends of the strings on the respective ends of the bag hems, in a manner about to be described.

On the left side of the machine, viewed from the front, a needle saddle 223 is slidably sleeved on two spaced, horizontally positioned, guide tracks 224, which are connected at their inner ends to the upper of two horizontally disposed plates 225 and 226, mounted on a flange 228 formed on the top of the left hand, bracket 180, of the spaced brackets 179 and 180, and at their outer ends are connected to a block 229 (Figure 23) supported above the top frame portion 4 by the posts 229'. The outer ends of two hollow threading or string needle sleeves 230, within which are positioned reciprocating pointed needles 231, hereinafter more clearly described, are fixedly secured in the needles saddle 223. The latter is reciprocated inwardly and outwardly on the guide tracks 224, to move the needles through the hems during the threading, knotting and tagging operations, by means of a vertically disposed lever 232 pivotally connected at its upper end to an arm 233, in turn pivoted to the rear end of the saddle 223. Lever 232, fulcrumed to a fixed pivot lug 234 (Figure 104) on the frame base 2, carries a roller 235 which travels in a cam groove 237 in the side face of the large cam 220, mounted on horizontal shaft 133, as best shown in Figures 35 and 104, whereby upon rotation of the cam, the lever 232 and arm 233 reciprocate the needle saddle back and forth on the guide tracks 224 to move the threaded needles 231 through the bag hem of a bag B while the latter is supported in vertical position on a pair of the bag holding arms 185.

Side Bag Hem Grippers

*(Figures 16, 30 to 32)*

When a bag has been raised to elevated stringing position and the turret head locked against movement, means for gripping the side hems of the bag and holding the bag firmly on the bag holding arms throughout the stringing and tagging operations, is brought into play. Thus, two downwardly depending gripping fingers or clamps 238 are loosely mounted in an ear 239 formed on the inner end of a goose neck arm 240, pivotally connected intermediate its ends, as at 241, to an elevated supporting bracket 241, secured to flange 228 of bracket 180. The clamps 238 are moved inwardly in opposite directions to close upon and grip the side hem of the bag by means of two oppositely offset portions or crank arms 242, mounted on the upper end thereof, and to each of which is pivotally connected a pitman 243, in turn pivoted to the upper end of a lever 244. This lever 244 is pivotally connected intermediate its ends to goose neck 240, as at 245, and the lower end thereof is also pivotally connected to one end of a link 247. The other end of link 247 is pivotally connected to a horizontally disposed arm 248 which is slidably connected to a relatively short link 246 by means of headed bolts 248' extending through slots 248'' in arm 248 and bolt holes in link 246. The lower end of the goose neck 240 is pivotally connected as at 246', to the inner end of link 246 and the outer end of link 246 is also resiliently connected to arm 248 for slight relative sliding movement by means of a coil spring 246'' which is attached at opposite ends to these respective parts, for a purpose presently described. The rear end of horizontal arm 248 is pivotally connected, as at 249' to the upper end of a vertically disposed lever 249, Figure 105, in turn connected at its lower end to a fixed pivot 250 on the frame base 2. A roller 251, carried by lever 249, rides in a cam groove 253 in one side face of a cam disk 252 (Figures 35 and 105) mounted on shaft 133. The contour of cam groove 253 is such that upon each rotation of cam 252, the goose neck arm and gripper clamps 238, by virtue of the connecting linkage, are simultaneously rocked downwardly on the pivot 240', in a clockwise direction, due to the spring 246 holding the arm 248 and link 246 against relative movement, until a stop pin 240'' carried by a lug 240' formed on the goose neck 240 engages the side edge of the bracket 241, as shown in Figure 31, and the downward rocking movement of the goose neck is stopped. At this point, the arm 248 continues to travel a short distance outwardly, under the influence of cam 252 and against the tension of spring 246', thereby moving the link 247 in a corresponding direction and rocking the lever 244 from the dotted to the full line position shown in Figure 30. The pitmans 243 and offset portions 242 are thus moved inwardly simultaneously and the clamps 238 are moved inwardly in opposite directions to grip the opposing side edges of the bag, as shown by the arrows Figure 32. The clamps 238 are maintained in their closed position on the hem side throughout the stringing and tagging operations and upon completion of the latter, the foregoing movements of the arm 248, links 246—247, goose neck 240 and lever 244 are reversed by the action of the continuously rotating cam 252. The grippers 238 are thus opened, due to the lever 244 being returned, under the tension of spring 246, from the full line to the dotted line position shown in Figure 30, to release the bag and the goose neck 240 is elevated to idle position, so that when the next succeeding bag is raised to elevated stringing position the cycle will be repeated.

As the threaded needles 231 enter the hems of the bag on the left side it is only necessary to grip and support the left hand edge or hem of the bag, in the manner described above, and therefore corresponding hem gripping mechanism is not provided on the right side of the turret.

NEEDLE OPERATING MECHANISM

*(Figures 16, 23 to 29)*

The needles 231 are actuated in the needle sleeve 230 to open and closed positions to successively receive and grip the respective draw strings and to convey the strings through the bag hems, on the forward and return strokes of the needles, to positions where the strings are acted upon by knotters and a tagging mechanism, in timed relation to the movements of the turret head and bag receiving arms. Thus the outer ends of reciprocating needles 231, are fixed in a small block 254 mounted in the saddle 223 for slight relative sliding movement with respect thereto. Block 254 is inwardly actuated against the tension of springs 255 mounted on posts 255', by means of a small cam 256 (Figures 25 and 27) carried by one arm of a crank 257, supported in journals 255' formed on the needle saddle, and is returned to its normal or outward position by the spring 255. The other arm of crank 257 carries a roller 258 which rides over and is periodically actuated by a horizontally disposed lifting arm 259, described more particularly later on. The needle saddle is reciprocated back and forth on the guide rods or tracks 224 by the action of the cam 220 mounted on shaft 133, as previously described, and at predetermined points of saddle travel, the block 254 is engaged by cam 256 on crank 257, the needles 231 are thus moved inwardly through their sleeves a sufficient distance to provide eyes or openings 231', between the outer ends of the sleeves 230 and the inner ends of the pointed heads of the needles 231, into which the ends of the respective stringing threads are received. At this point in the description it might be well to call attention to the fact that the opposing outer ends of the needle sleeves 230 are cut out or recessed as at 230' (Figure 62), to enable the string picker of the knotting mechanism on the right side of the machine to grip and raise the strings from the needle eyes 231' when the needles have been advanced through the bag hems from the left side to the right side on their forward stroke, as presently described in detail. The left arm 259 (Figure 23) extends along the side of one of the saddle guide tracks 224 and is pivotally connected at one end, by means of a link 260, to top supporting plate 225, and at its other end to a bell crank 261 (Figures 23 and 23*a*) in turn pivoted at one end to the side of the guide track block 229. The bell crank is pivotally connected at its other end to the upper end of a pitman 262 (Figure 103), which is pivoted at its lower end to the free end of a horizontally disposed arm 263 fulcrumed to the side of frame 1. A roller 264, carried by arm 263, rests on the periphery of a cam 265 (Figures 35 and 103), mounted on horizontal shaft 133. Once in each rotation of the cam the roller 264 rides over a raised portion or hump 265' on the cam 265, whereupon movement of the associated linkage, swings or lifts the lift arm 259 upwardly thereby raising the rollered crank arm 257 and actuating the needle block and needles in an obvious manner.

BAG STRING FEEDING, GRIPPING AND CUTTING MECHANISM

*(Figures 16, 23, 36 to 41)*

The function of this mechanism is to carry the end of the string S, being fed to the left side of the machine from the string supply roll R of the two supply rollers R and R' across the needles to a position where it is gripped by a string gripper, at the needle threading station, and after the string has been gripped thereby and the looped string pulled to the necessary length for service as a draw string, by means of a string hook 285, an oscillating cutter 283 severs the string and permits the needles to advance and carry the severed string section through the bag hems. While the string feeding, gripping and cutting elements about to be described are arranged on the left side of the turret head, similar parts are likewise provided on the right or tagging side of the turret, as will be later referred to.

A string feeding guide tube 266 (Figures 23 and 40), through which extends a string S drawn from a supply roll R, suitably supported on the top portion 4 of frame 1, is fixedly mounted adjacent its rear end in a collar 267 carried on one end of a bell crank 268 (Figures 17, 23–40), in turn pivoted to the side of left hand bracket 180. The forward end of guide tube 266, extends loosely through a guide block 269 on the top supporting plate 225, and on its forward stroke carries the free end of string S, across the needles, into position to be gripped by the serrated faces 271 formed on the inner ends of upper and lower gripping jaws 270 and 270', respectively, which are pivoted, intermediate their ends, to a shaft 272 fixed in top supporting plate 225. The outer ends of the jaws are slightly offset, with respect to the inner ends, and a compression coil spring 273 connected to said outer ends and forces the same apart, serves to normally maintain the gripping jaws in closed position, as shown in Figure 38. An arm 274, pivoted on shaft 272, carries a stud or pin 274' on the end thereof which extends beneath and raises the top gripping jaw 270 to the full line position of Figure 37 when the inner end of the arm is elevated by reason of the outer end thereof being pulled downwardly by the action of a vertically disposed lever 275 (Figure 81) pivoted to the outer end of the arm 274 (Figure 55). A second stud or pin 274'', suitably fixed in the top plate 225, extends between the inner ends of the gripping fingers, adjacent the extremities thereof and serves as a stop to limit the final downward and upward movements of the upper and lower gripping jaws or fingers 270—270', respectively. The lever 275 is pivotally connected at its lower end to an arm 276 (Figures 81 and 87), in turn pivoted to a fixed lug 277' in a cam housing 277, suitably secured to the top frame 2 and encasing the cams on driven shaft 210. A roller 278 mounted on arm 276, travels in a cam groove 280 in one face of a cam disk 279, as shown in Figures 81 and 87, mounted on the horizontal driven shaft 210. The contour of cam groove 280 is such that during each rotation of the cam 279 in a clockwise direction, the roller 278 rocks arm 276 and causes the lever 275 to reciprocate vertically and to in turn rock the arm 274.

On the downward stroke of the lever 275 and the outer end of the arm 274 the upper gripping jaw 270 will be raised to open position by stud 274', as shown in full lines in Figure 37. When the upper gripping jaw 270 is in this position, the string guide tube 266 will be reciprocated forwardly to a position adjacent the gripping jaws, and a string S, projecting from the end thereof, will be projected into the path of movement of the elevated upper jaw 270. Continued rotation of the cam 279 will now cause the lever 275 to be elevated and the stud 274' to move downwardly. The upper jaw 270 will now be free to be lowered by spring 273 to a gripping position with respect to the lower jaw, the latter being prevented from moving upwardly by the stop pin 274'', and the end of the string will be firmly gripped by the jaws. When the string tube 266 has been retracted across the needles by means of bell crank 268, the string drawn outwardly in the form of a loop, the needles brought into position and the eyes 231' opened, and the cutters moved downwardly to press the string into the eyes of the needles, as presently described, the gripping fingers 270 and 270', with the string gripped in the jaws thereof, will be further depressed a slight distance by the downward movement of the pin 274', from the dotted line position of Figure 37 to the full line position of Figure 38, until the top pin 270 abuts the stop pin 274'' which carries the string downwardly and positions the same in the open eyes 231' of the needles. As the needle eyes 231' close on the string, the pin 274 continues to move downwardly a short distance which moves the lower jaw 270' into the dotted line position of Figure 38 thereby releasing the string.

A cutter rod or shaft 281, Figures 17 and 23, lying approximately parallel with the string guide tube 266, is journalled at its outer end in a bracket 282 on the bracket flange 228 (Figure 40) and the forward end thereof projects through the block 269. The forward end of cutter rod 281 is provided with a laterally extending movable cutter blade 283 which coacts with a stationary blade 284 on the top plate 225, in cutting the string fed across the needles by guide tube 266, after the string has been gripped by gripper 270 and pulled outwardly by a string hook 285, mounted on the needle saddle 223, intermediate the needle sleeves 230, and through a string guide 285'' mounted on plate 225 between the needles 230. The cutter shaft 281 (Figure 40) is rocked in its bearings to move the cutter blade 283 downwardly into cutting engagement with the fixed blade 284 (Figure 38 position), to sever the string, by means of a crank arm 286, connected to the rear end thereof and pivoted to a link 287. The link 287 is in turn pivotally connected to one arm of a bell crank 289, pivoted to supporting bracket 180, and the other arm of crank 289 is pivotally connected to the upper end of a vertically disposed lever 290, having its lower end pivoted to an arm 291 (Figures 22 and 96) in turn fulcrumed to a fixed lug 291'' on frame 1. A roller 292, carried by arm 291, travels in a cam groove 293 in the other side face of the cam 195, mounted on the horizontal driven shaft 132.

The rearwardly and downwardly extending arm of string tube bell crank 268, best shown in Figure 17, is pivotally connected by a link 294 to an arm portion 296 of a collar 295, fixed on the rear end of cutter rod 281, arm 296 being offset with respect to crank arm 286. It will thus be noted that arcuate movement of arm 296, as presently described, causes the bell crank 268 to be actuated forwardly and rearwardly to reciprocate the string guide tube 266 across the needles 231.

Cam groove 293 is so designed that during the rotation of cam 195, the crank arm 286 and offset arm portion 296 will be simultaneously rocked downwardly in an arc, from the dotted line position of Figure 41, in an anti-clockwise direction, viewed from the rear of the machine. When the offset arm portion 296, reaches the substantial vertical or dead center position with respect to its pivot, movement thereof will be slowed down or maintained momentarily in a substantially stationary retracted or idle position to the rear of the needles 230. However the crank arm 286, by reason of its offset relationship with respect to arm portion 296, continues to move while the offset arm 296 is passing through its dead center position. Thus it will be seen that the tube 266 will be in relatively stationary position while the cutter rod 281 is rotated or rocked to cutting position against the fixed blade 284 to sever the string. Continued rotation of cam 195 reverses the movement of crank arm 286, that is, rocks the same in a direction opposite to that just described, to raise or elevate the cutting blade 283. At the same time the offset arm 296 will move upwardly in an arc in a clockwise direction to the dotted line position of Figure 41, thereby causing the other string tube bell crank arm 296 to move the string tube 266 forwardly in the direction of the arrows, Figure 17 across the needles 230 into position to be gripped by the string gripper. This cycle continues indefinitely or until the motor 22 is turned off.

When the string has been gripped by gripper 270 and the tube retracted across the needles, the string hook 285 will draw the string outwardly to provide the necessary length of string, as best shown in Figure 75. During this operation, the needles have reached the end of their backward stroke and the eyes 231' thereof are opened and positioned in alignment with the string guide tube and string grippers (Figure 75), at which time the grippers and cutters 283 simultaneously move downwardly a relatively short distance thereby carrying or placing the string in the open eyes 231' of the needles, at which time the needles are actuated to cause the eyes 231' to close upon and grip the string and the movable cutter blade 283 is actuated to engage the stationary blade 284 and the string is severed or sheared, as best shown in Figure 76. During this movement the grippers are simultaneously actuated to depress the lower gripper jaw 270' to the dotted line position of Figure 38 to free or disengage the string. The needles are now in position to move forward and carry the strings through the hems, after the latter have been snagged and opened by snaggers about to be described.

Bag Hem Openers and Snaggers
*(Figures 16, 32 to 50 and 58)*

In order that the stringing operation may be efficiently performed, it is necessary to open the bag hem and to simultaneously snag the inner faces thereof below the line of stitching, and opposite to and in alignment with the ends of the stringing needles, on the left side of the bags, viewed from the front of the machine. I accomplish this by means of a pair of snaggers or pickers 302 and 303 mounted on the base plate 225, suitably supported on the bracket flange 228, which also serves as a support for two pairs of relatively flat inner and outer, actuating links and bell cranks 305 and 306, respectively. The outer bell cranks 306 are pivotally connected, intermediate their ends, to the outer ends of the plate 225 by pins 307, whereas the inner links 305 are pivotally connected at their outer ends to the base plate 225 by studs 308, depending from a top plate 309, suitably fixed to the base plate by bolts 309'. The studs 308 are adapted to pass through openings 305' formed in the inner ends of links 305. A pair of flat top snagger carrying links 310 are mounted on and pivotally connected at their outer ends to the inner ends of the links 305, by means of upstanding pins 311 carried by the said links 305 and adapted to be loosely received in recesses 310' formed in the under face of the links 310. The outer ends of links 310 are provided with depending studs 310'' adapted to be pivotally received in openings 306' formed in bell cranks 306. Relatively flat plates 312, mounted on the inner ends of the top snagger carrying links 310, by means of bolts 312', are formed with longitudinally extending slotted bores 313 through which slidably project spring tensioned rods or pins 314, the outer ends of the pins being formed with beveled snagging points 315. The outer ends of bell cranks 306 are formed with ball-shaped studs 306'' adapted for pivotal connection with upstanding links 316 fixed on a shaft 317 journalled in suitable top frame bearings 318, as best shown in Figures 21 and 22, by connecting links 316'. One of the bell cranks 306 is also pivotally connected by a link 319 (Figure 23) to the upper end of a vertically disposed lever 320, (Figure 35) which is pivoted at its lower end to a lug 321 on the base 2 of the frame. A roller 322, carried by lever 320, rides in a cam groove 323 in a face of the cam disk 265, as best shown in Figure 103, on the horizontal driven shaft 133.

When a pair of bag carrying arms 185, having a bag positioned thereon, are raised to elevated stringing position, the turret head is locked against rotary movement and the needles threaded. By reason of the shape of the cam groove 323 rotation of the cam 265 in a clockwise direction, causes the lever 320 to be reciprocated upwardly and this in turn rocks the bell cranks 306 and links 305 about their fixed pivots, thereby causing the snagger points 315 to first move in a substantially arcuate course, as particularly shown in Figure 44, to engage with and pierce the side of the hem, the snagger points then continue on a lesser arc a slight distance inwardly, substantially parallel with the hem, from full line to first dotted line position (Figure 44) thus becoming thoroughly hooked in the material and producing a substantial snag or opening. The final arcuate movement of the snaggers is broadened or widened from the first to the second dotted line position (Figure 44) as indicated by the arrow in this figure. This final arcuate movement draws the material outwardly thereby opening the hem, to facilitate the entry of the needles, in the manner best shown in Figure 49, which might otherwise completely miss the hem and/or opening snagged therein. Continued rotation of cam 265, will now reciprocate the lever 320 on its downward stroke thus reversing the movement of the snagger points to permit entry of the needles.

Operation of Needles, Side Hem Grippers and Hem Snaggers on Left Side of Turret Head (Viewed from Front of Machine)

*(Figures 16, 23, 72 to 80)*

A clear understanding of the function and operation of the threading mechanism, can perhaps be best had by starting with the first step after the needles 231 have passed through the side hems in a retracted or closed threaded position, on the forward stroke of the needle saddle 223, and the thread S has been carried through the respective hems to the string feeding, gripping, cutting and knotting mechanism arranged on the right side of the turret head. When the needle sleeves and needles are in their forward or advanced position, with the latter extending through the opposite ends of the hems, the strings and needles are acted upon by the mechanism on the right side of the machine. At the end of the forward or threading stroke of the needles (see Figure 78), the string hook 285 on the needle saddle 223 has been advanced, due to the forward travel of the saddle, to a position ahead of or passed the string feeding tube 266 and string gripper 270, as best shown in Figure 78. A slight pause in the motion of the needles, prior to beginning their return stroke, permits the string tube 266 to slide forwardly across the needles and behind the string hook 285, Figure 79. During the movement of the string tube the grippers 270–270' have been rocked to open or elevated position, which permits the tube to extend into and deliver the free end of a string to the grippers, as shown in Figure 79, whereupon the latter descend and firmly grip and hold the ends of the string in position. The string tube is then retracted or drawn rearwardly behind the string hook to its normal idle position at the rear of cutter blade 283. The needle saddle and needles are being retracted during the withdrawal of the tube, which causes the string hook 285 to pull or draw the string outwardly through the string guides 285', as also shown in Figure 79, until the end of the back stroke of the saddle is reached. Before completion of this back stroke the eyes 231' of the needles will have been opened and positioned in alignment with the string tube and grippers, as shown in Figure 75. The rocking movement of the string grippers now in closed position and gripping the string, is continued for a very short distance to complete the downward stroke thereof, as previously described, and at the same time the moveable cutter 283 is rocked on its pivot, thereby positioning the clamped string within the needle eyes 231', whereupon the needles are moved rearwardly to closed or retracted position with the string gripped thereon, as best shown in Figure 76, and the cutter 283 completes its downward movement to sever the string and the lower gripper jaw moves to disengage or free the string from the string grippers.

Prior to the needles reaching the end of their forward travel through the bag hems, it is essential that the string be lifted out of engagement with the string hook 285 to enable the knotting mechanism about to be described, to elevate the string from its gripped position in the eyes 231' and knot the same. A lifting arm 324, best shown in Figure 23, is provided with a bent finger 325 on its inner end, positioned between the needles, and over which the string passes during the forward stroke of the saddle and hook. The arm 324 is pivoted adjacent its inner end to the top plate 225 and at its outer end to the string gripper operating lever 275. Movement imparted to lever 275 by cam 279, prior to the completion of the forward stroke of the needles, is communicated to the lifting arm 324 and the latter will be rocked upwardly on its pivot thus causing the bent finger 325 to be elevated into engagement with the string S, thereby lifting or disengaging the same from the hook 285. With the string freed from the hook, the threaded needles are again moved forwardly to complete their forward stroke and the lifting arm 324 will be rocked to its normal lowered position.

STRINGING, CUTTING AND GRIPPING MECHANISM ON RIGHT SIDE OF TURRET HEAD (VIEWED FROM FRONT OF MACHINE)

*(Figures 16, 24, 72 to 80)*

While the foregoing description of the string feeding, gripping and cutting elements pertains to those parts positioned on the left side of the turret head, it will be understood that the elements just described are substantially duplicated on the right or tagging side of the machine, and that a description of one will suffice for both. However, due to slight changes in the shape and construction of the same, necessary because of the presence of the tagging mechanism on this side of the turret head, it is deemed necessary to briefly describe the elements, identifying the same, with reference numerals corresponding to the numerals used in the description of the feeding, gripping and cutting mechanism on the left side.

*Figures 16, 24, 55 and 81*

Thus, (referring particularly to Figures 16, 24, 55 and 81) a string feeding guide tube 266', through which also extends a string S' drawn from the second supply roll R', suitably supported above the top frame portion 4, is fixedly mounted in the collar 267', carried on one end of a bell crank 268', (Figures 24 and 56) in turn pivoted to the side of right hand bracket 179. The forward end of the tube 266', extending reciprocably through a guide block 269' on a top supporting bracket plate 225', on its forward stroke carries the free end of string S' being fed from the supply roll R' across and in front of a string hook 285' when the needles 231 are at the end of their rearward stroke, into position to be engaged with the serrated gripping faces 271' formed on the inner ends of upper and lower gripping jaws or fingers 270' and 270'', respectively, which are pivoted, intermediate their ends, to a shaft or rod 272' fixed in top supporting plate 225'. The outer ends of the jaws are connected by a compression spring 273' (Figure 55). An arm 274', pivoted on the end of rod 272', carries a stub pin 274'' which extends beneath and raises the top gripping fingers and jaw, in a manner corresponding to that shown in Figure 37, when the arm is elevated by the movement of a vertically disposed lever 275' pivoted to the outer end thereof. A second stub pin 274'' fixed in top or post plate 266', extends between the inner ends of the gripping fingers and serves as a stop pin therefor. The lever 275' is pivotally connected at its lower end to an arm 276' in turn pivoted to a fixed lug 277'' in the cam housing 277. A roller 278', mounted on arm 276' in the cam groove 280' (Figures 81 and 88) in one face of a cam disk 279' mounted on shaft 210. Thus, rotation of the cam 279' in a clockwise direction causes the roller 278' to follow the curvature of cam groove 280' (Figure 88) thereby causing the gripping fingers and jaws to be raised and lowered to receive, grip and position the string S' in the eyes 231' of the needles, upon the completion of the inward stroke of the latter and release of string S, in a manner corresponding to the operation of these parts on the left side of the machine, and the needles will be ready to start on their return movement, during which the string S' will be drawn through the bag hem.

*Figures 16, 24 and 55*

A cutter rod 281', lying approximately parallel with said guide tube 266', is journalled at its outer end in a bearing 282' on the bracket flange 228' on the right hand bracket 179 and the forward end thereof projects through the block 269'. A laterally extending cutter blade 283', formed on the forward end of the cutter rod, coacts with a fixed blade 284' in the top plate 225', and serves to cut the string S' after the needles have been threaded. The cutter rod and blade is actuated by means of a bell crank 286' connected to the rear end thereof and pivotally connected at its outer end 286'' to the upper end of a vertically disposed lever 290'. The lower end of the lever is pivotally connected to an arm 291' connected to a fixed pivot lug 291''' on the frame 1. A roller 292', carried by lever 290', travels in a cam groove 293' in one side face of a cam 195' (Figure 101), on the horizontal driven shaft 132. The rearwardly extending arm of the string tube bell cranks 270' is pivotally connected by a link 294' to the bell crank 286' fixed on the end of cutter rod 281'.

It will thus be noted that the bell crank 286' corresponds to the crank arm 286 and offset arm portion 296 of the cutter operating mechanism on the left side of the machine, previously described, and that the bell crank 286' is connected directly to operating lever 290', whereas the crank arm 286 on the left side of the machine, as shown in Figures 17 and 40, is connected to lever 290 through links 287 and 289. This variance in the parts on the right side of the machine is necessary due to the presence of the tagging mechanism on the right side, which is assembled intermediate the tube bell crank 268' and turret head. By reason of its connecting linkage, rotation of cam 195' causes the roller 292' to follow the curvature of cam groove 293 thereby rocking bell crank 286' downwardly in an anti-clockwise direction, viewed from the rear of the machine, in the direction of the arrows as shown in Figure 56, whereby the arm 296' of the bell crank reaches its vertical or dead center position, with respect to the crank pivot, thus maintaining the string tube 266' in a substantially stationary retracted position to the rear of the needles 230, and the other arm 286'' of the crank continues its downward movement while the arm 296' is passing through its dead center position. It will thus be seen that tube 266' will be in a relatively stationary position while the cutter rod 281' is rotated or rocked to cutting position against fixed blade 284'. Reverse or clockwise movement of the crank 286' rocks the arm 296' thereby causing the string tube crank 286' to move the string tube 266' forwardly across the needles 230 into position to be gripped by the string gripper, as previously described in detail.

Thus while the connecting linkage for actuating the cutter and string tube on the right side of the machine is modified somewhat with respect to this mechanism on the left side, it will be understood that these parts function in the same manner and the string tubes and cutters on both sides of the machine are mounted and actuated in a corresponding manner.

*Figures 16, 24 and 57*

In order to draw or pull the string S' outwardly, after the same has been gripped by the string gripper 270' and prior to the threading of the needles and cutting of the string, a saddle 223', as best shown in Figure 57, is slidably mounted on a horizontal guide track 224' which is supported at its outer end above the top frame 1 by a post 326 and connected at its inner end to supporting bracket 179. A forwardly projecting string hook 285', mounted on the saddle and extending through a string guide 285''' on supporting plate 225' serves to engage the string S' and draw the same outwardly to the desired length as best shown in Figures 75 to 79, in a manner corresponding to the operation of the hook 285, on the left side of the machine, when the saddle 223' is reciprocated forwardly and rearwardly on the guide track 224', through the medium of a vertically disposed lever 232' pivotally connected at its upper end to a pitman 233' in turn pivoted to the rear end of the saddle. Lever 232' is fulcrumed at its lower end to a fixed lug 234' on base frame 1, and is pivotally connected to the vertically disposed needle saddle lever 232 by a cross rod 327, whereby upon forward motion of lever 232 and needle saddle 223, by virtue of rotation of large cam 220 (Figures 21 and 35) on the main driven shaft 133, the lever 232' and hook saddle 223' will be moved rearwardly on its return stroke or in a direction opposite to that travelled by the needle saddle 223, thus drawing the string S to the necessary length. As the needle saddle and needles travel rearwardly on the return stroke thereof, the hook saddle 223' will be caused to travel forwardly or inwardly into string receiving position. While the needle saddle 223 and hook saddle 223' on the left and right sides of the machine, respectively, each carry string hooks 285 and 285' for drawing the draw strings S and S' outwardly to form loops on the forward and return strokes of the needles 231, it will be understood that the saddle 223 also carries and projects and retracts the threaded needles 231 through the bag hems. Thus, but for the absence of the needles and needle opening mechanism, the hook saddle 223' on the right side of the machine is substantially the same as the needle saddle 223 on the left side.

Means must be associated with the hook saddle 223' and hook 285' to disengage the string from the string hook prior to the needles reaching the end of their rearward stroke in order to permit the knotting operation to take place. Due to the mounting of and to provide clearance for the tag hopper, tag gripper and associated operating mechanism on the right side of the machine, it is necessary to provide a string lifting or disengaging arm on this side that differs in construction and operation to the string disengaging arm 324 assembled on the left side of the machine, and shown in Figure 23. A spring tensioned lifting arm 324' as shown in Figure 57 is thus provided with a bent finger 325' over which the string passes during the forward stroke of the hook saddle 223'. The arm is pivoted at one end to a bracket 328 on top plate 225' and the outer end thereof engages with a roller 330 on a bracket 329, mounted on the sliding hook saddle. During the forward travel of the hook saddle 223' to string gripping position, the roller 330 engages with and depresses the lifting arm 324' against the tension of a spring 329', which disengages the string from the hook and on the rearward stroke of the saddle, the hook returns through the tension of the spring to its normal position.

String Knotters

*(Figures 16, 23, 24, 54, 55 and 59 to 63)*

From the foregoing description it will be understood that two draw strings S—S' drawn from the respective supply rolls R and R', are fed to the needle by the string tubes 266—266' on the left and right sides of the turret head, respectively. It is therefore necessary to provide string knotters on both sides so that the right hand knotter will act on the string S, introduced through the hems on the forward stroke of the needles, and the left hand knotter will correspondingly knot the string S' drawn rearwardly through the hems on the return stroke of the needles, whereby knots are formed on the respective ends of the draw strings. While both knotters are fundamentally the same, the right hand knotter has the tagging mechanism associated therewith and consequently the structure of this knotter is modified slightly. The principal differences between the two knotters resides in the string gripping and elevating parts thereof, which grippers necessarily have to be modified slightly on the right side of the machine due to the presence of the vertically disposed tag container and tag gripper on this side. It is therefore deemed advisable in the interest of clarity to first consider the left hand knotting mechanism, before describing the mechanism on the right side.

Knotters for Right Side of Machine

*(Figures 16, 23, 54, 81 and 86)*

A hollow knotter rod 331 is slidably positioned within a sleeve 332, fixedly secured in a gear casing 334, which is mounted on the inner end of an extension 335 on supporting bracket 241 (Figure 23). The inner end of knotter rod 331 is formed with a curved, pointed hook 336 which serves to engage the elevated string S' and wind or loop the same around the head or inner end of the knotter rod 331, during the knotting operation, the inner end of sleeve 332 being cut away, as at 337, to provide clearance for the knotter hook. The hollow knotter rod 331 is rotated by means of a small pinion 338, keyed thereon and positioned within the casing 334, which meshes with an arcuate rack member 339 fulcrumed to the side of bracket 241. The rack is pivotally connected by a link 340 to a vertically disposed pitman 341 (Figure 23) in turn pivoted to a forwardly extending arm 342, having its outer end attached to a fixed pivot lug 343 in the cam housing 277 as best shown in Figure 84. A roller 344 (Figures 81 and 84) carried by arm 342, travels in a cam groove 346 in one face of a cam disk 345, mounted on the horizontal driven shaft 210. The configuration of cam groove 346 is such that rotation of cam 345 oscillates the rack 339 and this in turn rotates the knotter rod 331 approximately one and one quarter revolutions in an anti-clockwise direction, due to the position of the rack 339 on the left side of the knotter 331, and one and one quarter revolutions in a clockwise direction to cause the knotter rod to hook around and loop the string S' during the knotting operation, presently described. The knotter rod 331 is reciprocated through the sleeve 332 to first advance the hook 336 into engagement with the string S', suspended from a string gripper, and then to withdraw the string outwardly while being rotated, so that the rod will loop or wind the string around the head thereof. For this purpose, the outer end of the knotter rod is pivotally connected to the upper end of a vertically disposed lever 347, fulcrumed on the end of a horizontal shaft 348, suitably fixed in the top frame portion 4. A roller 349, carried on the lower end of lever 347, rides in a cam grove 350 in one side face of a cam disk 351, mounted on the horizontal driven shaft 210 (Figures 81 and 86). By virtue of the configuration of cam groove 350, rotation of cam 351 rocks the vertically disposed lever 347, which in turn reciprocates the knotter rod 331 forwardly and rearwardly in sleeve 332, as best illustrated in Figure 54. At the end of the forward stroke of the knotter rod 331 the hook 336 on the end thereof will engage with and hook the suspended ends of the string S' and the rod is retracted. During this rearward or return stroke, the knotter rod 331 is first rotated approximately one and one quarter revolutions in a clockwise direction, and then one and one quarter revolutions in an opposite or anti-clockwise direction, whereby the string S' is looped or wound around the head of the knotter rod preparatory to the ends of the string S' being drawn therethrough to complete the formation of the knot, as hereinafter described.

A knotter pin 352, as shown in Figure 54, slidably but non-rotatably extends through the hollow knotter rod 331, and is provided at its inner end with a curved string catching point 353, adapted when projected beyond the end of the knotter rod to pick up and draw the end of string S' outwardly through the previously looped portion of the string on the head of the knotter rod. The knotter pin 352 is pivotally connected at its outer end to the upper end of a vertically disposed lever 354 (Figure 16) fulcrumed on a horizontal shaft 355, fixed in the top frame 4, adjacent to shaft 348. A roller 356 carried by lever 354, rides in a second cam groove 357 in the side face of the cam disk 351 mounted on the horizontal driven shaft 210. The contour of this cam groove is such that rotation of cam disk 351 in a clockwise direction causes the lever 354 to be rocked or reciprocated about its fulcrum on the shaft 348 which reciprocates the horizontally disposed knotter pin 352 forwardly within the knotter rod into string catching position and rearwardly or outwardly therethrough to draw the end of the string S' through the loop formed on the head of the knotter rod thus completing the formation of the knot.

*Figures 23, 51 to 53 and 81*

Before the operation just described can take place the ends of the string S' must be picked out of the needle eyes 231', when the needles have been moved to a position beneath the knotter mechanism, and then raised or elevated to a position where the hook 336 on the head of the knotter rod 331, when the latter has been moved inwardly, will catch the suspended ends of the string and draw the same back into and through the loop and wind or loop the string around the head of the rod. The ends of the string are picked from the needle eyes and held in elevated position by a string picker P, while they are being drawn outwardly through the looped portion of the string on the knotter head 331. This string picker is comprised of two inner and outer horizontally disposed telescopic shank members or rods 358 and 359 respectively, which are formed with thread gripping jaws 363 at their inner ends. The outer shank member is slidably mounted in a forwardly extending barrel or casing 360, integrally formed on or fixed to the end of a sleeve 361 rotatably positioned in a bearing 362 on the supporting plate 225. The downwardly depending string gripping jaws 363, as best shown in Figure 53, formed on the forward ends of rods 358—359, when lowered to string gripping position, extend into the recesses or eyes 230' in the ends of the needle sleeve 230 on the outside of the respective strings as particularly shown in Figure 62.

Rotation of cam 345 in a clockwise direction rocks vertically disposed lever 381 and through the medium of link arms 379—380 causes the gripper barrel 360 to be lowered to a point ahead of the pointed heads of the needles 231 (Figure 53) which have drawn the string S' through the bag hems from the right side of the machine into position below the left hand knotter. At this point the gripping jaws 363 extend downwardly along the outer sides of the string S', as best shown in Figure 53, whereupon the rods 358—359 and gripping jaws 363 will be moved together to closed position on the string S' against the tension of a coil spring 364, Figure 51. The rods or clamps are then actuated in opposing directions to close the jaws on the string S' against the tension of the coil spring 364, through the medium of two relatively short links 365, (Figure 51) mounted on pins 366 on the rear ends of the respective gripper rods 358—359, which pins extend upwardly through a slot 367 (Figure 23) in the top of the barrel 360. The links 365 are pivoted to and moved in opposite directions by a pin 369 on the inner ends of a horizontally disposed rod 370 slidably positioned in the sleeve 361. The rod 370 and pin 369 are moved inwardly to spread and move the links 365 and to reciprocate the string picker shanks or rods 358—359 by the trigger arm 372 of a bell crank 371 (Fig. 23) rotatably mounted on the upper end of a post 373. The other arm of the bell crank is pivotally connected to the upper end of a vertically disposed lever 374, by means of a horizontal arm 373, which lever is fixed on the horizontal top frame shaft 355 and carries a roller 376 (Figures 81 and 83) adapted to travel in a cam groove 378 in one face of a cam disk 377 on horizontal driven shaft 210. The curvature of the cam groove 378 as best shown in Figure 83, is such that rotation of the cam in a clockwise direction reciprocates the lever 374, in a substantially vertical direction. Bell crank 371 is thus rocked on its pivot 373 to move the links 365 and gripping jaws 363 into open and closed positions, in synchronism with the downward and upward movements of the picker jaws.

The picker jaws are moved to and from string gripping position in the following manner. The outer end of sleeve 361 is pivotally connected by link arms 379 and 380 (Figure 23), to a vertically disposed lever 381, fixed on horizontal top frame shaft 355. A roller 382 carried by lever 381, travels in a cam groove 384 in the opposite side face of the cam disk 345 (Figures 81 and 85) to that in which groove cam 346 is formed. When the barrel has been raised to elevated position, through the continued rotation of the cam 345, and the string acted upon by the knotter head and rod, through the continued action of cam 377 and associated parts, gripping jaws will be returned by coil spring 364, to their normal open position. The barrel and gripping jaws are then lowered by cam 345 to string gripping position preparatory to lifting the string during the succeeding bag knotting operation.

When the knot has been loosely formed on the head of the knotter 331, the knot is tightened and completed and removed or disengaged from the knotter head by a knot tightening lever 385 as shown in Figure 23, fixed on a collar 386 loosely mounted on the knotter rod 331. The collar and lever are rocked downwardly in an arcuate motion to string tightening position, that is, until the lever engages with and presses downwardly upon that portion of the string between the knotter rod 331 and the mouth of the bag, by means of a rod 387 which is pivoted at its inner end to the collar and at its outer end to one arm of a bell crank 388, fulcrumed to the side of needle saddle guide track block 229. The other arm of the bell crank is pivotally connected to the upper end of a vertically disposed lever 389, in turn pivoted at its lower end to an arm 390 fulcrumed to a fixed pivot 391 in the cam housing 277. A roller 392, carried by arm 390, travels in a cam groove 394 (Figures 81 and 82) in one face of a cam disk 393 mounted on the horizontal driven shaft 210. Rotation of the cam and associated linkage and the action of the cam groove on rollers 392 rocks the knot tightening lever 385 to tighten and remove the knot from the knotter head.

*Figures 16, 23, 55, 59 to 61 and 63*

As previously stated, the knotting mechanism on the right side of the turret head and bag holding arms, viewed from the front of the machine, is substantially the same as the left hand knotter, but differs structurally therefrom, as will be later pointed out.

The following description of the knotter barrel, knotter rod, knotter pin and mechanism for actuating these parts of the knotter on the right side of the machine is identical with the corresponding knotter parts on the left side, previously described in detail. Thus, a hollow knotter rod 331′ is slidably positioned within a sleeve 332′, as best shown in Figures 59 and 60, fixedly secured in a gear casing 334′ which is mounted on the inner end of a bracket extension 335′. The inner end of knotter rod 331′ is formed with a curved, pointed hook 336′ which serves to engage the elevated string S and wind or loop the same around the head or inner end of the knotter rod 331′, during the knotting operation, the inner end of sleeve 332′ being cut away, as at 337′ (Figures 55, 62 and 63) to provide clearance for the knotter hook. The hollow knotter rod 331′ is rotated by means of a small pinion 338′, keyed thereon and positioned within the casing 364′ fulcrumed to the side of bracket 241′, Figure 60 on the left side of the knotter rod 331′. The rack is pivotally connected by a link 340′ to a vertically disposed pitman 341′ in turn pivoted to an arm 342′, having its outer end attached to a fixed pivot 343′ (Figure 91) in the cam housing 277. A roller 344′ carried by the arm 342′, travels in a cam groove 346′ in one face of a cam disk 377′, mounted on the horizontal driven shaft 210, as particularly shown in Figures 81 and 91. Thus it will be seen that due to the position of the rack 339′ on the right side of the knotter rod 331′, when oscillated by the movement of cam 377′ the rack rotates the knotter rod 331′ approximately one and one quarter revolutions in a clockwise direction and then one and one quarter revolutions in an anti-clockwise direction to loop or wind the string S therearoud. Thus the rotary movements of the knotter rod 331′ on the right side of the machine are reversed with respect to the left hand knotter 331. This is of course effected by the position of the rack 339′ on the right side of the right hand knotter 331′ which is necessary to provide clearance for the tagging mechanism on the right side of the machine. Knotter rod 331′ is also reciprocated through sleeve 332′ to first advance the hook 336′ into engagement with the gripped string S and to withdraw the string S outwardly while being rotated, so that the rod 331′ will loop or wind the string around the head thereof. In order to reciprocate the rod 331′, the outer end of the knotter rod is pivotally connected to the upper end of a vertically disposed lever 347′, fulcrumed on the end of a horizontal shaft 348′, suitably fixed to the top frame portion 4. A roller 349 carried by the lever, travels in a cam groove 350′ in one side face of a cam disk 351′, mounted on the horizontal shaft 210, as shown in Figures 81 and 90. The knotter rod 331′ is therefore actuated within the sleeve 332′ to advance the rod to string gripping or catching position, in a manner corresponding to the operation of the left hand knotter 331, hereinbefore described.

The inner end of a knotter pin 352′, as best shown in Figures 59, 62, 63 and 68, slidably but non-rotatably extends through rod 331′, and is provided at its inner end with a curved string catching point 353′, adapted when projected beyond the end of the knotter rod 331′ to pick up and draw on the knotter head. Pin 352′ is pivotally connected at its outer end to the upper end of a vertically disposed lever 354′, fulcrumed on a horizontal shaft 355′, fixed in the top frame 4. A roller 356′, carried by lever 354′, rides in a second cam groove 357′ in the side face of the cam disk 351′ (Figure 89), mounted on the horizontal driven shaft 210, and causes the knotter pin 331′ to be reciprocated through the knotter rod 331′ in the same manner as the knotter pin 331 on the left side, previously described.

Thus it will be seen that the knotter sleeve 332′, knotter rod 331′, knotter pin 352′, the rack member 339′, and associated operating levers on the right side of the machine are identical in structure and operation with the corresponding knotter parts 332, 331, 352 and 339 et al. on the left side of the machine.

STRING PICKER ON RIGHT SIDE OF MACHINE

*(Figures 24, 55, 59 and 61)*

From the following description of the string picker portion of the knotter, on the right side of the machine, for gripping and elevating the string S to a position above the knotter head 331′ to enable the latter to loop the string therearound and to otherwise enable the complete formation of the knot to be accomplished, differs in certain details from the previously described string picker on the left side of the machine. It was found necessary to modify the right hand picker in order to permit the assemblage of and to provide clearance for the vertically disposed tag hopper, tag gripper and associated operating linkage and but for the presence of these parts the string pickers on both sides of the machine could be identical. The string picker on this side of the machine also differs somewhat from the string picker on the left side of the machine due to the fact that the right hand picker grips the string S at a point to the rear of the pointed needle heads, as best shown in Figure 62, whereas, as previously described, the left hand string picker grips the string S′ at a point in front of the needle heads. A forwardly projecting string gripper, supporting L-shaped arm or plate 359′ s integrally formed with a laterally extending sleeve 360' journalled in the bracket plate bearing 282'. The outer end of sleeve 360' carries a link 379' in turn pivoted to a horizontal link 380', pivotally connected at its outer end to the upper end of a vertically disposed lever 381' journalled on a horizontal top frame shaft 348'. A roller 382' carried by lever 381', travels in a cam groove 384' in one face of a cam disk 345', (Figures 81 and 90) on horizontal driven shaft 210, whereupon rotation of the cam, the gripper is lowered into and raised from string gripping position with respect to the needles.

*Figures 55 and 59*

Two spaced jaw plates 363', fixed in a block 395 on arm 359', are formed at their forward ends with downwardly depending string gripping outer jaw members 359''. A T-shaped jaw plate 363'', having downwardly depending inner jaw members 359''' on its forward end, is slidably positioned between the jaw plates 363' and the rear end thereof extends through block 395 into a position to be engaged by a trigger finger 372' pivotally mounted on the rear end of arm 359'. The trigger is actuated by a rod or pin 370', slidably positioned in the sleeve 362', and the rod is moved inwardly against the trigger finger 372' by one arm 371'' of a bell crank 371', as best shown in Figure 24, rotatably mounted on the upper end of a post 373'. The other arm 371''' of the bell crank 371' is pivotally connected to the upper end of a vertically disposed lever 374', by means of an arm 375' which lever is fulcrumed on the horizontal top frame shaft 355' as best shown in Figure 24, and carries a roller 376' which travels in a cam groove 378' in one face of a cam disk 345' on the horizontal driven shaft 210, (Figures 81 and 90). Cam groove 378' is fashioned to rock arm 371''' of bell crank 371 and swing the free end 371'' of bell crank 371' into engagement with one end of a pin 370' to force the inner end thereof against the trigger 372' which in turn advances the inner gripping jaws 363'' forwardly into gripping engagement with the outer jaws 363' to pick up the free ends of the draw string S as best shown in Figure 63, previously advanced by the needles from the left side of the turret head. When the gripping jaws are lowered, by virtue of the action of cam 377' and connecting linkage, the outer and inner jaws 359'' and 359''', respectively, extend downwardly through the cut outs or recesses 230' in the needle sleeves 230 whereby the jaws are positioned between the needles and the strings S, as best shown in Figure 62. In order to assure of the respective jaws being accurately placed with respect to the gripped string S it is desirable to provide means for elevating the strings into the jaws of the picker as the latter descends to gripping position. Thus, a crank arm 600, having an upturned cup-shaped head 601 formed on one end is pivotally mounted to the side of plate 225, as at 602. The other end of crank 600 is pivoted at 604, to a link 603 in turn pivotally connected, as at 605, to the lower end of the picker carrying arm 359'. By reason of the pivotal connection between the crank arm 600 and arm 359', as best shown in Figure 55, it will be seen that when the arm 359' is rotated downwardly to lower the picker jaws to string gripping position, the crank 600 will be rocked about its pivot 602 thereby moving the cupped head 601 thereon upwardly into engagement with the string S, and as the downward travel of the picker jaws 359''—359''' continued the cupped head 601 elevates the strings S into the jaws, as best shown in Figure 62. The picker jaws are then actuated to closed position and as the picker arm and jaws are raised or elevated (Figure 63) the crank arm 600 and head 601 are rocked downwardly to the position shown in Figure 55. When the string S is in the elevated position of Figure 63 the same is acted upon by the knotter 331', whereupon the inner picker jaws 359''' are returned to their normal open position (Figures 55 and 62) by a coil spring 364' and the end of the string S is released to permit the completion, in the manner of the string picker on the left side of the machine. It will of course be understood that it is not necessary to associate a lifting arm with string picker on the left side of the machine due to the fact that the left hand picker grips the strings S' at a point ahead of the pointed needle heads, as previously described.

RIGHT HAND KNOT TIGHTENER

It is also necessary to provide a knot tightening or tensioning lever on the right side of the machine to tighten the knot after the same has been formed by the knotting mechanism. As the knotter on the right side of the machine is actuated and the movements thereof are timed in relation to the tagging mechanism so that the knot is tied around the tag, it is necessary to modify the structure of the right hand knot tightener in order that the knot tightening operation will be synchronized with the tagging.

A knot tightening lever 385' as shown in Figures 55 and 59, is likewise fixed to a collar 386' loosely mounted on the knotted rod 331'. The collar and lever are rocked to string tightening position by means of a rod 387' which is pivoted at its inner end to the collar and at its outer end to one arm of a bell crank 388' fulcrumed to a post 396 mounted on a bracket plate 397. The other arm of the bell crank is pivotally connected to a horizontal arm 398 which is in turn pivoted to the upper end of a vertically disposed lever 389' fulcrumed on top frame shaft 348'. A roller 392' mounted on the lower end of lever 389' rides in a cam groove 394' in one side face of a cam disk 430 on the horizontal driven shaft 210. The action of the cam and associated linkage moves the lever 389' into and out of string and knot tightening position in a manner corresponding to the left hand knot tightening lever 385.

TAGGING MECHANISM

*(Figures 16, 23, 55 and 64 to 71)*

As is well known, the bags in which most brands of tobacco are sold bear a small tag. In the present machine the tag is strung on the string S after the loop has been formed and before completing the knot. Thus the tagging mechanism is provided to advance a tag to a position where the same may be acted upon by the knotting device, in such a manner that after the string S has been looped or wound around the head of the knotter rod 331', the knotter hook 353' will advance through the eye of a tag T on its forward stroke, as shown in Figure 68, and when the free ends of the string S have been picked up thereby, the hook will again slide through the eye of the tag, on its return stroke, thus carrying the string through the tag and loop, respectively, to form the knot (Figure 69). It will thus be seen that the end of the strings are knotted on the tag, the one operation serving to simultaneously tie the ends of the draw strings together and at the same time secure a tag thereto. The timing and operation of the knotting mechanism, just described, is identical with that on the left side of the turret head, as the placing of the tag in the path of the knotter hook member interferes in no way with any of the knotting operations.

The tagger includes a vertically disposed tag hopper or container 400, more particularly shown in Figures 64 to 66, for holding the bag tags T therein during the tagging operation. This container is mounted on a plate 401 supported on a bracket 402 on the laterally projecting extension 335' previously referred to. A longitudinal groove or slot 403 formed in the top face of plate 401, communicates at its enlarged forward end with the lower end of the hopper. A relatively flat slide 404, slidably mounted in groove 403, is recessed at its forward end, as at 405, to a depth just sufficient to accommodate the thickness of a single tag so that only the bottommost tag of the stack of tags T in the hopper will be fed by gravity to the tag gripper, when the member 404 is moved forwardly. The slide 404 is moved into and out of operative position, with respect to the gripper, by means of a link 406 (Figure 16), pivotally connected at one end to the rear end of the slide and at its other end to one arm of a bell crank 407, mounted on a post 408. The other end of this bell crank 407 is pivotally connected by a link 409 to the upper end of a vertically disposed lever 410 fulcrumed on top frame shaft 348'. A roller 411, carried by lever 410, travels in a cam groove 413 in the side face of a cam disk 412 (Figures 81 and 95), mounted on the horizontal shaft 210. The shape of the cam groove, particularly shown in Figure 95, is such that rotation of the cam in a clockwise direction first causes the link 409 to be moved rearwardly thus rocking bell crank in a clockwise direction which in turn causes the slide 404 to be moved forwardly in the groove 403 to deliver a tag from the hopper 400 into the path of travel of the gripping element, in properly timed relationship to the movement of the knotting mechanism. Continued movement of cam disk 412 reverses the movement just described and returns the pusher slide into position to eject another tag.

The tags are picked up from the tag hopper slide and carried into alignment with the knotter mechanism, and into position for inserting the string S through the eye of the tag preliminary to knotting, by means of a gripper carrying tube 414 (Figure 64). This tube is rotatably mounted in a bearing 415 on a post 416, on the bracket flange and is formed with an offset portion 417 on the inner end thereof, as shown in Figure 64. The outer end of gripper tube 414 carries a relatively short arm 418 which is pivotally connected to the upper end of a vertically disposed lever 419, fulcrumed on the horizontal shaft 355' on the top machine frame 4 by means of a connecting link 419' (Figure 24). Lever 419 carries a roller 420 on its lower end which rides in a cam groove 422 in the other side face of the cam disk 377' (Figures 81 and 92) mounted on the horizontal driven shaft 210. Upon rotation of the cam 377' in a clockwise direction, the roller 420 follows the curvature of the cam groove 422 thereby actuating the vertical lever 419 and rocking the gripper tube 414 to carry a tag from the hopper downwardly to tying position, as shown in Figures 68 and 69, with respect to the knot. The offset portion 417 is formed with a fixed tag gripping jaw 423 cooperating with a movable jaw 424, slidably mounted on the shank of the fixed jaw by means of a collar 425. This movable jaw 424 is moved to closed gripping position by means of segment 426, pivotally supported on the offset portion 417 of gripper tube 414. A pin or rod 427, slidably mounted in tube 414, is adapted to be projected through the tube into engagement with the segment 426, to move the movable jaw 424, by one arm of a crank 429 mounted on a post 428 (Figure 24). The other arm of the crank is connected to the upper end of a vertically disposed lever 431 by means of a link 432, the lever being fulcrumed intermediate its ends on the shaft 355', and carrying at its lower end a roller 433 which travels in a cam groove 434 (Figures 81 and 93) in one side face of the cam disk 430 fixed to and rotatable with the shaft 210, as previously described. The cam groove 434 is so shaped that upon rotation of cam 430 in a clockwise direction, the roller follows the contour thereof and actuates the lever 431 and by means of the crank 429 reciprocates pin 427 to open and close the gripping jaws 423—424. The movable jaw 424 is, returned to its normal open position to release the tag upon completion of the knotting operation, by means of a coil spring 435, fixed at one end to the movable jaw and at the other end thereof to the offset portion 417.

When the tag gripping element is in rearward or idle position, as shown in Figures 55, 64 and 67, the jaws 423 and 424 are in open position and ready to grip a tag. As the cam 377' rotates and rocks or oscillates gripper tube 414 forwardly and downwardly in an arc to a position in alignment with the extended end of tag slide 404, having a tag thereon, rotation of cam 430 through the connecting linkage operates the crank 429 and causes the jaws 423 and 424 to close and grip a tag therebetween. The tag gripping element, continues its forward and downward movement, while the knot is in process of being formed on the knotter rod, and carries the tag and places the same in sidewise position between the rearward face of an elevated bent tag guide 436 (Figure 24), supported on the inner end of the knotter rod 331', and the outer end of the outer string gripping jaw 359', on the string gripping element. At this position (Figures 68 and 69) the knotter functions to form a knot on the free ends of the draw strings, as already described, but due to the position of the tag in the path of travel of the knotter hook, as best shown in Figures 68 and 69, the knot is caused to be formed around the eye of the tag.

General Operation of Knotting and Tagging Mechanism

*(Figures 62, 63 and 67 to 71)*

As the snaggers 302 form openings in the bag hems and open the same, the needles 231, which have previously been threaded on the left side of the turret head, move forwardly or inwardly and enter the openings formed in the hem and carry the left hand draw string S through the hems to a position, indicated by the dotted line K of Figure 77, directly under the string gripper 359', on the right side of the turret head. The needles then pause or hesitate, as the string gripping member 359' lowers and the jaws 359' close on the string whereupon the needles 231 are pushed forwardly to open the eyes 231' and release or free the ends of the string S. The knotter gripper 359', having the string gripped in the jaws thereof, is then moved upwardly in an arc thereby elevating the two ends of string S into a position in the path of travel of the knotter head 331', as shown in Figure 63. The knotter head is then pushed forwardly through the knotter sleeve 332' and the hook 336' engages the ends of the string and when rotated, first in a clockwise direction and then in an anti-clockwise direction, as hereinbefore described, loops the ends of the string around the head of the knotter 331', as shown in Figures 68 and 69, during which movement the string is gripped in the string gripper 359', as shown in Figure 63. The tag gripper 414, having gripped and removed a tag from the extended end of the tag slide 404, after the tag has been fed from the hopper 400, moves and carries the tag downwardly and positions the tag with the eye thereof in alignment with the retracted end of the knotter rod 331', as shown in Figure 68. In this position, the hook 353' on the end of the knotter pin 352', is projected inwardly through the eye of the tag (Figure 68) and the string gripper 359' moves downwardly and places the string ends in the path of the hook 353'. As the hook 353' is retracted or moved outwardly through the knotter 331', the string gripper releases its hold on the string and leaves the latter caught in the hook whereby the two loose or free ends of the string S are drawn first through the eye of the tag and then through the loop on the knotter head 331', as best shown in Figures 69 and 70. The string tightening lever 335' thereupon rocks into position and bears on the portion of the string between the knotter head and the mouth of the bag thus tightening the knot of the tag to the desired degree shown in Figure 71. The ends of the strings are pulled out of the hook 353', as the latter continues to move outwardly through the knotter rod 331' to the end of its back stroke, which leaves the tag tied on the knot as the knot was formed.

After the string S has been removed from the needles 231, the latter continue to move forwardly with their respective needle eyes 231' in open position until the needles are disposed beneath a second string S', previously delivered from roll R' across the needles to the rear of string hook 285' carried by saddle 223' by string guide tube 286' (Figure 78), and the ends thereof gripped by the string gripper 270'. The string S' is then picked up and drawn rearwardly by the string hook 285', and as the needles reach the full length of their forward stroke, the gripper 270' and cutter 283' complete their final downward movements thereby positioning the string S' in the eyes 231' of the needles (Figure 79). The string is cut by the cutters 283'—284' as the needles move to closed position to grip the string within the eyes thereof. Needles 231 are then drawn rearwardly through the hems of the bag, on their return stroke until the needle eyes, with the string clamped therein reach a position, indicated by the dotted line K in Figure 80, directly beneath the left hand string gripper 356. At this position, the needles pause or hesitate and the gripper lowers and the gripping jaws 359 thereon grip the string S' at the eyes of the needles, as the eyes open. The gripper is swung upwardly in an arc to a position directly above the knotter head 331. The knotter is moved inwardly and upon outward travel of the knotter head and hook through the sleeve 332 and oscillation or rotation thereof as hereinbefore mentioned, that is, first in an anti-clockwise and then in a clockwise direction, the string is caused to be looped or wound around the knotter head. When the knotter pin hook 348 is projected through the knotter head 331 and hooks the string, below the gripping jaws 359, the jaws are opened to release the string which permits the hook 348 to carry the free ends of the string outwardly through the looped portion of the string on the knotter head. The knot tightening lever 335 is then actuated and the loosely formed knot tightened and removed from the knotter head. The needles continue to move rearwardly, with the eyes 231' still open, and the string S which has been clamped in the gripper 270 has been pulled outwardly by the hook 285 to provide the necessary length. At the end of the back stroke, the eyes are in alignment with the gripper finger 270 and string tube 286 (Figure 75), at which position the gripper and cutter are further depressed or lowered and place the string S in the needles eyes 231 whereupon the eyes close upon and the cutter blade severs the string and the gripper opens (Figure 76). The threaded needles 231 are now ready to advance through the hems of the next succeeding bag which has been rotated by the turret head from the horizontal bag feeding station to the elevated stringing and tagging station.

Bag Turning and Delivering Mechanism

*(Figures 16, 106 and 107)*

Upon completion of the stringing and tagging operations, the turret head is automatically unlocked and rotated, approximately one quarter of a revolution, which moves the bag holding arms, having a completely strung and tagged bag thereon, from the vertical threading station forwardly and downwardly to a horizontal turning and delivering station. When the loaded bag arms reach this horizontal position, the succeeding pair of bag holding arms have carried the succeeding bag from the horizontal feeding station upwardly to the vertical stringing position at which time the turret head and holding arms are again locked.

As the bags are hemmed and positioned on the bag holding arms with their hems outermost or inside out, in which condition the bags are strung and tagged, the turning and delivering mechanism serves to turn the bags right-side-out on the bag holding arms so that the hems and seams will be arranged on the insides thereof, and to remove the bags from the arms and deliver the same in upright or open mouth position into a bag hopper.

The bag turner and remover comprises two, spaced inwardly extending pivoted arms 438 supported in a bifurcated block 439, mounted on a rod 440 carried by a slide or collar 441 slidably mounted on a forwardly projecting, horizontal guide track 442. The track is supported at its inner end by a bracket 443, mounted on the front end of the machine frame 1, and at its forward or outer end by a downwardly depending arm 444, connected to a bag hopper supporting plate 445, having a suitable hopper or trough 445' thereon, extending forwardly from and suitably attached to the front of frame 1. A bag turner or pusher finger 446, fixed in block 439 intermediate the bag turning and transfer arms 438 and extending beyond the ends thereof, engages the closed end of the bag in advance of the gripping fingers, when the slide 441 is moved inwardly on the guide track 442. A pair of upstanding lugs 447, carried by the gripping fingers, are provided with rollers 448 which engage with and ride along cam faces 450 on the inner sides of two forwardly projecting, spaced arms 449, secured to the underside of bracket 443, and swing the arms inwardly to retracted bag receiving position. As the turner finger 446 engages the closed end of the bag ahead of the gripping fingers, the bag is pushed or turned right-side out on the bag holding arms and the retracted arms 438 extend into and receive the turned bag thereon. Upon outward travel of the slide 441 on the guide track, the rollered lugs 447 on the arms 438 ride off of the cam faces 450 and the fingers move laterally and return to their normal expanded position to firmly grip and hold the turned bag thereon.

The slide is reciprocated on the guide track 442, to move the bag turning arms into bag removing and delivering positions, by means of an arm 451 pivoted at one end to one side of slide 441 and at its other end to the upper end of a vertically disposed lever 452 which is fulcrumed, intermediate its ends, to a fixed lug 453 on a side of the bag hopper supporting plate 445. A pitman 454, extending forwardly through the frame, pivotally connects the lower end of lever 452 to the upper end of a vertically disposed lever 455 (Figure 102) in turn pivoted to a fixed lug 456 on the base of the frame 1. Lever 455 carries intermediate its ends a roller 457, which travels in a cam groove 459 in a side face of a cam disk 458, mounted on the outer end of the horizontal driven shaft 132. Rotation of the cam disk oscillates or rocks the vertically disposed lever 452 forwardly and rearwardly thereby imparting corresponding movement to the slide 441 and moving the bag turning transfer arms into the respective bag removing and delivering positions, in synchronism with the movements of the turret head.

When the bag removing arms 438 carry a bag outwardly in a horizontal direction from the bag holding arms on the rearward stroke of slide 441 on the guide track, the bifurcated block 439 is swung downwardly from the horizontal to a vertical position, so that the bag may be removed therefrom and delivered to the bag hopper. This movement of the block and gripping fingers is accomplished by means of a substantially horizontally disposed rod 460 pivoted to an offset bearing 461 on the top of the block 439 and extending forwardly through a guide bracket 462, mounted on a plate 463 carried by slide 441. On the outward or return stroke of the slide, the bag gripping and turning fingers, having a bag positioned thereon, are moved out of engagement with the bag holding arms 185 and the outer end of rod 460 abuts a stop lug 464 on the forward end of the guide track 442. Continued forward travel of the slide causes the rod 460 to exert a force against and push the gripper fingers carrying block 439 downwardly about its pivot, by virtue of the offset bearing 461, which movement swings the bag gripping and turning fingers downwardly to a vertical station where the bag is gripped by and removed from the bag removing arms by a pair of reciprocating clamping members.

The bag clamping and removing members comprise a pair of fixed jaws or clamps 465, mounted on the upper ends of two upright fixed rods 467, and a pair of movable jaws 466 fixed to and movable with tubular uprights or sleeves 468, sleeved upon the fixed rods. These rods and tubes are supported at their lower ends in a cross head 469 and extend upwardly and reciprocably through suitable bearings 470, formed on a bracket 471 in turn supported on the bag hopper supporting plate 445. An upright guide rod 472, connected at its upper end to the cross head 469 and slidably received in a guide bearing 473 on the front of the frame base 2, when reciprocated vertically, causes the clamps to move to and from bag clamping position, in a manner presently explained. The guide rod 473 is provided with a fixed collar 474 by means of which the rod is operatively connected through a link 475, with one end of a bent horizontally disposed lever 476, the other end thereof being fulcrumed to a fixed lug 477 on the frame base 2. This lever carries a roller 478, intermediate its ends, which rides in a cam groove 480 in the outer face of a cam 479 mounted on the front end of the main driven shaft 133.

As the clamp rods and tubes are reciprocated into bag receiving position through the medium of cam 479, the jaws are opened and closed by means of a pair of arms 481, angularly disposed relative to each other and fixed upon the tubes 468 and pivotally connected together by a link 482, for simultaneously oscillatory movement. Pivotally connected to an extended end 483 of link 482 is a trip lever 484, on the free end of which is a roller 485 adapted to ride over a vertically disposed cam plate 486, suitably fixed to the front of frame 1 beneath the hopper supporting plate 445. While the roller is in engagement with the plate 486, the jaws 465—466 are held open, as illustrated in Figure 107. However, as soon as the rods and tubes approach the end of their upstroke, this roller 485 rides off the upper end of the cam plate 486. When this occurs the tubes or sleeves 468 will be rocked in opposing direction thus causing the jaws to snap closed upon a bag carried by the gripper arms, under the action of a coil spring 487. Trip lever 484, by reason of its pivotal mounting, on the down stroke of the rods and tubes swings on its pivot point and its roller 485 will freely ride over the cam plate without disturbing the closed position of the movable jaws 466. When the bag has been engaged by the gripping jaws 465—466 and the latter moved downwardly to remove the bag from the bag gripping fingers 438, the bag gripping and turning arms 438 and 446 are swung upwardly to normal horizontal position, whereupon the slide 441 again travels inwardly on the guide track 442 into engagement with a bag on the next succeeding pair of bag holding arms 185, which have been moved from the elevated stringing and tagging position to the horizontal delivery station.

As the bag gripping jaws 465—466 reach the end of their downward stroke, a roller 488, mounted on an arm 489 integrally formed on the upper end of one of the clamping tubes 468, is brought into register with a cam slot or groove 491 formed in one side face of a reciprocating cam block 490 which is supported for sliding movement in a bracket 492, attached to the upper face of the bag hopper supporting plate 445. The cam block 490, when reciprocated, rocks the tubes or sleeves 468 and causes the clamping jaws to open and release the gripped bag. This action is effected by means of a bell crank 493 (Figure 106), fixed to one end of a horizontal shaft 494, suitably journaled in the hopper supporting plate 445 adjacent its inner end. The bell crank 493 has one arm 495 pivotally connected to the outer end of the cam block 490 by a link 496, and its other arm 497 pivoted to one end of a lever 498 by means of a link 499. The other end of lever 498 is fulcrumed on a lug 500 on the front of frame 1. A roller 501, carried by lever 498, intermediate its ends, engages in the cam groove 480 of the cam 479, previously described as being mounted on shaft 133. Rotation of the cam reciprocates the cam block 490, through the medium of bell crank 493, and the cam groove 491 in the block acts upon and moves the roller 488, thus rocking the gripper tubes and causing the movable jaws 466 to open with respect to the fixed jaws 465. As the fixed and movable jaws 465—466 operate in unison, by virtue of the link connections at their lower ends, both movable jaws will be opened simultaneously to release the bag.

A bifurcated arm 502, fixed on the horizontal hopper plate shaft 494, is operatively connected at its bifurcated upper end by a laterally extending rod 503' to a pusher rod 503 which reciprocates through a bearing 504 in a bracket 505 in the hopper plate 445. The outer end of this pusher rod 503 carries an upstanding bag pusher plate 506. Thus, rotation of the cam 479 rocks the hopper plate shaft 494 in a clockwise direction whereby the bifurcated arm 502 is moved downwardly and forwardly and the pusher rod and pusher plate travel forwardly and engage the rear face of a bag, after the same has been released or freed from the clamping jaws 465—466, and pushes the bag forwardly into the open rear end of the bag receiving hopper 445'. The bag pusher plate 506, more particularly shown in Figure 107, is provided with slots or recesses 507, in the sides thereof and a similar slot or recess 508, in the lower edge thereof, through which beveled or tapered lugs 509 and 510 in the respective sides and bottom of the bag hopper 445', at the rear end thereof, extend on the forward travel of the pusher plate. Thus, when the plate pushes a bag forwardly into the open rear end of the hopper and past the tapered lugs 509 and 510, the latter will engage the rear face of the bag, at the respective side and bottom edges thereof and thereby prevent the same from slipping rearwardly through the open rear end of the hopper. Continued movement of the cam 479 causes the hopper plate shaft 494 to rock in the reverse or anti-clockwise direction thereby retracting the pusher rod and plate rearwardly to a position to the rear of the path of travel of the bag holding and transfer arms 438 and clamping jaws 456—466, preparatory to advancing and pushing the succeeding bag into the hopper.

What I claim is:

1. A machine of the character described comprising a bag holder on which a hemmed bag is positioned for stringing, a pair of stringing needles and needle operating mechanism for entering the needles through the hems, means for successively threading a pair of threads in said needles on the forward and return strokes thereof, a pair of knotters for knotting each of said threads, means for supporting tags and gripping means operated simultaneously with one of said knotters for lowering a tag from said tag supporting means into the path of travel of said last mentioned knotter whereby the knot formed thereby secures the tag to the thread.

2. In a machine of the character described having bag holding arms, a bag feeding carriage for feeding hemmed bags onto said arms, pairs of normally open pivotally mounted gripping jaws on said carriage for gripping the hems of the bag therebetween at the ends of said hems, and pairs of normally open pushing and opening fingers pivotally mounted on said carriage for engaging beneath and over the hems of the bag, means for feeding a bag between said jaws and fingers, and means for successively partially opening and closing and fully opening and closing said fingers, and for closing and opening said jaws for opening the mouth of the bag, and means for moving said carriage to feed the bag onto the bag holding arms.

3. A machine of the character described comprising a rotatable bag holder having bag holding arms on which a hemmed bag is positioned for stringing, said arms being movable from a horizontal to a vertical position, a pair of stringing needles and needle operating mechanism operable when the arms are in vertical position for entering the needles through the hems from the same side, a pair of grippers for gripping opposite sides of the extended side hem at one side of the bag during the threading operation, and a pair of snagging points pivotally mounted adjacent said grippers, and means for swinging said snagging points in a substantially oscillatory arcuate direction on their pivots into snagging engagement with the bag material adjacent the gripped areas and rupturing the cloth to facilitate entry of the needles.

4. A machine of the character described comprising a bag holder on which a hemmed bag is positioned for stringing, a pair of stringing needles and needle operating mechanism for entering the needles through the hems, means for threading said needles with threads, a pair of knotters for knotting said threads, means for supporting tags and pivoted means for lowering a tag from said supporting means into the path of travel of one of said knotters whereby said tag is secured to one of said threads by the knot formed thereon by one of said knotters.

5. A machine of the character described comprising a bag holder on which a hemmed bag is positioned for stringing, a pair of stringing needles and needle operating mechanism for entering the needles through the hems, means for successively feeding a pair of threads to said needles on the forward and return strokes thereof, a pair of knotters for knotting each of said threads, means for supporting tags, tag gripping means, means for moving a tag from said tag support into said gripping means, and means for lowering said gripping means for positioning said tag into the path of travel of one of said knotters whereby the knot formed by said last mentioned knotter encloses a portion of said tag.

6. A machine of the character described comprising a bag holder on which a hemmed bag is positioned for stringing, a pair of stringing needles and needle operating mechanism for entering the needles through the hems, means for successively feeding a pair of threads to said needles on the forward and return strokes thereof, a pair of knotters for knotting each of said threads, means for supporting tags, tag gripping means having movable jaws, reciprocating means for moving a tag from said tag support into the jaws of said gripper, and means for lowering said gripper for positioning said tag into the path of travel of one of said knotters whereby the knot formed by said knotter secures the tag to one of said threads.

7. A machine of the character described comprising a bag holder on which a hemmed bag is positioned for stringing, a pair of stringing needles and needle operating mechanism for entering the needles through the hems, means for successively threading said needles with a pair of threads on the forward and return strokes thereof, a pair of knotters for knotting each of said threads, a tag support in which tags having eyelets are arranged, tag gripping means having movable gripping jaws thereon, sliding means associated with said tag support for moving a tag from said support into the jaws of said gripper, and means for moving said gripper to position a tag with its eyelet in the path of travel of one of said knotters whereby one of said threads is drawn through the eyelet of the tag by said knotter and a knot is tied around said tag.

8. A machine of the character described comprising a bag holder on which a hemmed bag is positioned for stringing, a pair of stringing needles having gripping means adjacent the pointed ends thereof, and needle operating mechanism for entering the needles through the hems, means for successively threading the gripping means of said needles with a pair of threads on the forward and return strokes thereof, and a knotter for knotting each of said threads.

9. A machine of the character described comprising a bag holder on which a hemmed bag is positioned for stringing, a pair of stringing needles having thread gripping means thereon and needle operating mechanism for simultaneously entering the needles through the hem from the same side, means for feeding a pair of threads to the gripping means of said needles, a rotatably mounted knotter on each side of said bag holder for engaging and knotting one of said threads on the forward stroke and the other of said threads on the return stroke of said needles.

10. A machine of the character described comprising a bag holder on which a hemmed bag is positioned for stringing, a pair of stringing needles having thread gripping means thereon and needle operating mechanism for simultaneously entering the needles through the hem from the same side, means on opposite sides of said bag holder for feeding a pair of threads to the thread gripping means of said needles on the forward and return strokes thereof, a rotatably mounted string knotter on each side of said bag holder, and means for gripping and holding the string in the path of said knotters whereby said knotters engage and knot one of said threads on the forward stroke and the other of said threads on the return stroke of said needles.

11. A machine of the character described comprising a bag holder on which a hemmed bag is positioned for stringing, a pair of stringing needles and needle operating mechanism for simultaneously entering the needles through the hem from the same side, means for threading said needles with a pair of threads, a pair of rotatably mounted string knotters adjacent the sides of said bag holder, and pivoted gripping means and means for operating said gripping means for gripping and holding the strings in the path of said knotters, and means associated with said knotters for removing the strings from said knotters after said strings have been knotted on the forward and return strokes of said needles.

12. A machine of the character described comprising a bag holder on which a hemmed bag is positioned for stringing, a pair of stringing needles and needle operating mechanism for simultaneously entering the needles through the hem from the same side, means for threading the needles with a pair of threads, a pair of rotatably mounted string knotters adjacent the sides of said bag holder, for tying knots in each of said strings, and a pair of pivoted grippers adjacent said knotters and gripper operating means for gripping and elevating each of said strings into the path of said knotters, and pivoted means associated with each of said knotters for removing the strings from said knotters after knots have been tied on the strings on the forward and return strokes of said needles.

13. A machine of the character described comprising bag holding arms on which a hemmed bag is positioned for stringing, a pair of stringing needles and needle operating mechanism therefor, a pivotally mounted arm adjacent said bag holding arms, a pair of gripping jaws on one end of said arm and means for moving said arm and jaws whereby the jaws grip one of the extended side bag hems above the points of entry of the needles and clamp the bag on the arms, a pair of arms having relatively pointed ends for engaging the bag material at substantially oppositely disposed points, and means for moving said arms outwardly relatively to the sides of the hems to pull the cloth outwardly to provide openings for the entry of the needles.

14. In a machine of the character described having bag holding arms, said arms being movable from a horizontal to vertical and from a vertical to horizontal position, horizontally disposed means for automatically feeding bags forwardly in a horizontal plane to said bag holding arms when the latter are in a horizontal position, and bag stringing means for stringing the bags operable when said arms have been moved to a vertical position, and a substantially horizontally disposed reciprocating turning member for turning the bags right side out and removing the same from said arms when said arms have been moved to horizontal position.

15. A machine of the character described comprising a bag holder on which a hemmed bag is positioned for stringing, a pair of stringing needles having movable means for clamping a bag string therein, and needle operating mechanism for entering the needles through the hem from the same side, means on opposite sides of the bag holder for feeding a pair of threads to said needle string clamping means on the forward and return strokes of said needles, means for cutting said threads, a pair of knotters for knotting said threads, and means associated with one of said knotters for placing and knotting a tag on the threads.

16. A machine of the character described comprising a bag holder on which a hemmed bag is positioned for stringing, a pair of stringing needles having slidable means with cooperating faces for clamping a bag string therein, and needle operating mechanism for entering the needles through the hem from the same side, means on opposite sides of said bag holder for feeding a pair of threads to said needle string clamping means for clamping the strings adjacent the ends thereof, on the forward and return strokes of said needles, means for moving said clamping means to clamp the bag threads, means for cutting said threads, and knotters for knotting said threads.

17. A machine of the character described comprising a bag holder on which a hemmed bag is positioned for stringing, a pair of stringing needles having movable parts thereon for clamping a pair of threads therein, and needle operating mechanism for entering the needles through the hem from the same side, reciprocating means for feeding a pair of threads to the movable clamping means in said needles and means for moving said movable means for clamping said threads in said needles, means for cutting said threads, a pair of knotters for knotting each of said threads, and means cooperating with one of said knotters for placing a tag on one of said threads.

18. A machine of the character described comprising a bag holder on which a hemmed bag is positioned for stringing, a pair of reciprocating stringing needles having cooperating movable parts thereon for clamping a pair of threads therein, and needle operating mechanism for entering the needles through the hem from the same side, tubular means for guiding said threads to the clamping means on said needles, means associated with said tubular means for gripping said threads, means for successively moving said cooperating parts for positioning said gripped threads in said needle clamping parts and moving said parts for clamping said threads, means for cutting said threads, and a pair of knotters for knotting each of said threads.

19. A machine of the character described comprising a bag holder on which a hemmed bag is positioned for stringing, a pair of reciprocating stringing needles each comprising a pointed member and a cooperating part forming therebetween a transverse string receiving gap, and needle operating mechanism for entering the needles through the hem, tubes for guiding a pair of threads into the gaps in said needles, pivoted means adjacent said tubes for gripping the ends of said threads and positioning the threads in the needle gaps, and cam means for moving said pointed members and the cooperating parts thereof relative to each other to close said gaps and grip the threads therein, oscillating means for cutting said threads, and knotting means for knotting said threads.

20. A machine of the character described comprising a bag holder on which a hemmed bag is positioned for stringing, a pair of stringing needles having movable cooperating means thereon for gripping a pair of threads therein, and needle operating mechanism for entering the needles through the hem, means on opposite sides of the bag holder for feeding the pair of threads to said movable needle gripping means, and means for moving said gripping means for gripping said threads in said needles, knotting means for knotting said threads having a longitudinally movable member in a portion thereof, means for supporting tags adjacent a portion of said knotting means, and means for placing a tag having an eyelet in position to be acted upon by the longitudinally movable member of said knotting means whereby the knot formed thereby is formed around the eyelet of said tag and secures the tag to the threads.

21. A machine of the character described comprising a bag holder on which a hemmed bag is positioned for stringing, a pair of stringing needles having movable means thereon for gripping a pair of threads, and needle operating mechanism for entering the needles through the hem, means for feeding said threads to the movable needle gripping means, and means for moving said gripping means for gripping said threads in said needles, a pair of knotters adjacent said needles for knotting each of said threads, means for supporting tags and pivoted means for delivering a tag from said support into position to be acted upon by said knotters whereby the knot formed thereby secures the tag to the threads.

22. In a machine of the character described having bag holding arms, a substantially horizontally disposed bag supporting member, a substantially horizontally disposed bag feeding carriage associated with said bag supporting member, and means for reciprocating said carriage horizontally relative to said bag supporting member for feeding hemmed bags from said member onto said arms, pairs of normally open pivotally mounted gripping jaws on said carriage for gripping the hems of the bag therebetween at the ends of said hems, and pairs of normally open pushing and opening fingers pivotally mounted on said carrige for engaging beneath the hems of the bag, means associated with said bag supporting member for feeding a bag between said jaws and fingers, and means for successively partially opening and closing and fully opening and closing said fingers, and for closing and opening the mouth of the bag, whereby reciprocating movement of said carriage feeds the opened and clamped bag onto the bag holding arms.

23. In a machine of the character described having bag holder, a substantially horizontally disposed stationary bag supporting plate, a substantially horizontally disposed bag feeding carriage slidably supported adjacent the forward end of said plate, and means for reciprocating said carriage horizontally relative to said plate for feeding hemmed bags from said plate onto said holder, pairs of normally open pivotally mounted gripping jaws on said carriage for gripping the hems of the bag therebetween at the ends of said hems, and pairs of normally open pushing and opening fingers pivotally mounted on said carriage for engaging beneath the hems of the bag, a reciprocating bag pressing and feeding member on said plate for feeding a bag forwardly along the plate and between said jaws and fingers, and means for successively partially opening and closing and fully opening and closing said fingers, and for closing and opening the mouth of the bag, whereby reciprocating movement of said carriage feeds the opened and clamped bag onto the bag holder.

24. A machine of the character described comprising a bag holder on which a hemmed bag is positioned for stringing, a pair of stringing needles and needle operating mechanism for simultaneously entering the needles through the hem from the same side, means for threading the needles with a pair of threads, a pair of rotatably mounted string knotters adjacent the sides of said bag holder for tying knots in each of said strings, means for supporting tags, tag gripping means having movable jaws, means for moving a tag from said tag support into the jaws of said gripper, pivoted means associated with one of said knotters for elevating one of said strings into the path of said knotters, means for lowering said gripper for positioning said tag adjacent said string elevating means and into the path of travel of one of said knotters whereby the knot formed by said knotter secures the tag to one of said threads.

25. A machine of the character described comprising a bag holder on which a hemmed bag is positioned for stringing, a pair of stringing needles and needle operating mechanism for simultaneously entering the needles through the hem from the same side, means for threading the needles with a pair of threads, a pair of rotatably mounted string knotters adjacent the sides of said bag holder for tying knots in each of said strings, means for supporting tags, tag gripping means having movable jaws, reciprocating means for moving a tag from said tag support into the jaws of said gripper, pivoted gripping means associated with one of said knotters, means for elevating the strings in said needles into said gripping means and means for elevating said gripping means and one of said strings into the path of said knotter, means for lowering said tag gripper for positioning said tag adjacent said string elevating means and into the path of travel of one of said knotters whereby the knot formed by said knotter secures the tag to one of said threads.

26. In a machine of the character described having bag holding arms, a substantially horizontally disposed bag feeding carriage for feeding hemmed bags onto said arms, means on said carriage for gripping the hem of the bag fed therebetween, and pushing and opening fingers on said carriage for engaging the bag beneath the hem and adjacent the line of stitching, and independent means for pushing the bag between said gripping means and said pushing and opening fingers, and means for laterally moving said carriage whereby said gripping means and said pushing and opening fingers deliver the bag to a substantially horizontally disposed bag holding arm.

27. In a machine of the character described having bag holding arms, a substantially horizontally disposed bag feeding carriage for feeding hemmed bags onto said arms, pairs of pivotally mounted gripping jaws on said carriage for gripping the hems of the bag fed therebetween at the ends of said hems, and pairs of pushing and opening fingers pivotally mounted on said carriage for engaging beneath the hem and adjacent the line of stitching, and independent means for pushing the bag between said gripping jaws and said pushing and opening fingers, and means for laterally moving said carriage whereby said gripping jaws and said pushing and opening fingers deliver the bag onto the bag holding arms when the latter are in substantially a horizontal position.

28. In a machine of the character described, the combination of means for positioning a hemmed bag for stringing, a pair of stringing needles and shiftable means on said needles having cooperating faces thereon for simultaneously gripping the ends of the strings and inserting them through the hems of a bag, means for operating said needles and said shiftable needle gripping means for releasing the ends of the strings in said needles, means for removing the released strings from said needles and means for knotting the so-removed strings.

29. A machine of the class described having a bag holder on which a hemmed bag is positioned for stringing, a pair of stringing needles and needle operating mechanism therefor, each of said needles comprising a pointed shank portion and a cooperating tube sleeved over said shank, said shank and tube having cooperating gripping faces thereon, means on opposite sides of said bag holder for feeding a pair of threads into the string receiving openings of said needles on the forward and return strokes of said needles, means for moving said pointed shank portions through said cooperating sleeved tubes for moving said cooperating gripping faces to clamp the ends of the threads in said needles between said cooperating surfaces, means for shifting said needles simultaneously in the same direction to carry the threads through the hems of the bag, means for moving said gripping surfaces in opposing directions to release the threads, and means for removing the threads from between said gripping faces.

30. A machine of the class described having a bag holder on which a hemmed bag is positioned for stringing, a pair of stringing needles and needle operating mechanism, each of said needles comprising a tube and a cooperating pointed shank sleeved within said tube, said tube and shank having cooperating faces thereon forming therebetween a transverse string receiving opening, means on opposite sides of said bag holder for feeding a pair of threads into the string receiving openings of said needles, means for positively moving said shanks relative to said tubes to close said openings and grip the ends of the threads in said needles, means for shifting said needles simultaneously in the same direction to carry the threads through the hems of the bag, means for opening said needle openings and releasing the threads, and means for removing the threads from the openings in said needles, and means for knotting the threads as they are removed from the needles.

31. A machine of the character described comprising a bag holder on which a hemmed bag is positioned for stringing, a pair of stringing needles and needle operating mechanism for simultaneously entering the needles through the hem from the same side, a pair of snagging and opening arms pivotally mounted for substantially oscillatory and arcuate movement, members pivotally connected to the opposing ends of said arms, means for swinging said members and said arms on their pivots in an arcuate direction to move said snagging and opening arms into snagging engagement with the outer wall of the hems, and thence outwardly at an angle relatively to the sides of the hems to pull the cloth outwardly to form relatively large openings in the cloth hems to facilitate entry of the needles.

32. A machine of the character described comprising a bag holder on which a hemmed bag is positioned for stringing, a pair of stringing needles and needle operating mechanism for simultaneously entering the needles through the hem from the same side, a pair of snagging and opening arms pivotally mounted for substantially oscillatory and arcuate movement, a pair of link members, members pivotally connected to the opposing ends of said arms and a pair of levers pivotally connected to said link members for swinging said members and said arms on their pivots in an arcuate direction to move said snagging and opening arms into snagging engagement with the outer wall of the hems, and thence outwardly at an angle relatively to the sides of the hems to pull the cloth outwardly to form relatively large openings in the cloth hems to facilitate entry of the needles.

33. A machine of the character described comprising a bag holder on which a hemmed bag is positioned for stringing, a pair of stringing needles having movable spaced cooperating gripping faces thereon for gripping a pair of threads therein, and needle operating mechanism for entering the needles through the hem, means on opposite sides of the bag holder for feeding the pair of threads into gripping position between the cooperating gripping faces, and means for positively moving said cooperating faces together to grip the threads therebetween, a rotatable knotting member arranged on each side of said bag holder, one of said knotting members having a rod longitudinally slidable therethrough, means for supporting tags adjacent one of said knotting members, said tags formed with eyelets, and means for placing a tag in position to be acted upon by the longitudinally slidable rod of one of said knotting members whereby said slidable rod pulls the thread through the eyelet of the tag so that the knot formed by said knotter is formed around the eyelet of said tag and secures the tag to the threads.

34. A machine of the character described comprising a bag holder on which a hemmed bag is positioned for stringing, a pair of stringing needles and needle operating mechanism therefor, pivotally mounted means adjacent said bag holder having cooperating grippers thereon and means for moving the grippers substantially transversely to the plane of the bag for gripping one side of the extended bag hem above the points of entry of the needles and holding the hems substantially in the central plane of the bag holder, a pair of arms having relatively pointed ends for engaging the bag material at substantially oppositely disposed points, and means for moving said arms outwardly relatively to the sides of the hems in an oscillatory and arcuate direction to pull the cloth outwardly to provide openings for the entry of needles.

35. A machine of the character described comprising a bag holder on which a hemmed bag is positioned for stringing, a pair of stringing needles and needle operating mechanism therefor, a pivotally mounted member adjacent one side of said bag holder, cooperating gripping members on said member and means for moving the grippers substantially transversely to the plane of the bag for gripping one side of the extended bag hem above the points of entry of the needles and holding the bag hem substantially in the central plane of the bag holder, a pair of arms having relatively pointed ends for engaging the bag material at substantially oppositely disposed points, and means for moving said arms outwardly relatively to the sides of the hems in an oscillatory and arcuate direction to pull the cloth outwardly to provide openings for the entry of the needles.

36. A machine of the character described comprising a bag holder on which a hemmed bag is positioned for stringing, a pair of stringing needles and needle operating mechanism for simultaneously entering the needles through the hem from the same side, a pair of hem snagging and opening arms pivotally mounted for substantially oscillatory and arcuate movement, link members pivotally connected to the opposing ends of said arms and means for swinging said link members and said snagging points on their pivots in an arcuate direction into snagging engagement with the outer wall of the hems, and thence outwardly at an angle relatively to the sides of the hems to pull the cloth outwardly to form relatively large openings in the cloth hems to facilitate entry of the needles.

37. A machine of the character described comprising means for supporting a hemmed bag for stringing, a pair of stringing needles having movable means for clamping a bag string therein, and needle operating mechanism for entering the needles through the hem from the same side, and means for feeding a string to said needle clamping means.

38. A machine of the character described comprising means for supporting a hemmed bag for stringing, a pair of stringing needles having movable means for clamping the ends of a bag string therein, and needle operating mechanism for entering the needles through the hem from the same side, and means for feeding the ends of a string to said needle clamping means.

39. A machine of the character described comprising means for supporting a hemmed bag for stringing, a pair of stringing needles embodying shiftable means and provided with cooperating faces for gripping the ends of a string therebetween, and needle operating mechanism for entering the needles through the hem of the bag and means for operating said needles and their shiftable means for releasing the ends of the string in said needles.

40. A machine of the character described comprising means for supporting a hemmed bag for stringing, a pair of stringing needles having movable means for clamping a bag string therein, and needle operating mechanism for entering the needles through the hem from the same side, means for feeding a string to said needle string clamping means, and means for cutting said string.

41. A machine of the character described comprising means for supporting a hemmed bag for stringing, a pair of stringing needles having movable means for clamping a bag string therein, and needle operating mechanism for entering the needles through the hem from the same side, means for feeding a string to said needle string clamping means, means for drawing the string to correct length, and means for cutting said string.

42. A machine of the character described comprising means for supporting a hemmed bag for stringing, a pair of stringing needles having movable means for clamping a pair of strings therein, needle operating mechanism for entering the needles through the hem from the same side, means on opposite sides of the bag holder for feeding a pair of strings to said needle string clamping means on the forward and return strokes of said needles, means for cutting said strings, and a pair of knotters for knotting each of said strings.

43. A machine of the character described comprising means for supporting a hemmed bag for stringing, a source of string connected hemmed bags, means for feeding bags from said source of supply to said bag holder for stringing, means for cutting the strings connecting said bags, a pair of stringing needles having clamping means, needle operating mechanism for entering the needles through the hem from the same side, means for feeding a string to said needle clamping means, means for drawing the string to correct length, and means for cutting said string.

44. A machine of the character described comprising means for supporting a hemmed bag for stringing, a pair of stringing needles and needle operating mechanism therefor, each of said needles comprising a shank portion and a cooperating tube sleeved over said shank, said shank and tube having cooperating gripping faces forming a string receiving opening, means on opposite sides of said bag holder for feeding a pair of strings into the string receiving openings of said needles on the forward and return strokes of said needles, means for moving said shank portions through said cooperating sleeved tubes for moving said cooperating gripping faces to clamp the ends of the strings in said needles between said cooperating faces, means for shifting said needles simultaneously in the same direction to carry the strings through the hem of the bag, means for moving said gripping faces to release the strings, and means for removing the strings from between said gripping faces.

45. A machine of the character described comprising means for supporting a hemmed bag for stringing, a pair of stringing needles having string gripping means, means for feeding string from a continuous supply, and needle operating mechanism for entering the needles through the hem from the same side, and means for frictionally engaging and feeding a string adjacent the string gripping means of said needles.

46. A machine of the character described comprising means for supporting a hemmed bag for stringing, a pair of stringing needles having string gripping means, means for feeding string from a continuous supply, and needle operating mechanism for entering the needles through the hem from the same side, and movable tubular string guiding and feeding means through which string from said supply extends frictionally engaging said string whereby movement of said tubular means feeds said string adjacent the string gripping means of said needles.

47. In a machine of the character described having means for supporting a bag for stringing, a substantially horizontally disposed bag supporting plate having bag guiding means thereon for keeping the bag in line, bag tensioning runners on said plate and a substantially horizontally disposed bag feeding carriage movably mounted on said plate, and means for reciprocating said carriage horizontally relative to said plate for feeding hemmed bags to said bag supporting means, a pair of stringing needles having string gripping means thereon and needle operating mechanism for entering the needles through the hems from the same side, and means for feeding a pair of strings to the gripping means for said needles.

48. In a machine of the character described having means for supporting a bag for stringing, a substantially horizontally disposed bag supporting plate having spaced bag guiding runners thereon for keeping the bags in line, a bag tensioning means associated with said plate and engageable with said bags, and a substantially horizontally disposed bag feeding carriage movably mounted on said plate, and means for reciprocating said carriage horizontally relative to said plate for feeding hemmed bags to said bag supporting means, a pair of stringing needles having string gripping means thereon and needle operating mechanism for entering the needles through the hem from the same side, and means for feeding a pair of strings to the gripping means of said needles.

49. In a machine of the character described having means for supporting a bag for stringing, a substantially horizontally disposed bag supporting plate, and a substantially horizontally disposed bag feeding carriage movably mounted on said plate, a shaft rotatably mounted in said carriage, a pair of normally open pushing fingers on said shaft for engaging with the hem of a bag, means for reciprocating said carriage relative to said plate, a vertically movable member associated with said carriage and having a guide means, and a member carried by said shaft engageable with said guide means whereby during the movement of said feeding carriage said finger supporting shaft is rocked to move said fingers into engagement with the bag hem whereby said bag is gripped preparatory to being opened.

50. In a machine of the character described having means for supporting a hemmed bag for stringing, a pair of stringing needles having string gripping means thereon and needle operating mechanism for entering the needles through the hem from the same side, means for threading the string gripping means on said needles with a pair of strings, a knotter for knotting each of said strings, a bag receiving receptacle, and means actuated in timed relation with said bag supporting means for removing the strung and knotted bag therefrom and delivering the same into said receptacle.

51. In a bag stringing machine, a stringing needle having an eye portion and an abutment adjacent the eye portion, means for feeding thread to said eye portion, said needle comprising a hollow portion and a clamping rod slidable within the hollow portion adapted in one position to positively engage said abutment and to positively clamp the thread against said abutment in another position, and in still another position to release the thread, and means for actuating said clamping rod in timed relation to said thread feeding means.

52. In a bag stringing machine, a stringing needle having a string receiving portion, and an abutment, means for feeding string to said string receiving portion, said needle including a hollow portion, a clamping rod slidable within the hollow portion adapted in one position to positively engage said abutment and to positively clamp the string within said string receiving portion, in another position, and in still another position to release the string, and means for actuating said clamping rod in timed relation to said string feeding means.

53. The herein described method of stringing bags with string from a continuous source of string supply comprising the steps of feeding the string to a string gripping means, and drawing off a predetermined length or loop of string from said supply while the string is being gripped by said gripping means, then severing the predetermined length of string and gripping the free ends of the string in a pair of needles and threading the same through the hem of a bag.

54. The herein described method of stringing bags with string from a continuous source of string supply comprising the steps of feeding the string to a string gripping means, and drawing off a predetermined length or loop of string from said supply while the string is being gripped by said gripping means, then severing the predetermined length of string and positively gripping the string in a needle and threading the same through the hem of a bag while the string is being positively gripped by said gripping means.

55. In a bag stringing machine having a continuous source of string supply, a tube through which said string from said supply extends, means for reciprocating the said tube to cause the tube to feed the free end of the string from said supply, means for gripping the free end of the string fed by said tube, and pulling means for pulling the string through the tube to form a loop of string of the required length for threading a bag hem, means for severing the predetermined length of string, said pulling means being operative while said free end of said string is held by said gripping means.

56. A machine of the character described comprising means for supporting a hemmed bag for stringing, a pair of reciprocating stringing needles each comprising a pointed member and a cooperating part forming therebetween a string receiving opening, and needle operating mechanism for entering the needles through the hem, a pair of tubes, each tube of said pair for feeding and guiding a string adjacent the openings in said needles, and means for moving said pointed members and the cooperating parts thereof relative to each other to close said openings and grip the strings therein, means for cutting said strings, and means for knotting said strings.

57. A machine of the character described comprising means for supporting a hemmed bag for stringing, a pair of stringing needles having string gripping means, and needle operating mechanism for entering the needles through the hem from the same side, two tubes, through each of which a string extends, each tube feeding and guiding a single string to the string gripping means of said needles.

58. A machine of the character described comprising means for supporting a hemmed bag for stringing, a pair of stringing needles having string gripping means, and needle operating mechanism for entering the needles through the hem from the same side, and two tubes one on each side of said bag supporting means and through each of which a string extends, each tube for feeding a single string adjacent to and across the string gripping means of said needles.

59. A machine of the character described comprising means for supporting a hemmed bag for stringing, a pair of stringing needles having string gripping means, and needle operating mechanism for simultaneously entering the needles through the hem from the same side, and two tubes arranged on opposite sides of said bag supporting means and through each of which a string extends, each tube for feeding a single string adjacent the string gripping means, and means for actuating said tubes.

60. A machine of the character described comprising means for supporting a hemmed bag for stringing, a pair of stringing needles having string receiving openings therein, and means for closing said string receiving openings for clamping strings in said openings, needle operating mechanism for entering the needles through the hem, a pair of reciprocable tubular member through each of which a string extends, each of said members for feeding a single string above and across the needle openings, and means for reciprocating said tubular members through each of which a string extends, each of said members for feeding a single string above and across the needle openings, and means for reciprocating said tubular members.

61. A machine of the character described comprising means for supporting a hemmed bag for stringing, a pair of stringing needles having gripping means for positively gripping draw strings and means for actuating said gripping means to positively grip the ends of a string and needle operating mechanism for imparting rectilinear movement to said needles for simultaneously inserting the positively gripped ends of a draw string in the hem of the bag, a snagging member adapted to penetrate the hem just prior to the insertion of the stringing needles, means actuated in timed relation to the movement of the stringing needles for moving said snagging member into snagging engagement with the outer wall of the hem, and thence outwardly in an arcuate direction relatively to the sides of the hems to pull the cloth outwardly to form openings in the hems to facilitate entry of the needle.

62. In a bag stringing machine, a pair of needles having positive acting string gripping means, means for supporting a hemmed bag during the stringing operation, means for actuating said first mentioned means to positively grip the ends of a draw string, means for imparting movement to said needles for simultaneously inserting the two positively gripped ends of a draw string in the hem of the bag, a conditioning needle adapted to penetrate the hem just prior to the insertion of the stringing needles, means actuated in timed relation to the movement of the stringing needles for imparting movement to said conditioning needle in a direction cooperating with the movement of said stringing needles, to first cause said conditioning needle to penetrate the hem and then divert the conditioning needle after the conditioning needle penetrates the hem of the bag, to bulge the hem and facilitate entry of the stringing needles.

63. In a bag stringing machine, a pair of needles having positive acting string gripping means, means for supporting a hemmed bag during the stringing operation, means for imparting rectilinear movement to said needles for simultaneously inserting the two positively gripped ends of a draw string in the hem of the bag, a conditioning needle adapted to penetrate the hem just prior to the insertion of the stringing needles, means actuated in timed relation to the movement of the stringing needles for imparting movement in one path to said conditioning needle to have the conditioning needle penetrate the hem of the bag and for then diverting the conditioning needle from said path to bulge the hem and facilitate entry of the stringing needles.

64. A machine for stringing hemmed bags each having a hem at their mouth ends, needles having gripping means for positively gripping both ends of a draw string, and means for actuating said needles to thread said both ends through each hem and while said ends are positively gripped by said gripping means, bag reversing means supporting successive bags in draw string threading position, and means for feeding bags to said bag reversing means.

65. In a bag stringing machine, a two part stringing needle adapted for movement through the hem of a bag and having a string receiving opening and an abutment adjacent said opening, means for feeding thread into said opening, one of the parts of said needle constituting a clamping member slidable relatively to the other part of said needle and operative in one position, and prior to and during said entire needle movement, to positively clamp the thread against said abutment and in another position, and at the termination of said needle movement, to release the thread, and means for actuating said clamping member in timed relation to said thread feeding means.

66. A bag stringing machine designed to handle hemmed bags received wrong side out in chain formation from the sewing stage which comprises means for advancing the bags, means for severing the foremost bag from those following it, means for positively gripping and simultaneously inserting the two free ends of draw strings in the hem of the bag so that the projecting ends of the drawstrings lie outside the bag, and means for reversing the bag intermediate its advance to the stringing position and its removal from the machine.

67. A bag stringing machine designed to handle hemmed bags received wrong side out in chain formation from the sewing stage which comprises means for advancing the bags, means for severing the foremost bag from those following it, means for positively gripping and simultaneously inserting the two free ends of drawstrings in the hem of the bag so that the projecting ends of the drawstrings lie outside the bag, means for reversing the bag intermediate its advance to the stringing position and, its removal from the machine, and means for knotting the strings after the stringing operation.

68. In a bag stringing machine a two part stringing needle having a string receiving opening and an abutment adjacent said opening, means for feeding string into said opening, one of the parts of said needle constituting a clamping member slidable relative to the other part of said needle and operatively normally to positively engage said abutment, and in one operative position to positively clamp the string against said abutment and in another operative position to release the string, and means for actuating said clamping member in timed relation to said string feeding means.

EDWARD E. WEST.

CERTIFICATE OF CORRECTION.

Reissue No. 22,596. January 23, 1945.

EDWARD E. WEST.

It is hereby certified that error appears in the printed specification of the above numbered patent requiring correction as follows: Page 30, first column, line 46, claim 60, for the word "member" read --members--; line 50, beginning with "through" strike out all to and including "members" in line 54, same claim; page 31, second column, line 4, claim 68, for "operatively" read --operative--; and that the said Letters Patent should be read with this correction therein that the same may conform to the record of the case in the Patent Office.

Signed and sealed this 8th day of May, A. D. 1945.

Leslie Frazer (Seal) Acting Commissioner of Patents.